(12) United States Patent
Larsson et al.

(10) Patent No.: US 12,377,788 B2
(45) Date of Patent: Aug. 5, 2025

(54) ROOF RACK FOOT ASSEMBLY FOR A ROOF RACK AND A ROOF RACK FOR A VEHICLE

(71) Applicant: Thule Sweden AB, Hillerstorp (SE)

(72) Inventors: Fredrik Larsson, Vaggeryd Jönköping (SE); Stefan Andersson, Värnamo Jönköping (SE); Peter Wikström, Skillingaryd (SE); Jens Pettersson, Jönköping (SE); Joachim Vidar, Vaggeryd (SE); Mujo Kukolj, Värnamo (SE); Henric Svensson, Anderstorp (SE)

(73) Assignee: Thule Sweden AB, Hillerstorp (SE)

( * ) Notice: Subject to any disclaimer, the term of this patent is extended or adjusted under 35 U.S.C. 154(b) by 516 days.

(21) Appl. No.: 17/787,147

(22) PCT Filed: Nov. 11, 2020

(86) PCT No.: PCT/EP2020/081692
§ 371 (c)(1),
(2) Date: Jun. 17, 2022

(87) PCT Pub. No.: WO2021/121786
PCT Pub. Date: Jun. 24, 2021

(65) Prior Publication Data
US 2023/0013512 A1    Jan. 19, 2023

(30) Foreign Application Priority Data
Dec. 20, 2019    (EP) .................................... 19218575

(51) Int. Cl.
B60R 9/058    (2006.01)

(52) U.S. Cl.
CPC .................................... B60R 9/058 (2013.01)

(58) Field of Classification Search
CPC .......... B60R 9/058; B60R 9/045; B60R 9/042
See application file for complete search history.

(56) References Cited

U.S. PATENT DOCUMENTS

| | | | |
|---|---|---|---|
| 4,982,886 A * | 1/1991 | Cucheran ................ | B60R 9/045 224/326 |
| 5,232,138 A * | 8/1993 | Cucheran ................ | B60R 9/045 224/326 |
| 5,829,654 A | 11/1998 | Weger et al. | |

(Continued)

FOREIGN PATENT DOCUMENTS

| DE | 195 04 247 A1 | 8/1996 |
|---|---|---|
| GB | 2 147 860 A | 5/1985 |

OTHER PUBLICATIONS

International Search Report and Written Opinion of the International Searching Authority in International Application No. PCT/EP2020/081692 (8 pages).

Primary Examiner — Brian D Nash
(74) Attorney, Agent, or Firm — STERNE, KESSLER, GOLDSTEIN & FOX P.L.L.C.

(57) ABSTRACT

The present disclosure relates to a roof rack foot assembly for a roof rack including a carrier member for carrying a crossbar of the roof rack, and a bracket. The bracket is configured for attachment to a fix point attachment position of a vehicle by use of at least one fixation member. The bracket includes an engagement portion and a seat portion for the carrier member.

30 Claims, 21 Drawing Sheets

(56) References Cited

U.S. PATENT DOCUMENTS

| | | | |
|---|---|---|---|
| 9,187,047 B2* | 11/2015 | Sautter | B60R 9/045 |
| 10,207,649 B2* | 2/2019 | Wymore | B60R 9/042 |
| 11,453,343 B1* | 9/2022 | Henry, Jr. | B60R 9/052 |
| 2001/0013528 A1* | 8/2001 | Chimenti | B60R 9/045 |
| | | | 224/326 |
| 2010/0192704 A1* | 8/2010 | Flaherty | B60R 9/058 |
| | | | 224/329 |
| 2018/0118127 A1 | 5/2018 | Wymore | |

* cited by examiner

ROOF RACK FOOT ASSEMBLY FOR A ROOF RACK AND A ROOF RACK FOR A VEHICLE

TECHNICAL FIELD

The present disclosure relates to a fix point roof rack foot assembly for a roof rack and to a roof rack for a vehicle comprising at least one of the roof rack foot assembly. The present disclosure further relates to a cover attachment device and to a screw anti-rotation device. The present disclosure further relates to a roof rack bracket for a roof rack foot and a vehicle roof rail assembly.

BACKGROUND

Roof racks comprising load carrying bars are known for providing improved load carrying capacity for automobiles.

A roof rack for a vehicle typically includes a roof rack crossbar and two roof rack feet configured for attachment to the vehicle. There are different types of roof racks and roof rack feet. For example, roof rack feet may be configured for attachment to a guide rail or the like provided on the roof of the vehicle. Thereby the roof rack may be provided at any position along the extension of the guide rail. Another type of roof rack foot is the so called fix point roof rack foot, which is configured for attachment to a fix point attachment position on the vehicle. Most likely the fix point attachment position is provided on the roof of the vehicle and may be configured as a threaded screw hole close to an edge of the roof which can receive a matching threaded screw for attaching the roof rack foot to the roof.

One such fix point roof rack foot may be found in EP 3 225 468 A1, which discloses a fix point load carrier foot for a roof rack for a vehicle. The load carrier foot comprises a body and the body comprises a vehicle facing surface and a load carrying bar facing surface. An attachment member is connectable to a fixed connection point on the vehicle and has an attachment position and a release position.

Even though the above mentioned fix point load carrier foot provides an adjustable load carrying foot which can be used for different vehicles, there is still a strive of developing further improved and/or alternative roof rack feet for roof racks.

SUMMARY

In view of the above, an object of the present disclosure is to provide an improved roof rack foot assembly for a roof rack, which at least alleviates some of the drawbacks of the prior art, or which at least provides a good alternative.

The object is provided by the subject matter in independent claim 1. Advantageous embodiments may be found in the dependent claims and in the accompanying description and drawings.

According to a first aspect of the disclosure, the object is achieved by a roof rack foot assembly for a roof rack, comprising,
- a carrier member for carrying a crossbar of the roof rack, the carrier member comprising a first and a second support portion,
- a bracket configured for attachment to a fix point attachment position of a vehicle by use of at least one fixation means, such as a screw or bolt, wherein the bracket comprises an engagement portion and a seat portion for the carrier member,
wherein,
- the seat portion comprises a first and a second support surface, preferably spaced apart from each other, wherein each support surface is adapted to receive the respective first and second support portion of the carrier member when the carrier member is attached to the bracket, and
- wherein each support surface of the seat portion has a longitudinal extension along a respective longitudinal axis thereof, wherein the first and second support surfaces are arranged on the bracket so that their longitudinal axes are provided parallel, or at least substantially parallel, with respect to each other.

By the provision of the roof rack foot assembly as disclosed herein, especially with respect to the first aspect, an improved roof rack foot assembly can be provided which enables load from the crossbar to be more uniformly distributed and/or balanced on the bracket. This may be achieved by the configuration of the seat portion, and especially by the first and second support surfaces, which are preferably spaced apart from each other, thereby at least mainly providing a two-point or two-line load-transferring connection between the carrier member and the bracket. Hence, according to a preferred embodiment, the first and second support portions of the carrier member are also spaced apart from each other. Still further, by arranging the first and second support surfaces so that their longitudinal axes are provided parallel, or at least substantially parallel, with respect to each other, more space on the bracket may be provided for the fixation means for attaching the bracket to the fix point attachment position of the vehicle. For example, improved space for the fixation means may thereby be provided in-between the first and second support surfaces and/or on an outer side of the first and second support surfaces. Hence, the roof rack foot assembly as disclosed herein, especially with respect to the first aspect of the disclosure, provides for increased versatility due to the enlarged space for the fixation means on the bracket. For example, the bracket may be configured differently for different vehicle models by adjusting the location for the fixation means on the bracket. Further, the increased space for the fixation means may also provide a more robust connection to the vehicle in that it enables providing more fixation means and/or providing fixation means at more preferred locations in order to securely attach the bracket to the vehicle.

Optionally, the roof rack foot assembly may further comprise an engagement member associated with the carrier member which is adapted to clamp the carrier member to the bracket by applying a pulling force therebetween. Thereby a secure engagement to the vehicle may be provided when the roof rack foot assembly is attached thereto. Clamping the carrier member like this may be important for safety reasons, implying a reduced risk for the roof rack foot assembly of being released from the vehicle. This may be especially important when the roof rack is intended to carry larger and/or heavier loads, such as fully loaded ski-boxes, bicycles etc.

Optionally, the first and second support surfaces of the seat portion and the first and second support portions of the carrier member may be adapted to transfer loads at least in a vertical direction, as seen when the roof rack foot assembly is attached to a vehicle positioned on a flat horizontally extending surface. Thereby a reliable two-point or two-line load-transferring connection which at least transfer loads in vertical direction between the carrier member and the bracket may be achieved. This configuration may also more easily predict how loads from the roof rack to the vehicle will be transferred, thereby e.g. reducing the risk of fatigue stress at unexpected portions of the roof rack foot assembly.

Optionally, each support surface of the seat portion may have a transverse extension along a respective transverse axis thereof, wherein the respective transverse axis is perpendicular to its respective longitudinal axis, and wherein each support surface has a length in its transverse extension which is shorter than a length in its longitudinal extension, or wherein each support surface has a length in its transverse extension which is equal to, or substantially equal to, a length in its longitudinal extension. The transverse and longitudinal lengths are preferably a greatest measured length of each support surface.

Optionally, the roof rack foot assembly may further comprise a foot pad member for protecting a vehicle roof, wherein the foot pad member is adapted to be positioned in-between the bracket and the vehicle when the bracket is attached to the fix point attachment position, wherein the bracket and the foot pad member may be provided as separate components or may be integrated as a one-piece member. The foot pad member may comprise a material which is softer compared to a material of the bracket, such as an elastically deformable material. Such material may for example be a polymer, e.g. rubber. Optionally, the bracket may comprise at least one receiving location for at least one of the fixation means. Still optionally, as also indicated in the above, the at least one receiving location may be located in an area, preferably a central area, of the bracket in-between the first and second support surfaces. Still optionally, the first and second support surfaces of the bracket may comprise a respective first and second longitudinal side, wherein the first longitudinal side of the first support surface faces the first longitudinal side of the second support surface, and wherein the at least one receiving location is located outside and facing one of the second longitudinal sides. Hence, by the provision of the roof rack foot assembly as disclosed herein, more space may be provided for fixation means for attaching the bracket to the vehicle.

Optionally, the bracket may have a longitudinal extension along a longitudinal axis thereof and a transverse extension along a transverse axis thereof, wherein the longitudinal axis of the bracket and the transverse axis of the bracket are perpendicular to each other, and wherein the bracket is configured so that the longitudinal axis thereof mainly coincides with a travelling direction of the vehicle when the roof rack foot assembly is attached to the vehicle, wherein the longitudinal axes of the first and second support surfaces are extending in, or at least substantially extending in, the same direction as the direction of the transverse axis of the bracket. Thereby improved support for the carrier member may be provided and where a more uniform load distribution in the transverse direction of the bracket can be provided. It may further provide improved stability of the carrier member on the bracket, when attached thereto.

Optionally, the bracket may have a longitudinal extension along a longitudinal axis thereof and a transverse extension along a transverse axis thereof, wherein the longitudinal axis of the bracket and the transverse axis of the bracket are perpendicular to each other, and wherein the bracket is configured so that the longitudinal axis thereof mainly coincides with a travelling direction of the vehicle when the roof rack foot assembly is attached to the vehicle, wherein the longitudinal axes of the first and second support surfaces are extending in, or at least substantially extending in, the same direction as the direction of the longitudinal axis of the bracket. Thereby a stable two-line load-transferring connection can be provided including a more uniform load distribution in the longitudinal direction of the bracket.

Optionally, the first and second support portions of the carrier member and the first and second support surfaces of the seat portion may be adapted so that the carrier member, in a first attachment state, is movable in the seat portion by pivoting the carrier member, preferably with respect to a rotational axis of the carrier member, when the carrier member is not rigidly attached to the bracket. Thereby an angle between the bracket and the carrier member may be adjusted to compensate for different vehicle roofs having different inclination angles, implying increased flexibility for the roof rack foot assembly. A first attachment state as used herein means a state where the carrier member is connected to the bracket but has not yet been rigidly attached thereto, such as when providing a tensioning force therebetween.

Optionally, the engagement portion may be positioned vertically above the first and second support surfaces, as seen when the roof rack foot assembly is mounted on a vehicle positioned on a flat horizontally extending surface. Thereby it may be easier for a user to find the engagement portion when rigidly attaching the carrier member to the bracket. Further, by providing the engagement portion vertically above the first and second support surfaces, the risk of damaging/scratching the vehicle roof during attachment may be reduced.

Optionally, the bracket may be a sheet-formed member, such as a sheet metal member, wherein the first and second support surfaces are provided on a main surface of the sheet-formed member. Providing a sheet-formed member may imply a reduced manufacturing cost. Still optionally, the bracket may have an L-shaped and/or U-shaped cross section, which cross section is defined by a plane which is perpendicular to the longitudinal axis of the bracket, which axis is preferably intended to at least mainly extend in a travelling direction of the vehicle when the roof rack foot assembly is attached to the vehicle. Such a shape has been found advantageous in that it provides two or more surfaces on the bracket at which the engagement member and/or the seat portion can be provided. Further, such shape implies a more robust bracket having increased strength.

The roof rack foot assembly as disclosed herein may also be denoted a fix point roof rack foot assembly.

According to a second aspect of the disclosure, the object is also provided by a roof rack for a vehicle comprising at least one roof rack foot assembly according to any one of the embodiments of the first aspect of the disclosure and at least one crossbar.

According to a third aspect of the disclosure, the object is achieved by a roof rack foot assembly for a roof rack, comprising:
  a carrier member for carrying a crossbar of the roof rack;
  a bracket configured for attachment to a fix point attachment position of a vehicle by use of a fixation means, such as a screw or bolt,
  an engagement member connected to the carrier member for rigidly attaching the carrier member to the bracket;
  wherein the bracket comprises an engagement portion and a seat portion for the carrier member, wherein the engagement member is adapted to attach the carrier member to the bracket by engagement with the engagement portion of the bracket, and wherein the carrier member and the seat portion are adapted so that the carrier member, in a first attachment state, is movable in the seat portion by pivoting the carrier member with respect to a rotational axis of the carrier member when the carrier member is not rigidly attached to the bracket;

a carrier member fixation means, such as a screw or bolt, adapted for providing a secure engagement between the engagement member and the engagement portion so that the carrier member is rigidly attached to the bracket, wherein, the roof rack foot assembly is configured so that the carrier member fixation means extends through, or in the proximity of, the rotational axis.

By the provision of the aforementioned roof rack foot assembly, especially with respect to the third aspect, an improved roof rack foot assembly is achieved which provides a robust attachment between the carrier member and the bracket where the risk of creating unwanted bending moments will be reduced. This is accomplished by providing the carrier member fixation means so that it extends through, or in the proximity of, the rotational axis of the carrier member. It has namely been realized that if having a carrier member fixation means which does not extend through, or in the proximity of, the rotational axis of the carrier member, a lever arm effect which provides unwanted bending moments may be created. This in turn may result in unwanted stress on the bracket, the carrier member and/or on the crossbar, when attached to the carrier member. Further, during mounting, an unwanted bending moment on the crossbar may for example lead to that the crossbar tries to raise a roof rack foot assembly on the other side of the crossbar which not yet has been rigidly attached to the vehicle. By the provision of the roof rack foot assembly according to the third aspect of the disclosure, this kind of mounting issue may be mitigated or eliminated.

It shall be noted that all embodiments of the third aspect of the present disclosure are applicable to all of the embodiments of the first and second aspects of the present disclosure and vice versa.

Optionally, the carrier member may have at least one curved outer surface which is adapted to be in contact with the seat portion when being attached to the bracket, and wherein the at least one curved outer surface, in the first attachment state, is configured to be movable in the seat portion by pivoting the carrier member with respect to the rotational axis of the carrier member, wherein a distance from the rotational axis to any point on the outer curved surface which is adapted to be in contact with the seat portion is at least 40%, 50%, 60%, 70% or greater than a transverse length of the bracket, as seen along a transverse extension of the bracket. Thereby a large abutment surface may be provided, which in turn may reduce the risk of stress concentration at specific portions of the roof rack foot assembly. Reduced risk of stress concentrations may imply a reduced need of over-dimensioning parts of the roof rack foot assembly, which in turn may imply a reduced manufacturing cost and/or reduced amount of material required for the roof rack foot assembly.

Preferably, the seat portion has a main extension in the transverse extension of the bracket. Still further, the outer curved surface of the carrier member may have a main extension in the transverse extension of the bracket, when attached thereto. The distance from the rotational axis to any point on the outer curved surface preferably defines a radius of the outer curved surface, which radius may be seen in a plane defined by a transverse direction and a height direction of the carrier member, which directions are perpendicular to each other, and wherein the height direction corresponds to a vertical direction of the vehicle, as seen when the roof rack foot assembly is attached thereto.

Still optionally, the transverse extension of the bracket may extend along a transverse axis thereof, wherein the bracket has a longitudinal extension along a longitudinal axis thereof, wherein the longitudinal axis of the bracket and the transverse axis of the bracket are perpendicular to each other, and wherein the longitudinal axis of the bracket is intended to at least mainly extend in a travelling direction of the vehicle when the roof rack foot assembly is attached to the vehicle.

Optionally, the engagement member may comprise a bracket support surface and the bracket may comprise an engagement member support surface, wherein the bracket support surface and the engagement member support surface are adapted to contact each other and to provide a first tension force therebetween when the carrier member is rigidly attached to the bracket, which first tension force is mainly directed in a horizontal direction, as seen when the roof rack foot assembly is mounted on a vehicle positioned on a flat horizontally extending surface. Thereby a robust attachment which securely attaches the carrier member to the bracket in the horizontal direction is achieved.

Optionally, the engagement member may be pivotally connected to the carrier member with respect to a pivot axis, wherein the pivot axis is arranged to be moved in a track provided on or in the engagement member or on or in the carrier member. Still optionally, the track may be inclined with respect to a horizontal plane so that a second tension force between the engagement member and the engagement portion is provided when the carrier member is rigidly attached to the bracket, which second tension force is mainly directed in a vertical direction, as seen when the roof rack foot assembly is mounted on a vehicle positioned on a flat horizontally extending surface. Thereby a robust attachment which securely attaches the carrier member to the bracket in the vertical direction is achieved.

Optionally, the roof rack foot assembly may further comprise a foot pad member, wherein the foot pad member is adapted to be positioned in-between the bracket and the vehicle when the bracket is attached to the fix point attachment position, wherein the bracket and the foot pad member may be provided as separate components or may be integrated as a one-piece member.

Optionally, the engagement portion may be positioned vertically above the seat portion, as seen when the roof rack foot assembly is mounted on a vehicle positioned on a flat horizontally extending surface.

Optionally, the bracket may be a sheet-formed member, such as a sheet metal member, wherein the seat portion is provided on a main surface of the sheet-formed member.

Optionally, the bracket may have an L-shaped and/or U-shaped cross section, which cross section is defined by a plane which is perpendicular to a longitudinal axis of the bracket, which axis is preferably intended to at least mainly extend in a travelling direction of the vehicle when the roof rack foot assembly is attached to the vehicle.

Optionally, the seat portion may comprise a first and a second support surface, which are preferably spaced apart from each other.

According to a fourth aspect of the disclosure, the object is achieved by a roof rack for a vehicle comprising at least one roof rack foot assembly according to any one of the embodiments of the third aspect of the disclosure and at least one crossbar.

According to a fifth aspect of the disclosure, the object is achieved by a roof rack foot assembly for a roof rack, comprising:
- a carrier member for carrying a crossbar of the roof rack;
- a bracket configured for attachment to a fix point attachment position of a vehicle by use of a fixation means, such as a screw or bolt,
- wherein the bracket comprises an engagement portion and a seat portion for the carrier member, and wherein the bracket comprises a top side facing the carrier member and a bottom side provided on an opposite side with respect to the top side, wherein the seat portion is provided on the top side, and wherein the engagement portion and the seat portion are spaced apart from each other,
- wherein,
- the engagement portion is provided at the top side of the bracket.

It shall be noted that all embodiments of the fifth aspect of the present disclosure are applicable to all of the embodiments of the first, second, third and fourth aspects of the present disclosure and vice versa.

By the provision of the aforementioned roof rack foot assembly, especially with respect to the fifth aspect, an improved roof rack foot assembly is achieved which provides a simplified attachment interface between the bracket and the carrier member. More specifically, by providing the engagement portion and the seat portion, which are spaced apart from each other, on the top side of the bracket, it may be easier for a user to attach the carrier member to the bracket. This configuration further implies that the risk of damaging/scratching a vehicle roof during mounting may be mitigated.

Optionally, the engagement portion may be positioned vertically above the seat portion, as seen when the roof rack foot assembly is mounted on a vehicle positioned on a flat horizontally extending surface. Still optionally, the bracket may have an L-shaped and/or U-shaped cross section, which cross section is defined by a plane which is perpendicular to a longitudinal axis of the bracket, which axis is preferably intended to at least mainly extend in a travelling direction of the vehicle when the roof rack foot assembly is attached to the vehicle. Still optionally, the engagement portion may be provided on a portion of the bracket which extends in the vertical direction, such as a vertically extending portion on the aforementioned L-shaped and/or U-shaped cross sections. Thereby, it may be easier and more intuitive for a user to find the engagement portion when attaching the carrier member to the bracket.

Optionally, the bracket may be a sheet-formed member, such as a sheet metal member, wherein the first and second support surfaces are provided on a main surface of the sheet-formed member.

Optionally, the engagement portion may be defined by at least one aperture in the bracket into which an engagement member associated with the carrier member may be inserted for rigidly attaching the carrier member to the bracket.

Optionally, the roof rack foot assembly may further comprise the engagement member associated with the carrier member, wherein the engagement member comprises at least one hook-formed portion adapted to be inserted into the at least one aperture for rigidly attaching the carrier member to the bracket.

According to a sixth aspect of the disclosure, the object is achieved by a roof rack for a vehicle comprising at least one roof rack foot assembly according to any one of the embodiments of the fifth aspect and at least one crossbar.

According to a seventh aspect of the disclosure, the object is achieved by a roof rack foot assembly for a roof rack, comprising:
- a carrier member for carrying a crossbar of the roof rack;
- an engagement member connected to the carrier member;
- a bracket configured for attachment to a fix point attachment position of a vehicle by use of a fixation means, such as a screw or bolt,
- wherein the bracket comprises an engagement portion for the engagement member, wherein the engagement member is adapted to rigidly attach the carrier member to the bracket by engagement with the engagement portion of the bracket, the engagement member comprises at least one hook member adapted to engage with the engagement portion of the bracket,
- wherein,
- the at least one hook member is formed by a wall section extending in a height direction and a depth direction of the roof rack foot assembly, wherein the depth direction is coinciding with a transverse direction of the vehicle, when attached thereto.

It shall be noted that all embodiments of the seventh aspect of the present disclosure are applicable to all of the embodiments of the first, second, third, fourth, fifth and sixth aspects of the present disclosure and vice versa.

By the provision of the aforementioned roof rack foot assembly, especially with respect to the seventh aspect, an improved roof rack foot assembly is achieved in which a more robust engagement member is provided. This is provided in that the hook member is formed by a wall section which has an extension as defined in the above. Thereby, forces acting on the hook member, when the carrier member is rigidly attached to the bracket, can be accommodated by the wall section which will be less sensitive to bending moments with respect to a longitudinal axis of the vehicle, when the roof rack foot assembly is attached thereto.

Optionally, the bracket may further comprise a seat portion for the carrier member. Still optionally, the engagement portion of the bracket may be positioned vertically above the seat portion, as seen when the roof rack foot assembly is mounted on a vehicle positioned on a flat horizontally extending surface.

Optionally, the engagement member may be a sheet-formed member, such as a sheet metal member.

Optionally, the engagement member may have an L-shaped and/or U-shaped cross section, which cross section is defined by a plane which is perpendicular to the height direction.

Optionally, the bracket may be a sheet-formed member, such as a sheet metal member, wherein the engagement portion is provided on a side surface of the sheet-formed member.

Optionally, the bracket may have an L-shaped and/or U-shaped cross section, which cross section is defined by a plane which is perpendicular to a longitudinal axis of the bracket, which axis is preferably intended to at least mainly extend in a travelling direction of the vehicle when the roof rack foot assembly is attached to the vehicle.

According to an eighth aspect of the disclosure, the object is achieved by a roof rack for a vehicle comprising at least one roof rack foot assembly according to any one of the embodiments of the seventh aspect and at least one crossbar.

According to a ninth aspect of the disclosure, the object is achieved by a cover attachment device for a bracket for a roof rack foot assembly for a roof rack for a vehicle, comprising:

a bracket facing away surface adapted to protect the bracket externally when the cover attachment device is attached to the bracket;

a bracket facing surface adapted to face the bracket when the cover attachment device is attached to the bracket;

wherein the cover attachment device further comprises at least one protruding portion which protrudes out from the bracket facing surface, wherein the at least one protruding portion is configured to attach the cover attachment device to the bracket by a snap-fit connection.

By the provision of the aforementioned cover attachment device, an improved and more reliable connection to the bracket is provided. This is achieved by the at least one protruding portion which enables the provision of the snap-fit connection.

Optionally, the at least one protruding portion may be configured to resiliently flex so as to be able to snap in to an engagement portion of the bracket.

Optionally, the at least one protruding portion may be configured to resiliently flex in a horizontal direction, as seen when the cover attachment device and the bracket are attached to the vehicle.

Optionally, the at least one protruding portion may comprise a waist section and an outer engaging section provided outside the waist section with respect to the bracket facing surface, wherein the outer engaging section is configured to snap in to the engagement portion of the bracket.

Optionally, the cover attachment device may further comprise a lock-member configured to lock the cover attachment device to the bracket. Still optionally, the lock member may be arranged to prevent the at least one protruding portion to release the snap-fit connection to the bracket when the lock member is in a locked state.

According to a tenth aspect of the disclosure, the object is achieved by a bracket and cover attachment device kit and/or assembly for a roof rack foot assembly for a roof rack for a vehicle, comprising the cover attachment device according to any one of the embodiments of the ninth aspect and a bracket.

It shall be noted that all embodiments of the ninth and tenth aspects of the present disclosure are applicable to all of the embodiments of the first, second, third, fourth, fifth, sixth, seventh and eighth aspects of the present disclosure and vice versa.

According to an eleventh aspect of the disclosure, the object is achieved by a screw anti-rotation device for a screw of a roof rack, wherein the screw anti-rotation device is configured to prevent the screw from loosening when being attached to a member, the screw anti-rotation device comprising:

a screw facing surface adapted to receive the screw;

a screw facing away surface adapted to face the member to which the screw is attached;

wherein the screw facing surface is rounded so that the screw anti-rotation device can be angled with respect to the screw in more than one angle position when the screw is attached to the member and/or the screw facing away surface is rounded so that the screw anti-rotation device can be angled with respect to the member in more than one angle position when the screw is attached to the member.

By the provision of the aforementioned screw anti-rotation device, an improved screw anti-rotation device is achieved which is adjustable in different angles, thereby providing increased versatility. For example, the screw anti-rotation device may be used for screws to be attached to different types of vehicles having roofs with different inclination angles.

Preferably, the screw anti-rotation device is configured to prevent the screw from loosening when being attached to the member in that the screw anti-rotation device is contacting at least one side of a head of the screw, such as two opposing sides of the head of the screw, thereby preventing the screw from rotating. Further, the screw anti-rotation device is preferably also contacting the member so as to prevent the screw from rotating when the screw is attached to the member.

It shall be noted that all embodiments of the eleventh aspect of the present disclosure are applicable to all of the embodiments of the first, second, third, fourth, fifth, sixth, seventh, eighth, ninth and tenth aspects of the present disclosure and vice versa.

Optionally, the roof rack may comprise a roof rack foot assembly comprising a bracket, wherein the screw is configured to attach the bracket to a vehicle by use of the screw and by attaching the screw to the vehicle via an aperture in the bracket.

Optionally, the angle position with respect to the screw and the screw anti-rotation device can be varied in a range of +−5 degrees and/or the angle position with respect to the screw anti-rotation device and the member, preferably the bracket, can be varied in a range of +−5 degrees. Thereby the screw anti-rotation device may be adaptable for most, or all, vehicle types on the market.

Optionally, the screw facing surface may have a quadrilateral-shaped form, such as a square-shaped form or rectangular-shaped form, as seen from above when the screw anti-rotation device is provided at the member, such as at the aperture of the bracket, wherein at least two sides of the quadrilateral-shaped form are configured to contact a respective side of a head of the screw.

Optionally, the at least two sides may be resiliently flexible so as to allow the screw from being screwed into a hole of the vehicle but to prevent the screw from being un-screwed from the hole when provided therein.

Optionally, the screw anti-rotation device may further comprise at least one anti-rotation protruding portion provided on the screw facing away surface.

According to a twelfth aspect of the disclosure, the object is achieved by a roof rack comprising the screw anti-rotation device according to any one of the embodiments of the eleventh aspect of the present disclosure.

According to a thirteenth aspect of the disclosure, the object is achieved by a roof rack foot assembly for a roof rack, comprising, a carrier member for carrying a crossbar of the roof rack, the carrier member comprising a first support portion, a bracket configured for attachment to a fix point attachment position of a vehicle by use of at least one fixation means, such as a screw or bolt, wherein the bracket comprises a seat portion for the carrier member, wherein the seat portion is adapted to receive the first support portion of the carrier member when the carrier member is attached to the bracket, and wherein the seat portion and/or the first support portion is/are adapted so that the carrier member, in a first attachment state when the carrier member is not rigidly attached to the bracket, is movable in the seat portion by allowing the carrier member to pivot with respect to a rotational axis of the carrier member, wherein, the seat portion extends in a transverse direction of the bracket which is substantially perpendicular to the rotational axis and is delimited by two outer transverse end portions, wherein a distance in the transverse direction between the two outer transverse end portions is at least 35%, 40%, 45% or 50% of a transverse length of the bracket measured at any location, such as at each location, along the seat portion, and/or the bracket comprises a receiving location for the at least one fixation means, wherein the receiving location is offset from the seat portion, as seen in the transverse direction which is substantially perpendicular to the rotational axis of the carrier member.

By the provision of the roof rack foot assembly as disclosed herein, especially with respect to the thirteenth aspect, an improved roof rack foot assembly can be provided which enables load from the crossbar of the roof rack to be more uniformly distributed and/or balanced on the bracket. This may be achieved by the aforementioned configuration of the seat portion. Especially, with the seat portion extending in the transverse direction as defined in the above, load from the carrier member may be spread over a larger portion of the bracket, as seen in the transverse direction of the bracket. Thereby the load distribution on the bracket, and consequently also on the vehicle roof, when the bracket is mounted thereon, may be improved. This in turn may e.g. improve the service life of the roof rack foot assembly and/or reduce the risk to damage the vehicle roof. Additionally, or alternatively, load from the crossbar may also be more uniformly distributed and/or balanced on the bracket by providing the receiving location for the fixation means as mentioned in the above. For example, the fixation means may at the receiving location generate a first force acting downwardly on the bracket for attaching the bracket to the fix point attachment position. In addition, the carrier member may at the seat portion of the bracket generate a second force also acting downwardly on the bracket. By the above-mentioned configuration, the location of the first and second forces on the bracket will be separated from each other in the transverse direction of the bracket, thereby balancing the load on the bracket about an axis extending in the longitudinal extension of the bracket. This in turn may further improve the service life of the roof rack foot assembly and/or reduce the risk to damage the vehicle roof.

It shall be noted that all embodiments of the thirteenth aspect of the present disclosure is applicable to all of the embodiments of the first, second, third, fourth, fifth, sixth, seventh, eighth, ninth, tenth and eleventh and twelfth aspects of the present disclosure and vice versa.

The expression "fixation means" as used herein may also be denoted fixation member.

As mentioned in the above, a first attachment state as used herein means a state where the carrier member is connected to the bracket but has not yet been rigidly attached thereto, such as when providing a tensioning force therebetween.

Optionally, the bracket may comprise two receiving locations for respective fixation means, such as for two respective fixation means, for attachment to the fix point attachment position, wherein the two receiving locations are provided offset from each other along the direction of the rotational axis, preferably wherein each receiving location is offset from the seat portion, as seen in the transverse direction. By providing two receiving locations as in the foregoing, the load distribution and/or balance may be further improved. For example, the load on the bracket may thereby also be better balanced about an axis extending in the transverse extension of the bracket. This is achieved in that the fixation means, at each receiving location, will generate forces acting downwardly on the bracket, which forces will be balanced about said axis extending in the transverse extension of the bracket.

Optionally, the receiving location may be an aperture. Accordingly, each receiving location may be an aperture.

Optionally, the first support portion of the carrier member may be adapted to be in contact with the two outer transverse end portions when the carrier member is rigidly attached to the bracket, corresponding to a second attachment state.

Optionally, the bracket may comprise a top side facing the carrier member when the carrier member is attached to the bracket, wherein the seat portion and the receiving location are provided on the top side of the bracket. This implies a simplified bracket configuration, reducing e.g. the cost for manufacturing the bracket and/or making the bracket more flexible, allowing it to be used on different vehicle roofs without the need to modify the design. Further, such configuration may also simplify the attachment procedure of attaching the bracket to the fix point attachment position. In particular, by providing the seat portion and the receiving location on the top side as defined in the above, only one side is used for the seat portion and for the receiving location. In prior art designs, the seat portion and the receiving location have instead been provided on different surfaces, where e.g. one surface face upwardly and another one face away from the vehicle in the vehicle's transverse direction when attached thereto. Thus, the two respective sides need to be inclined relative each other to conform to the shape of the vehicle roof, thereby making the prior art design less flexible.

Optionally, the receiving location may be partly, or completely, located within two outer longitudinal end portions of the seat portion, as seen in a longitudinal direction of the bracket corresponding to the direction of the rotational axis. This may provide a more compact bracket design, especially as seen in the longitudinal direction of the bracket. Further, it is also beneficial to provide the receiving location and the seat portion close to each other yet separated in the transverse direction. This implies a more robust and/or compact configuration whilst still improving the load distribution and/or balance.

Optionally, the first support portion of the carrier member may comprise a curved outer surface which is adapted to be in contact with the seat portion when the carrier member is attached to the bracket, wherein the carrier member, by use of the curved outer surface, is movable in the seat portion by allowing the carrier member to pivot with respect to the rotational axis of the carrier member in the first attachment state. Thereby, the position of the carrier member may be more easily adjusted with respect to an inclination of the vehicle roof when the roof rack foot assembly is attached thereto. Still optionally, a radial distance from the rotational axis to any point, or to each point, on the outer curved surface which is adapted to be in contact with the seat portion is at least 40%, 50%, 60%, 70% or greater than the transverse length of the bracket measured at any location along the seat portion. In particular, it has been realized that by providing the curved surface with such a radius, the load distribution and/or balance may be further improved, since the load will thereby be spread over a larger area.

Optionally, the bracket may be configured such that its longitudinal direction, corresponding to the direction of the rotational axis, is mainly extending in a travelling direction of the vehicle when the roof rack foot assembly is attached to the vehicle.

Optionally, the seat portion may comprise a first and a second support surface, preferably spaced apart from each other, such as spaced apart in the longitudinal direction of the bracket, and wherein the carrier member comprises the first support portion and a second support portion, wherein each support surface is adapted to receive the respective first and second support portion of the carrier member when the carrier member is attached to the bracket. Thereby a further improved load distribution and/or balance on the bracket may be provided.

Optionally, the roof rack foot assembly may further comprise an engagement member connected to the carrier member for rigidly attaching the carrier member to the bracket, wherein the engagement member is adapted to attach the carrier member to the bracket by engagement with an engagement portion of the bracket, preferably by clamping the carrier member to the bracket by applying a pulling force therebetween.

Optionally, the bracket may comprise a top side facing the carrier member and a bottom side provided on an opposite side with respect to the top side, wherein the seat portion is provided on the top side of the bracket, and wherein the engagement portion is positioned above the seat portion, as seen when the roof rack foot assembly is mounted on a vehicle positioned on a flat horizontally extending surface. This may ease the attachment procedure of the carrier member to the bracket. It may further reduce the risk of damaging or scratching the vehicle roof when attaching the carrier member to the bracket.

Optionally, the bracket may comprise a top side facing the carrier member and a bottom side provided on an opposite side with respect to the top side, and wherein the engagement portion is positioned on the bottom side of the bracket.

Optionally, the seat portion may be at least one slot, aperture or immersed portion on a surface of the bracket, or any combinations therebetween.

According to a fourteenth aspect of the disclosure, the object is achieved by a roof rack for a vehicle comprising at least one roof rack foot assembly according to any one of the embodiments of the thirteenth aspect of the disclosure and at least one crossbar.

According to a fifteenth aspect, the object is achieved by a cover attachment device for a bracket for a roof rack foot assembly for a roof rack for a vehicle, comprising:
  a cover having:
  a bracket facing away surface adapted to cover the bracket when the cover attachment device is attached to the bracket; and
  a bracket facing surface adapted to face the bracket when the cover attachment device is attached to the bracket;
  the cover attachment device further comprising:
  a lock member configured to lock the cover attachment device to the bracket.

It shall be noted that all embodiments of the fifteenth aspect of the present disclosure is applicable to all of the embodiments of the ninth aspect of the present disclosure and vice versa.

By the provision of the cover attachment device according to the fifteenth aspect, an improved cover attachment device is provided which ensures that it is reliably locked to the bracket, thereby reducing the risk of theft.

Optionally, the cover attachment device may be adapted such that the lock member is movable between a locked position where the cover attachment device is locked to the bracket and an unlocked position where the cover attachment device is removable from the bracket. Thereby a user can easily lock and unlock the cover attachment device, enabling easy removal and also preventing theft when locked.

Optionally, the cover attachment device may be adapted such that the lock member is rotatable with respect to a lock member rotational axis between the locked position and the unlocked position. Thereby the user can easily provide the lock member from the unlocked position to the locked position, and vice versa.

Optionally, the cover attachment device may be adapted such that the lock member is rotatable with respect to a lock member rotational axis between the locked position and an intermediate locked position, and movable in the direction of the lock member rotational axis between the intermediate locked position and the unlocked position. Thereby an unlocking procedure may be further improved in that it requires a two-step procedure, first a rotation and subsequently a movement in the direction of the lock member rotational axis. Thereby, the risk of unwanted or accidental removal of the cover attachment device may be reduced. In particular, even if the user has forgotten to rotate the lock member to the locked position, the cover attachment device may be prevented from being removed/released if it is in the intermediate locked position. Still optionally, the cover attachment device may be adapted such that the lock member is prevented from being moved in the direction of the lock member rotational axis when being in the locked position.

Optionally, the lock member may be prevented from being moved in the direction of the lock member rotational axis when being in the locked position by the lock member engaging with a stopping surface of the cover.

Optionally, the cover attachment device may be adapted such that the lock member is spring biased from the unlocked position towards the intermediate locked position in the direction of the lock member rotational axis. Thereby it can be ensured that the lock member will not accidentally remain in the unlocked position. As such, the risk of unwanted removal/release of the cover attachment device can be reduced.

Optionally, the bracket facing away surface and/or the lock member may be adapted such that an outwardly facing surface of the lock member protrudes with respect to the bracket facing away surface when the lock member is in the intermediate locked position. Thereby the user can easily determine, e.g. visually, that the lock member is not in the locked position, but rather in the intermediate locked position. Purely by way of example, this may be achieved in the bracket facing away surface is inclined with respect to the outwardly facing surface of the lock member when being in the intermediate locked position. Further, the bracket facing away surface may be flush with the outwardly facing surface of the lock member when being in the locked position. Accordingly, the bracket facing away surface and/or the lock member may be adapted such that the outwardly facing surface of the lock member is flush with the bracket facing away surface when the lock member is in the locked position.

Optionally, the lock member and/or the cover may be adapted such that the lock member is prevented from being rotated from at least one of the locked and unlocked/intermediate locked positions towards the other position until a rotational torque acting on the lock member exceeds a torque threshold limit, preferably a predefined torque threshold limit. Thereby it can be ensured that the cover attachment device is not accidentally removed/released from the bracket.

Optionally, the lock member may on an outwardly facing surface thereof comprises a key or tool receiving portion adapted to rotationally lock a key or tool to the lock member when the key or tool is connected to the key or tool receiving portion. Thereby the user may easily lock/unlock the cover attachment device by use of the key or tool. This may also reduce the risk of theft, since the lock member may only be rotated by use of the key or tool.

Optionally, the cover attachment device may further comprise at least one protruding portion on an inside of the cover defined by the bracket facing surface, wherein the at least one protruding portion is configured to attach the cover attachment device to the bracket by a snap-fit connection. Still optionally, the lock member may be arranged to prevent the at least one protruding portion to release the snap-fit connection to the bracket when the lock member is in the locked position.

Optionally, the cover attachment device may further comprise an intermediate resilient element biasing the lock member towards the locked position/intermediate locked position and configured to lock the cover attachment device to the bracket. For example, the intermediate resilient element may be adapted such that the lock member is spring biased from the unlocked position towards the intermediate locked position in the direction of the lock member rotational axis. The intermediate resilient element may be a separate element attached to the cover.

Another object of the present disclosure is to provide an improved roof rack bracket for a roof rack foot.

According to a sixteenth aspect, this and other objects are achieved by a roof rack bracket for a roof rack foot, comprising:
  a vehicle attachment portion configured for attachment to a fix point attachment position of a vehicle by use of at least one fixation means;
  a roof rack foot attachment portion comprising a first and a second engagement portion adapted for engagement with a respective first and second clamping member of the roof rack foot.

It shall be noted that all embodiments of the sixteenth aspect of the present disclosure may be applicable to all embodiments of the other aspects of the present disclosure and vice versa.

By the provision of the roof rack bracket according to the sixteenth aspect, an improved roof rack bracket is provided which is adapted for a roof rack foot which can be attached to a fixed roof rail of a vehicle, also referred to as a guide rail in the above. In particular, the roof rack bracket is adapted to be clamped by two clamping members of the roof rack foot which otherwise could clamp around a fixed vehicle roof rail which extends on a roof of the vehicle in its travelling direction. It has namely been realized that fixed vehicle roof rails are not always suitable for clamping, such as if the fixed rail is made of relatively weak material, e.g. a polymer. Thereby, by providing a roof rack bracket which resembles the shape of the fixed vehicle roof rail, the roof rack foot can be clamped thereto instead. The roof rack bracket is hence preferably made of a more rigid material, such as steel.

Optionally, the first and second engagement portions may be arranged and/or formed on the roof rack bracket such that, when the roof rack foot is clamped to the bracket, the first engagement portion together with the first clamping member generates a clamping force at an interface between the second engagement portion and the second clamping member, and the second engagement portion together with the second clamping member generates a clamping force at an interface between the first engagement portion and the first clamping member. Thereby, the first and the second engagement portions cooperate so as to generate clamping forces, implying a simplified design with e.g. fewer clamping surfaces on the roof rack bracket.

Optionally, a distance between the first and second engagement portions may be at least 10 mm, 15 mm, 20 mm, 25 mm or 30 mm. Still optionally, the distance may be less than 70 mm, 60 mm, 50 mm or 40 mm. Thereby, the roof rack bracket may be more adapted to a size of a fixed vehicle roof rail, i.e. the distance may be substantially similar to a width of the fixed vehicle roof rail, as seen in the transverse direction of the vehicle.

Optionally, any one of the first and second engagement portions may be one or more slot(s), opening(s), corner portion(s), cut-out(s) or groove(s) for engaging with the respective first and second clamping members, or any combinations therebetween.

Optionally, the roof rack bracket may comprise a first and a second flange which are connected and angled relative each other, wherein the first engagement portion is located on the first flange and the second engagement portion is located on the second flange and/or in the vicinity of a connection interface between the first flange and the second flange. Thereby, a simplified configuration may be provided, implying reduced manufacturing cost. Still optionally, the vehicle attachment portion may be located on the second flange. In addition, and optionally, the first and second flanges may together form a substantially L-shaped cross-sectional profile. Thereby, the roof rack bracket may be better adapted to the shape of the fixed vehicle roof rail, implying e.g. reduced noise and improved aerodynamic properties when mounted to the fix point attachment position.

Optionally, the connection interface may comprises a first corner portion between the first and the second flange, wherein the first flange comprises a second opposing corner portion and/or edge with respect to the first corner portion, wherein the first engagement portion is located in the vicinity of the second opposing corner portion and/or edge. Still optionally, the first corner portion and the second opposing corner portion and/or edge may define a rail profile for the first and second clamping members, which rail profile is intended to be directed substantially in a travelling direction of the vehicle when the roof rack bracket is attached to the vehicle. A rail profile as used herein means a profile resembling, or being identical to, a portion of a fixed vehicle roof rail, wherein the first and second clamping members can be clamped to the roof rack bracket along the rail profile.

Optionally, the second engagement portion may be formed by the first corner portion bulging outwardly from the connection interface, thereby forming a grip surface for the second clamping member. The first corner portion may preferably bulge outwardly in a transverse direction of the vehicle, when the roof rack bracket is mounted thereto. Accordingly, the second engagement portion may be provided by forming the connection interface with such bulging portion, implying a cost-effective design.

Optionally, the roof rack bracket may be a sheet-formed member, such as a sheet metal member.

Optionally, the vehicle attachment portion may comprise a first vehicle facing side configured to face a roof rack bracket attachment portion of the vehicle when the roof rack bracket is attached thereto and a second opposite side configured to face away from the roof rack bracket attachment portion when the roof rack bracket is attached thereto, wherein the second opposite side comprises a protruding member for inhibiting mounting of the bracket with the second opposite side facing the roof rack bracket attachment portion. Accordingly, the risk of attaching the roof rack bracket incorrectly to the vehicle can be reduced. An incorrectly attached roof rack bracket may be a safety issue, resulting in that the roof rack is not correctly mounted to the vehicle. An incorrectly attached roof rack bracket may further result in increased noise and wind resistance when the roof rack bracket is mounted to the vehicle.

Optionally, the vehicle attachment portion may comprise at least one aperture for receiving the fixation means.

According to a seventeenth aspect, the object is achieved by a roof rack foot assembly for a roof rack comprising a roof rack bracket according to any one of the embodiments of the sixteenth aspect and a roof rack foot comprising a first and a second clamping member.

According to an eighteenth aspect, the object is achieved by a roof rack for a vehicle comprising the roof rack bracket according to any one of the embodiments of the sixteenth aspect or the roof rack foot assembly according to the seventeenth aspect, and at least one crossbar.

According to a nineteenth aspect, the object is achieved by a vehicle roof rail assembly, comprising:
- a roof rail fixedly attached to the roof of a vehicle;
- the roof rack bracket according to any one of the embodiments of the sixteenth aspect;
- wherein the roof rail comprises a roof rack bracket attachment portion for attachment of the roof rack bracket by use of at least one fixation means, such as a screw or bolt; and wherein the vehicle attachment portion is adapted to be attached to the roof rack bracket attachment portion.

Optionally, the roof rack bracket attachment portion may be provided on a side surface of the roof rail facing away from the roof rail in a transverse direction of the vehicle and/or may be provided on an upwardly facing surface facing upwardly with respect of the vehicle.

BRIEF DESCRIPTION OF THE DRAWINGS

With reference to the appended drawings, below follows a more detailed description of embodiments of the disclosure cited as examples.

In the drawings.

Figure 1:
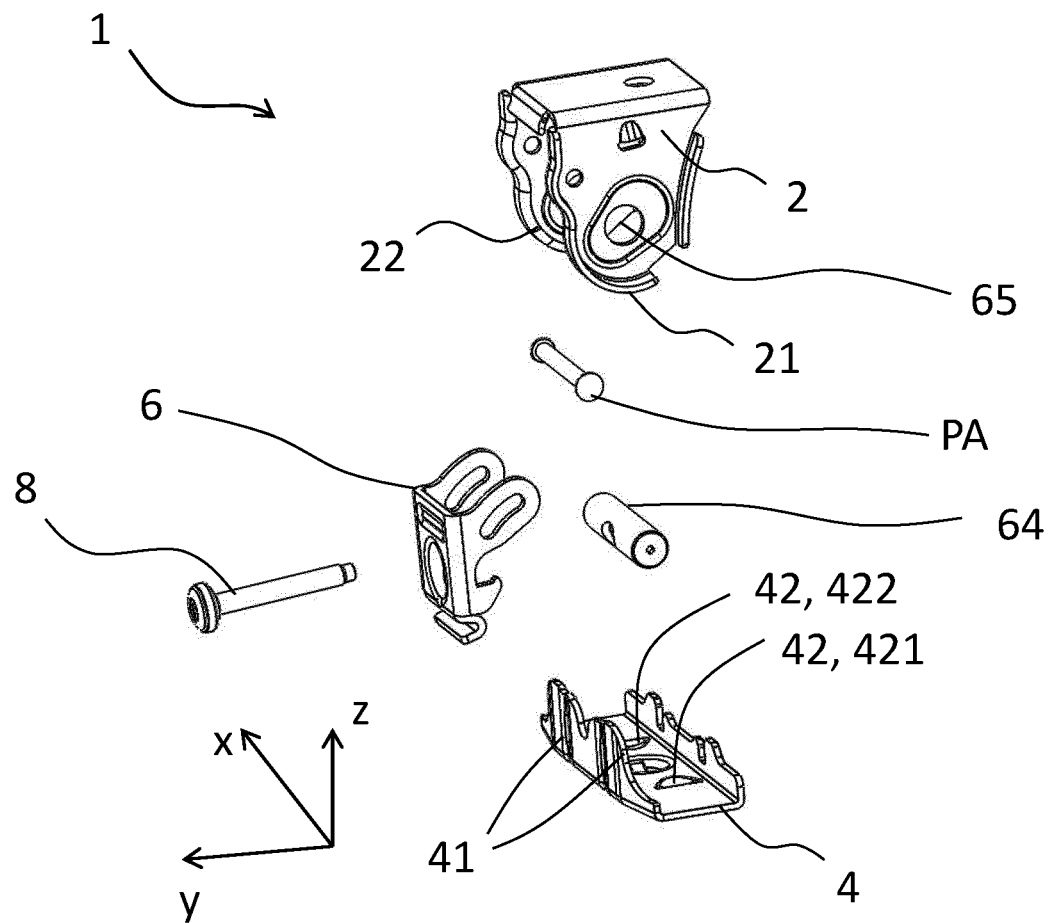
FIG. 1 shows an exploded view of a roof rack foot assembly according to an example embodiment of the present disclosure.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters refer to like elements throughout the description, unless expressed otherwise.

DETAILED DESCRIPTION OF EXAMPLE EMBODIMENTS OF THE DISCLOSURE

Figure 2:
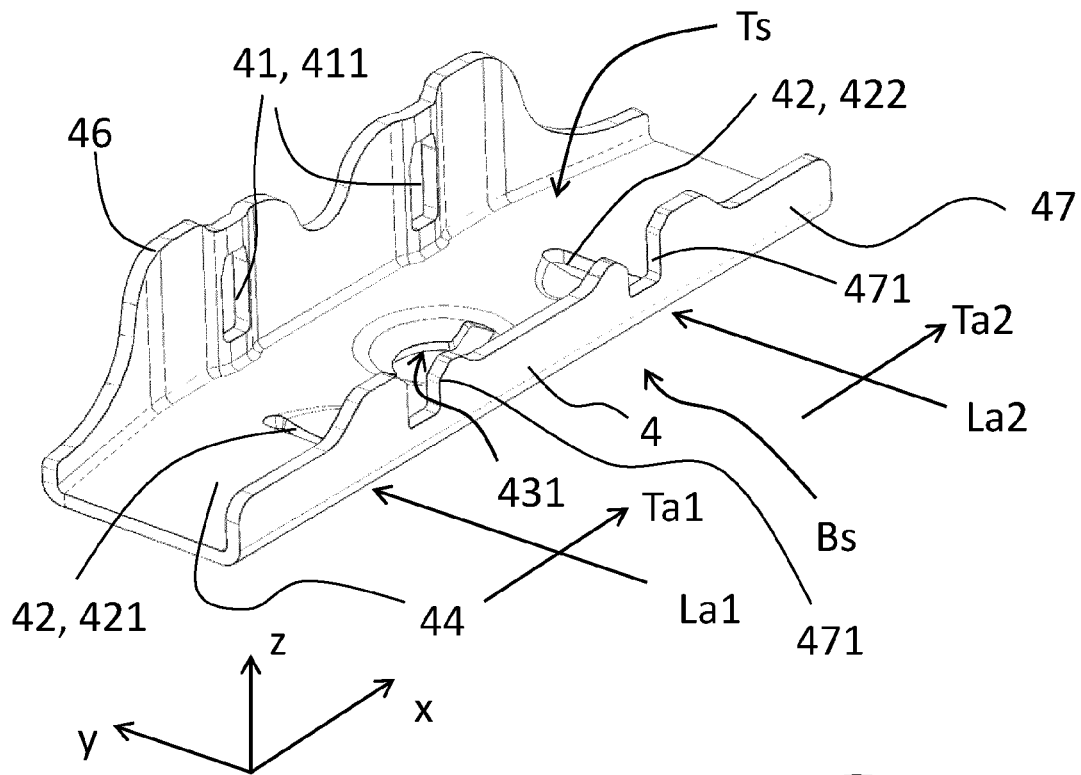
FIG. 2 shows a perspective view of a bracket according to an example embodiment of the present disclosure.

With respect to e.g. FIGS. 1 and 2, a roof rack foot assembly 1 for a roof rack 100 (see FIG. 4) according to the present disclosure is shown. The roof rack foot assembly 1 comprises a carrier member 2 for carrying a crossbar 3 (shown in e.g. FIG. 4) of the roof rack 100. The carrier member 2 comprises a first 21 and a second 22 support portion. The roof rack foot assembly 1 further comprises a bracket 4 configured for attachment to a fix point attachment position of a vehicle by use of at least one fixation means 5 (see e.g. FIG. 4), which in the shown embodiment is a screw, wherein the bracket 4 comprises an engagement portion 41 and a seat portion 42 for the carrier member 2. As mentioned in the above, the fixation means 5 may also be denoted a fixation member 5.

According to the first aspect of the present disclosure, the seat portion 42 comprises a first 421 and a second 422 support surface, which in the shown embodiments are spaced apart from each other. Each support surface 421, 422 is adapted to receive the respective first 21 and second 22 support portion of the carrier member 2 when the carrier member 2 is attached to the bracket 4. Further, each support surface 421, 422 of the seat portion 42 has a longitudinal extension along a respective longitudinal axis La1, La2 thereof, wherein the first and second support surfaces 421, 422 are arranged on the bracket 4 so that their longitudinal axes La1, La2 are provided parallel, or at least substantially parallel, with respect to each other. Substantially parallel as disclosed herein mean that the directions of the longitudinal axes La1, La2 may deviate from each other by a maximum angle of +−15 degrees, +−10 degrees or +−5 degrees.

In the embodiment shown in e.g. FIG. 2, the first and a second support surfaces 421, 422 are provided by slots in the bracket 4. Hence, according to an example embodiment, the carrier member 2 may be supported in slots of the bracket 4, which may improve the support of the carrier member 2. Hence, the first and second support portions 21, 22 may be provided in the slots. The longitudinal extension of the slots may thereby be provided along the transverse axis y of the bracket 4. Alternatively, the longitudinal extension of the slots may be provided along the longitudinal axis x of the bracket 4.

Additionally, or alternatively, the first and second support surfaces 421, 422 may be provided as, and/or complemented by, immersed portions on the bracket 4. Immersed portions 4213, 4223 in combination with slots are shown in e.g. FIG. 10a. As shown in the embodiment in FIG. 10a, the slots 421, 422 may also define inner end portions for the first and second support portions 21, 22, which inner end portions restrict the carrier member from moving in a direction along the longitudinal axis x of the bracket 4 when the first and second support portions are provided therein.

The roof rack foot assembly 1 may, as shown in e.g. FIG. 1, further comprise an engagement member 6 associated with the carrier member 2 which is adapted to clamp the carrier member 2 to the bracket 4 by applying a pulling force therebetween.

Further, as also shown in e.g. FIG. 1 and FIG. 2, the first and second support surfaces 421, 422 of the seat portion 42 and the first and second support portions 21, 22 of the carrier member 2 may be adapted to transfer loads at least in a vertical direction z, as seen when the roof rack foot assembly is attached to a vehicle positioned on a flat horizontally extending surface. The direction z, which herein is part of a Cartesian coordinate system, refers to the vertical direction.

Further, as e.g. shown in FIG. 2, each support surface 421, 422 of the seat portion 42 may have a transverse extension along a respective transverse axis thereof Ta1, Ta2, wherein the respective transverse axis Ta1, Ta2 is perpendicular to its respective longitudinal axis La1, La2, and wherein each support surface 421, 422 has a length in its transverse extension which is shorter than a length in its longitudinal extension, as shown in e.g. FIG. 2. Alternatively, each support surface 421, 422 may have a length in its transverse extension which is equal to, or substantially equal to, a length in its longitudinal extension. The length in the transverse extension of each support surface 421, 422 may alternatively be expressed as a width of each support surface 421, 422.

Figure 4:
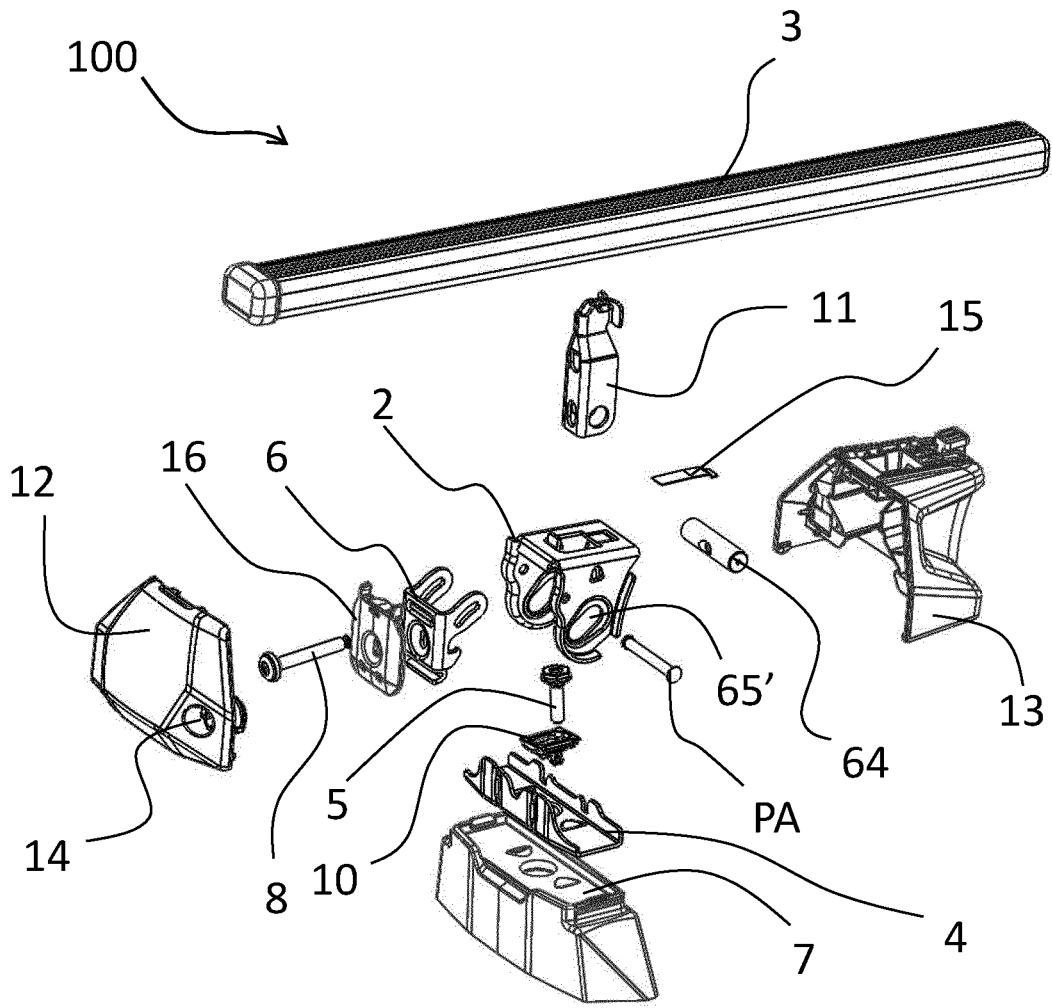
FIG. 4 shows an exploded view of a roof rack comprising a roof rack foot assembly according to an example embodiment of the present disclosure.

The roof rack foot assembly 1 may, as e.g. shown in FIG. 4, further comprise a foot pad member 7 for protecting a vehicle roof (not shown), wherein the foot pad member 7 is adapted to be positioned in-between the bracket 4 and the vehicle when the bracket 4 is attached to the fix point attachment position, wherein the bracket 4 and the foot pad member 7 may be provided as separate components or may be integrated as a one-piece member. In the embodiment shown in FIG. 4, the bracket 4 and the foot pad member 7 are provided as separate components.

As shown in e.g. FIG. 2, the bracket 4 may comprise at least one receiving location 431 for at least one of the fixation means 5 (shown in FIG. 4). In the shown embodiment, the at least one receiving location 431 is located in an area, which here is a central area, of the bracket 4 in-between the first and second support surfaces 421, 422. A central area as mentioned herein may be defined as the area at the center, or close to the center, of the bracket 4, as seen in a plane defined by a longitudinal axis x and a transverse axis y of the bracket 4. The longitudinal axis x and the transverse axis y is here also part of the aforementioned Cartesian coordinate system.

Figure 12:
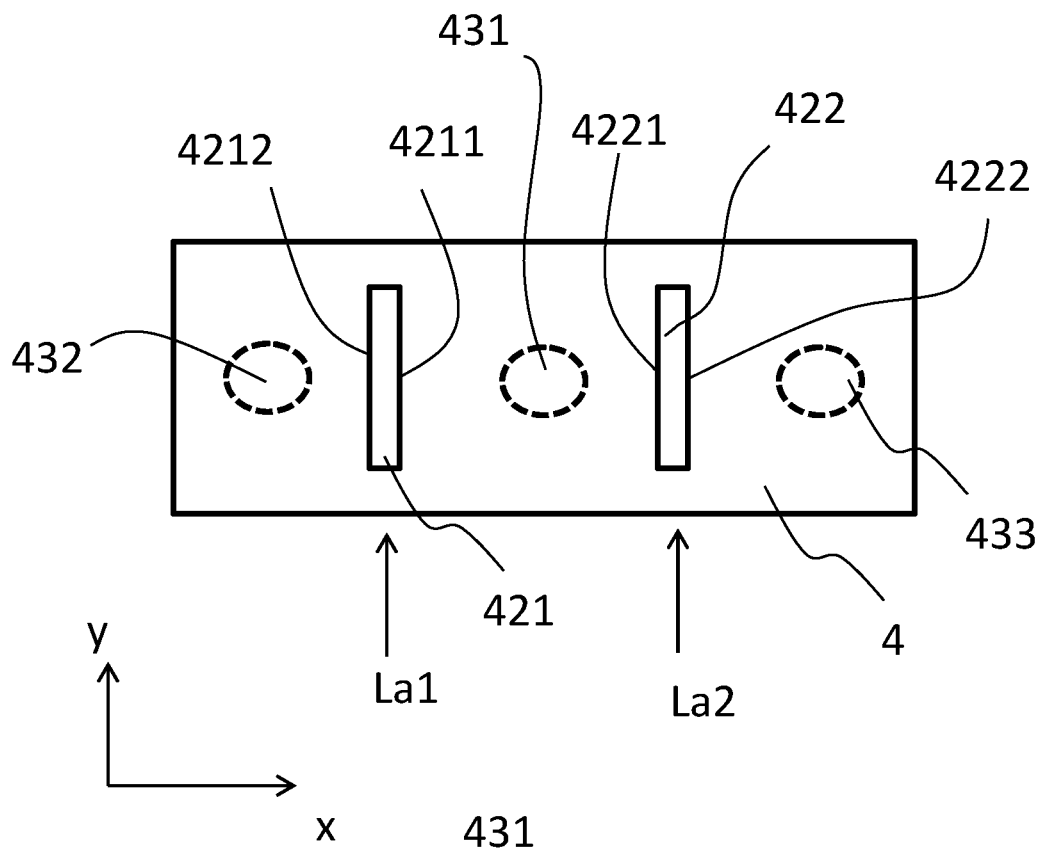
FIG. 12 shows a schematic view of a bracket viewed from above according to an example embodiment of the present disclosure.

The first and second support surfaces 421, 422 of the bracket 4 may, as shown in FIG. 12, comprise a respective first 4211, 4221 and second 4212, 4222 longitudinal side, wherein the first longitudinal side 4211 of the first support surface 421 faces the first longitudinal side 4221 of the second support surface 422, and wherein at least one receiving location 432, 433 is located outside and facing one of the second longitudinal sides 4212, 4222. Hence, by the provision of the present disclosure, especially with respect to the first aspect thereof, more space for receiving locations is made available. The receiving locations are preferably apertures in the bracket 4 into which e.g. screws 5 may be provided.

With respect to e.g. FIGS. 2 and 12, it is shown that the bracket 4 may have a longitudinal extension along a longitudinal axis x thereof and a transverse extension along a transverse axis y thereof, wherein the longitudinal axis x of the bracket and the transverse axis y of the bracket are perpendicular to each other, and wherein the bracket 4 is configured so that the longitudinal axis x thereof mainly coincides with a travelling direction of the vehicle when the roof rack foot assembly 1 is attached to the vehicle. The longitudinal axes La1, La2 of the first and second support surfaces 421, 422 are extending in, or at least substantially extending in, the same direction as the direction of the transverse axis y of the bracket 4. It shall here be noted that according to an embodiment, the longitudinal axes La1, La2 of the first and second support surfaces 421, 422 may extend in a direction which deviates from the direction of the transverse axis y, such as by +−10 degrees with respect to the transverse axis y, as e.g. seen in a plane defined by the longitudinal axis x and the transverse axis y. Thereby, the bracket 4 may for example be adapted for different types of vehicles, and different types of vehicle roofs having different shapes and/or dimensions.

Figure 13:
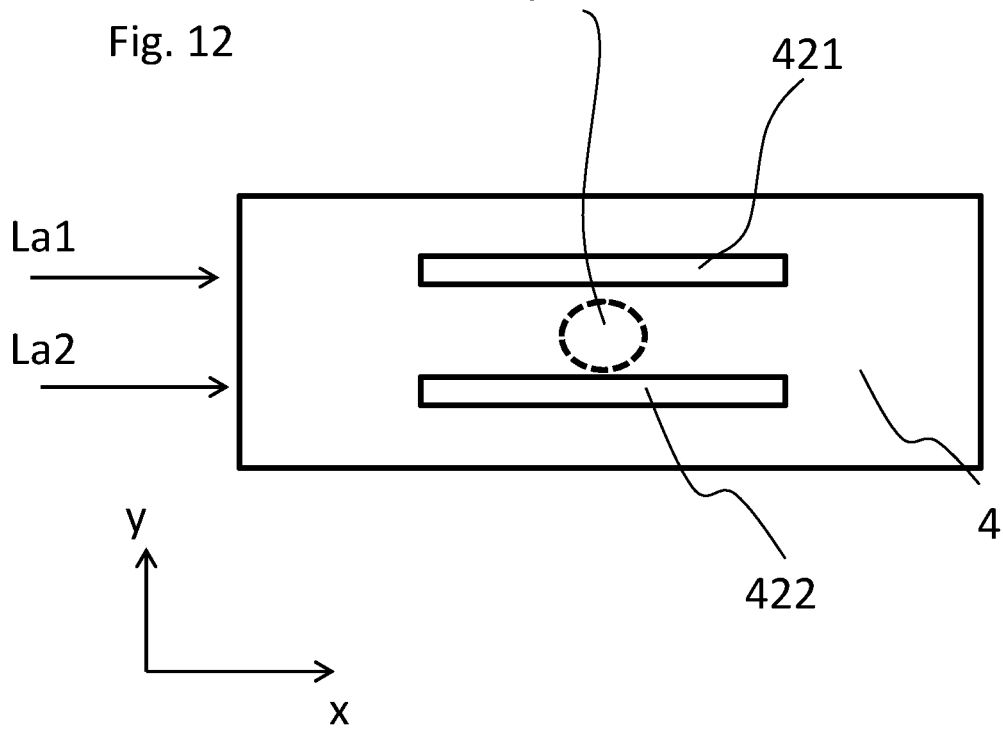
FIG. 13 shows a schematic view of a bracket viewed from above according to another example embodiment of the present disclosure.

With respect to FIG. 13, another embodiment of the bracket 4 is shown. The bracket 4 has a longitudinal extension along a longitudinal axis x thereof and a transverse extension along a transverse axis y thereof, wherein the longitudinal axis x of the bracket 4 and the transverse axis y of the bracket 4 are perpendicular to each other, and wherein the bracket 4 is configured so that the longitudinal axis x thereof mainly coincides with a travelling direction of the vehicle when the roof rack foot assembly is attached to the vehicle, wherein the longitudinal axes La1, La2 of the first and second support surfaces 421, 422 are extending in, or at least substantially extending in, the same direction as the direction of the longitudinal axis x of the bracket 4. Thereby a receiving location 431 may be provided in an area in-between the two support surfaces 421, 422 as shown in FIG. 13.

Figure 5:
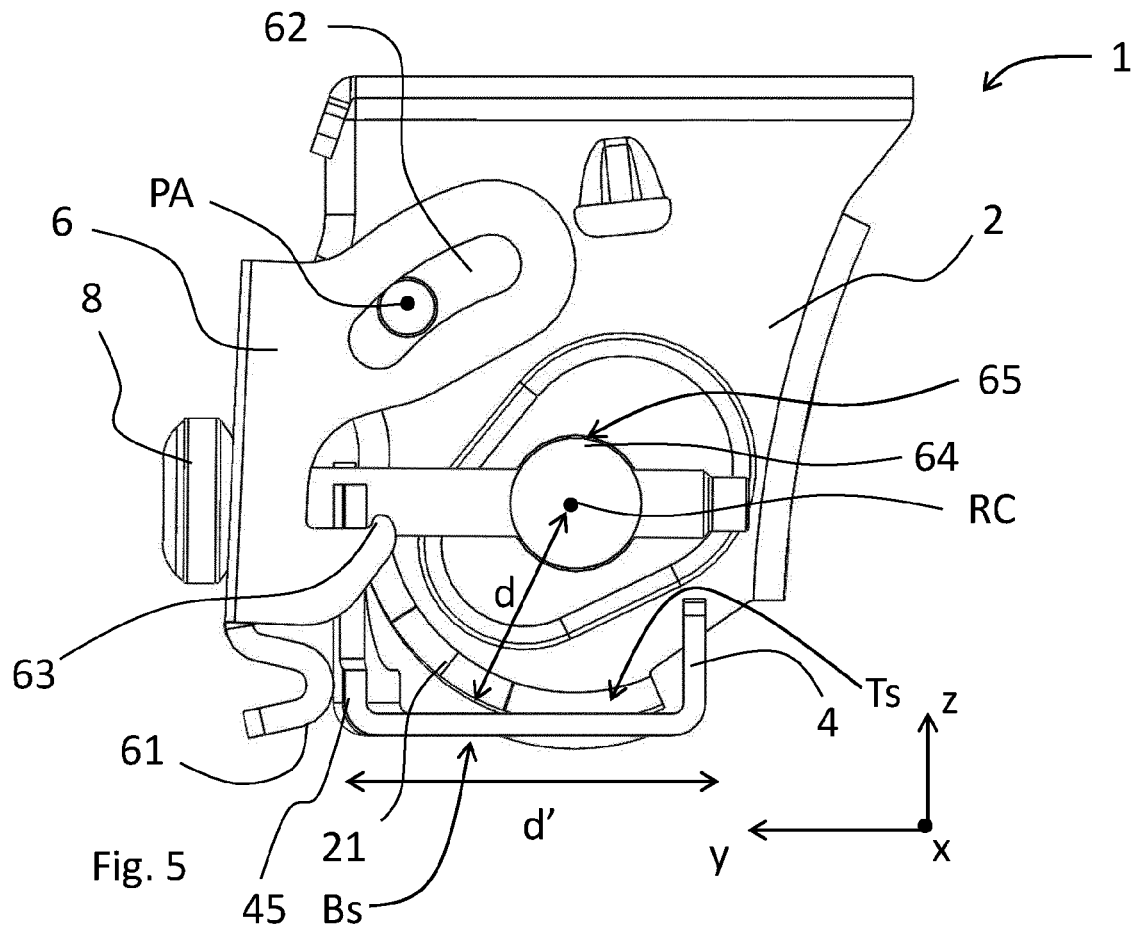
FIG. 5 shows a sectional view of a roof rack foot assembly according to an example embodiment of the present disclosure.

With respect to e.g. FIGS. 1, 2 and 5, it is shown that the first and second support portions 21, 22 of the carrier member 2 and the first and second support surfaces 421, 422 of the seat portion 42 may be adapted so that the carrier member 2, in a first attachment state, is movable in the seat portion 42 by pivoting the carrier member, preferably with respect to a rotational axis RC of the carrier member 2, when the carrier member 2 is not rigidly attached to the bracket 4. FIG. 5 shows a sectional view of the roof rack foot assembly 1, which is defined by the transverse axis y and the z-axis, which axis may refer to the vertical axis when the roof rack foot assembly 1 is mounted on a vehicle as mentioned in the above. The z-axis may also refer to a height direction of the roof rack foot assembly 1. The rotational axis RC is here parallel with the x-axis, i.e. the longitudinal axis x of the bracket 4. FIG. 5 further shows a carrier member fixation means 8 which is arranged for rigidly attaching the carrier member 2 to the bracket 4. The carrier member fixation means 8 is here in the form of a threaded screw. The first attachment state does thereby here mean that the carrier member fixation means 8 has not yet been tightened, i.e. when the carrier member 2 is not rigidly attached to the bracket 4. By pivoting the carrier member 2 with respect to the bracket 4 about the rotational axis RC, the roof rack foot assembly 1 can be adjusted to conform with different vehicle roofs having different shapes and/or dimensions. The carrier member fixation means 8 further connects the engagement member 6 to the carrier member 2 via a connection member 64 which is extending along the rotational axis RC. The connection member 64 as shown is here a pin member which comprises a threaded aperture for the carrier member fixation means 8.

With respect to e.g. FIG. 2, it is shown that the engagement portion 41 may be positioned vertically above the first and second support surfaces 421, 422, as seen when the roof rack foot assembly 1 is mounted on a vehicle positioned on a flat horizontally extending surface. Hence, the engagement portion 41 may be positioned vertically above the first and second support surfaces 421, 422, as seen in the direction of the z-axis.

Further, as e.g. shown in FIGS. 1 and 2, the bracket 4 may be a sheet-formed member, such as a sheet metal member, wherein the first and second support surfaces 421, 422 are provided on a main surface 44 of the sheet-formed member. More specifically, as shown, the bracket 4 may have an L-shaped and/or U-shaped cross section, which cross section is defined by a plane which is perpendicular to the longitudinal axis x of the bracket 4, which axis is preferably intended to at least mainly extend in a travelling direction of the vehicle when the roof rack foot assembly 1 is attached to the vehicle. The engagement portion 41 is preferably provided on one of the vertically extending walls 46 which extend from the main surface 44, and which is facing away from the vehicle, when the bracket 4 is attached to the vehicle. The vertically extending wall is here a first vertically extending wall 46 and may be denoted a front wall, and may be facing away from the vehicle in the transverse direction y when the bracket 4 is attached to the vehicle.

Further, according to an embodiment, the bracket 4 may comprise a second vertically extending wall 47 opposing the first vertically extending wall 46, seen in the transverse direction y. Still further, according to an embodiment of the present disclosure, the second vertically extending wall may be arranged as an engagement portion for a cover attachment portion 9 as disclosed herein. Still further, according to another embodiment of the present disclosure, the second vertically extending wall may further comprise carrier member slots 471 for providing room for the carrier member 2. The second vertically extending wall 47 may herein be denoted a rear wall.

Figure 6:
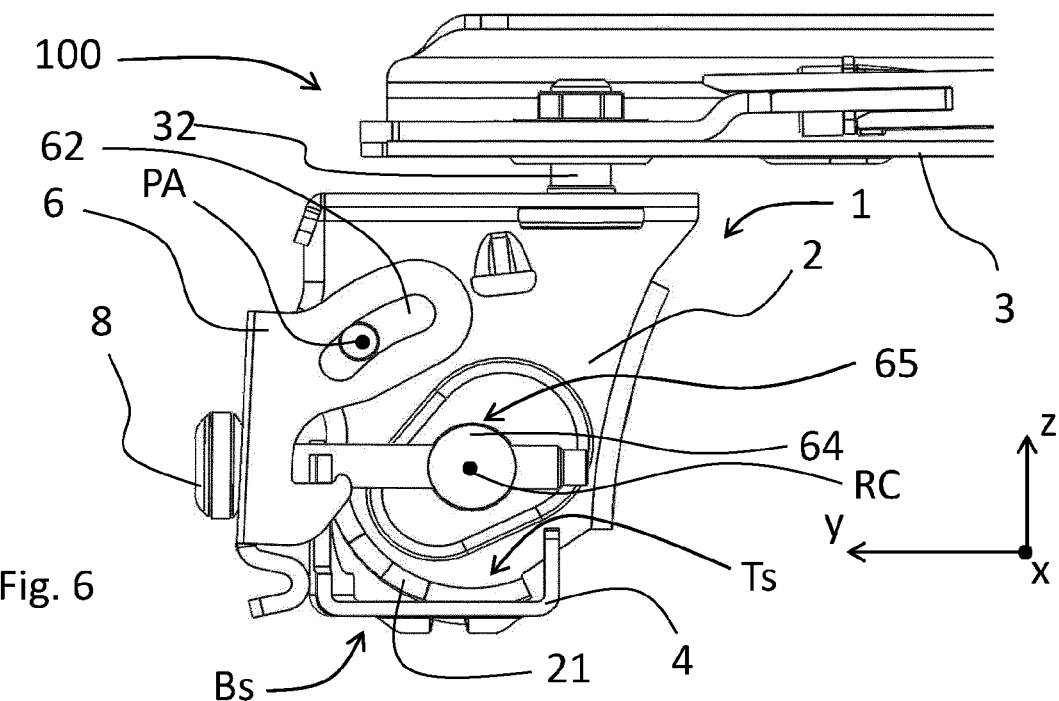
FIG. 6 shows a sectional view of a roof rack comprising the roof rack foot assembly as shown in FIG. 5 according to an example embodiment of the present disclosure.

With respect to e.g. FIGS. 5 and 6 and 2, a roof rack foot assembly 1 for a roof rack 100 is shown. FIG. 6, similar to FIG. 5, shows a sectional view of the roof rack foot assembly 1, which is a plane defined by the aforementioned x-axis and y-axis. The roof rack foot assembly 1 comprises a carrier member 2 for carrying a crossbar 3 of the roof rack 100 and a bracket 4 configured for attachment to a fix point attachment position of a vehicle by use of a fixation means 5, such as a screw or bolt. The roof rack foot assembly further comprises an engagement member 6 connected to the carrier member 2 for rigidly attaching the carrier member 2 to the bracket 4. The bracket 4 comprises an engagement portion 41 and a seat portion 42 for the carrier member 2, wherein the engagement member 6 is adapted to attach the carrier member 2 to the bracket 2 by engagement with the engagement portion 41 of the bracket 4. Further, the carrier member 2 and the seat portion 42 are adapted so that the carrier member 2, in a first attachment state, is movable in the seat portion 42 by pivoting the carrier member 2 with respect to a rotational axis RC of the carrier member 2 when the carrier member 2 is not rigidly attached to the bracket 4, as also mentioned in the above. Further, the roof rack foot assembly 1, as also mentioned in the above, comprises a carrier member fixation means 8, such as a screw or bolt, adapted for providing a secure engagement between the engagement member 6 and the engagement portion 41 so that the carrier member 2 is rigidly attached to the bracket 4. Still further, the roof rack foot assembly 1 is configured so that the carrier member fixation means 8 extends through, or in the proximity of, the rotational axis RC, see e.g. FIGS. 5 and 6. Hence, as shown, the carrier member fixation means 8 does here extend through the rotational axis RC, which axis may be parallel to, or at least substantially parallel to, the x-axis.

Further, as shown in e.g. FIG. 5, the carrier member 2 may have at least one curved outer surface 21 which is adapted to be in contact with the seat portion 42 when being attached to the bracket 4, and wherein the at least one curved outer surface 21, in the first attachment state, is configured to be movable in the seat portion 42 by pivoting the carrier member with respect to the rotational axis RC of the carrier member 2, wherein a distance d from the rotational axis RC to any point on the outer curved surface 21 which is adapted to be in contact with the seat portion 42 is at least 40%, 50%, 60%, 70% or greater than a transverse length d' of the bracket 4, as seen along a transverse extension of the bracket, i.e. the direction extending along the transverse axis y. In the shown embodiment, the seat portion's longitudinal axes La1, La2 extends along the transverse axis y of the bracket 4, as mentioned in the above. More particularly, the seat portion 42 has a main extension in the transverse extension of the bracket 4. A similar configuration as in the above may also be provided for the second support portion 22 of the carrier member 2.

Still further, the transverse extension of the bracket 4 is extending along the transverse axis y thereof, and the bracket 4 has a longitudinal extension along the longitudinal axis x thereof, wherein the longitudinal axis x of the bracket 4 and the transverse axis y of the bracket 4 are perpendicular to each other, and wherein the longitudinal axis x of the bracket 4 may be intended to at least mainly extend in a travelling direction of the vehicle when the roof rack foot assembly 1 is attached to the vehicle.

Figure 3:
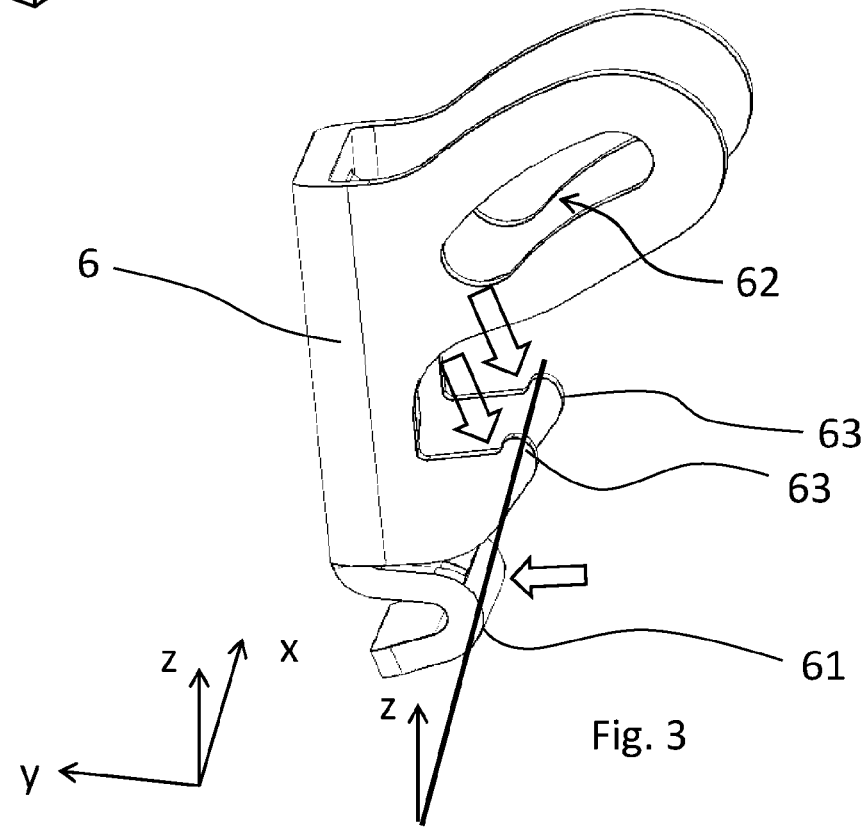
FIG. 3 shows a perspective view of an engagement member according to an example embodiment of the present disclosure.

With respect to e.g. FIGS. 3 and 5, it is shown that the engagement member 6 may comprise a bracket support surface 61 and the bracket 4 may comprise an engagement member support surface 45, wherein the bracket support surface 61 and the engagement member support surface 45 are adapted to contact each other and to provide a first tension force therebetween when the carrier member 2 is rigidly attached to the bracket 4, which first tension force is mainly directed in a horizontal direction, as seen when the roof rack foot assembly 1 is mounted on a vehicle positioned on a flat horizontally extending surface. As shown, the horizontal direction may hence be a direction extending in a plane which is defined by the x-axis and the y-axis. Hence, when tensioning the carrier member fixation means 8, a first tension force as defined in the above will be created. The bracket support surface 61 is in the shown embodiments somewhat C-formed, as seen in a sectional view defined by the z-axis and the y-axis. The C-form, or any other suitable form, may e.g. be provided by forming/bending a sheet element, preferably a sheet metal element. The C-formed support surface 61 implies increased strength for the engagement member 6.

As shown, the engagement member 6 may be pivotally connected to the carrier member 2 with respect to a pivot axis PA, wherein the pivot axis PA is arranged to be moved in a track 62 provided on the engagement member 6 or on the carrier member 2. In the shown embodiments, the track 62 is in the form of a slot provided in the engagement member 6. Further, in the shown embodiments, the pivot axis PA is configured as a pin member which can slide in the slot 62.

As further shown in e.g. FIGS. 5, 6 and 3, the track 62 may be inclined with respect to a horizontal plane so that a second tension force between the engagement member 6 and the engagement portion 42 is provided when the carrier member 2 is rigidly attached to the bracket 4, which second tension force is mainly directed in a vertical direction (i.e. the z-axis in the shown embodiments), as seen when the roof rack foot assembly 1 is mounted on a vehicle positioned on a flat horizontally extending surface. The horizontal plane is here defined by the x-axis and the y-axis. The track 62 is here extending in a plane defined by the y-axis and the z-axis, as shown in e.g. FIGS. 5 and 6. The track 62 may also as shown have a curved profile, for example with a radius defined by a distance from the rotational axis RC to any point on the track 62 along its extension.

As further shown in e.g. FIGS. 3, 5 and 6, a roof rack foot assembly 1 for a roof rack 100 is disclosed, which comprises a carrier member 2 for carrying a crossbar 3 of the roof rack 100, a bracket 4 configured for attachment to a fix point attachment position of a vehicle by use of a fixation means 5, such as a screw or bolt. The bracket 4 comprises an engagement portion 41 and a seat portion 42 for the carrier member 2, wherein the bracket 4 comprises a top side Ts facing the carrier member 6 and a bottom side Bs, intended to face the vehicle when the bracket 4 is attached thereto, provided on an opposite side with respect to the top side Ts, wherein the seat portion 42 is provided on the top side Ts, and wherein the engagement portion 41 and the seat portion 42 are spaced apart from each other. Further, the engagement portion 41 is provided at the top side Ts of the bracket 4.

As previously mentioned, the engagement portion 41 may be positioned vertically above the seat portion 42, as seen when the roof rack foot assembly 1 is mounted on a vehicle positioned on a flat horizontally extending surface.

Further, as mentioned in the above, the bracket 4 may have an L-shaped and/or U-shaped cross section, which cross section is defined by a plane which is perpendicular to a longitudinal axis x of the bracket 4, which axis is preferably intended to at least mainly extend in a travelling direction of the vehicle when the roof rack foot assembly 1 is attached to the vehicle. The engagement portion 41 may thereby be provided on a portion of the bracket which extends in the vertical direction, i.e. in the direction of the z-axis.

Further, the engagement portion 41 may preferably be defined by at least one aperture 411 in the bracket 4 into which an engagement member 6 associated with the carrier member 2 may be inserted for rigidly attaching the carrier member 2 to the bracket 4.

The engagement member 6, as mentioned in the above, which is associated with the carrier member 2, may comprise at least one hook-formed portion 63, as shown in FIG. 3, adapted to be inserted into the at least one aperture 411 for rigidly attaching the carrier member 2 to the bracket 4. In the shown embodiment, two such hook-formed portions 63, which also may be denoted hook members 63, are separated from each other, as seen along a longitudinal axis x of the engagement member 6, which axis is here parallel to the longitudinal axis x of the bracket 4. The engagement member 6 is further extending in a transverse extension along a transverse axis y and in a height direction along an axis z. Further, in embodiment shown in FIG. 2, two corresponding elongated apertures 411 are shown which are separated from each other, as seen along the longitudinal axis x of the bracket 4.

As further shown in e.g. FIGS. 5 and 6, a roof rack foot assembly 1 for a roof rack 100 is disclosed, which comprises a carrier member 2 for carrying a crossbar 3 of the roof rack 100 and an engagement member 6 connected to the carrier member 2. It further comprises a bracket 4 configured for attachment to a fix point attachment position of a vehicle by use of a fixation means 5 (shown in FIG. 4), such as a screw or bolt. The bracket 4 comprises an engagement portion 41 for the engagement member 6, wherein the engagement member 6 is adapted to rigidly attach the carrier member 2 to the bracket 4 by engagement with the engagement portion 41 of the bracket 4. The engagement member 6 comprises at least one hook member 63 adapted to engage with the engagement portion 41 of the bracket 4. In the shown embodiments, two such hook members 63 are shown. The at least one hook member 63 is formed by a wall section extending in the height direction z and a depth direction y of the roof rack foot assembly 1, wherein the depth direction y is coinciding with a transverse direction of the vehicle, when attached thereto. Hence, the height direction z corresponds herein to the aforementioned vertical direction z and the depth direction is parallel to the aforementioned transverse axis y of the bracket and/or of the engagement member 6.

As shown in e.g. FIG. 3, the engagement member 6 is a sheet-formed member, such as a sheet metal member. The engagement member 6 further has a U-shaped cross section, which cross section is defined by a plane which is perpendicular to the height direction z. Consequently, the engagement member 6 and the bracket 4 may both preferably be made of a sheet-formed member, preferably by sheet metal members which have been formed/bent into e.g. the shown U-shaped cross sections. By having the hook members 63 formed by the above mentioned wall sections, and by also providing said wall sections in a U-shaped member 6 as shown in FIG. 3, improved strength can be provided. The strength is also provided in that the height of the wall sections in the z-axis is relatively large, with respect to the height of the engagement member 6, such as at least 10%, 20%, 30% or more of the height of the engagement member 6.

The arrows in FIG. 3 further shows preferred contact points with the bracket 4, i.e. at the hook-members 63 and at the bracket support surface 61. The bracket support surface 61 is preferably located proximate to hook ends of the hook members 63, thereby enabling improved force distribution. More specifically, the bracket support surface 61 is preferably located proximate and below the hook ends of the hook members 63, as seen in the z-direction, i.e. the height direction of the engagement member 6 and/or of the bracket 4.

Still further, as shown in FIG. 3, and which also may be seen in e.g. FIG. 5, the contact points between the engagement member 6 and the bracket 4 may be angled relative the z-axis, as seen in a plane being perpendicular to the x-axis. This may ensure a good and controlled angle of the carrier member 2.

Figure 8A:
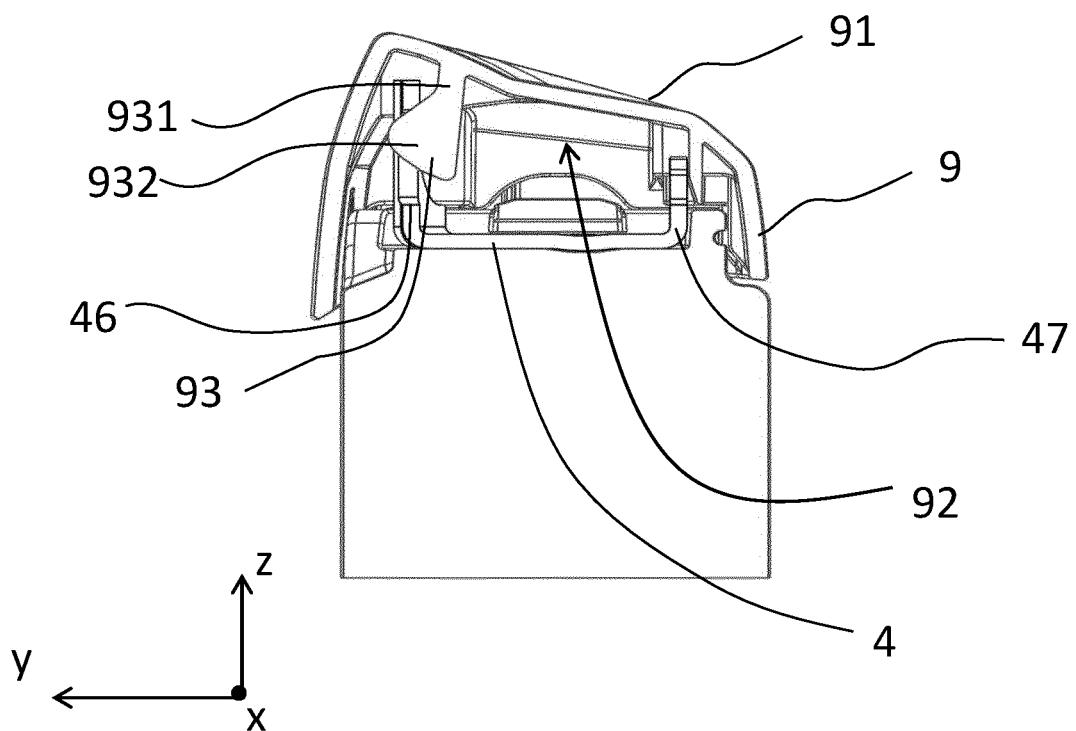
FIGS. 8a-f show different views of a cover attachment device for a bracket for a roof rack foot assembly according to an example embodiment of the present disclosure.
Figure 8B:
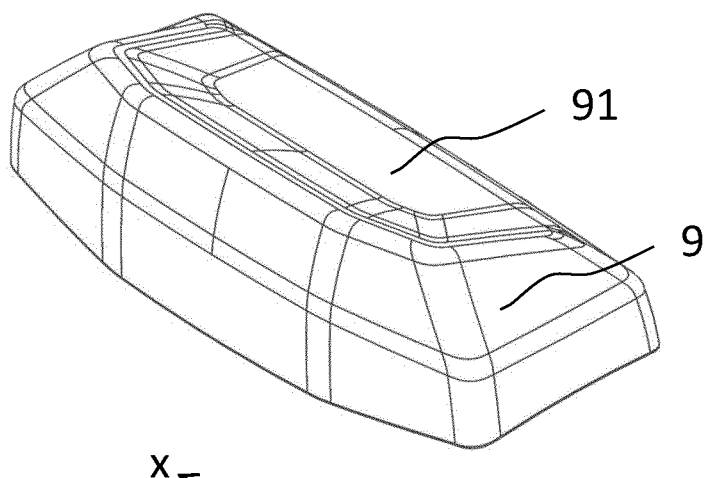
Figure 8C:
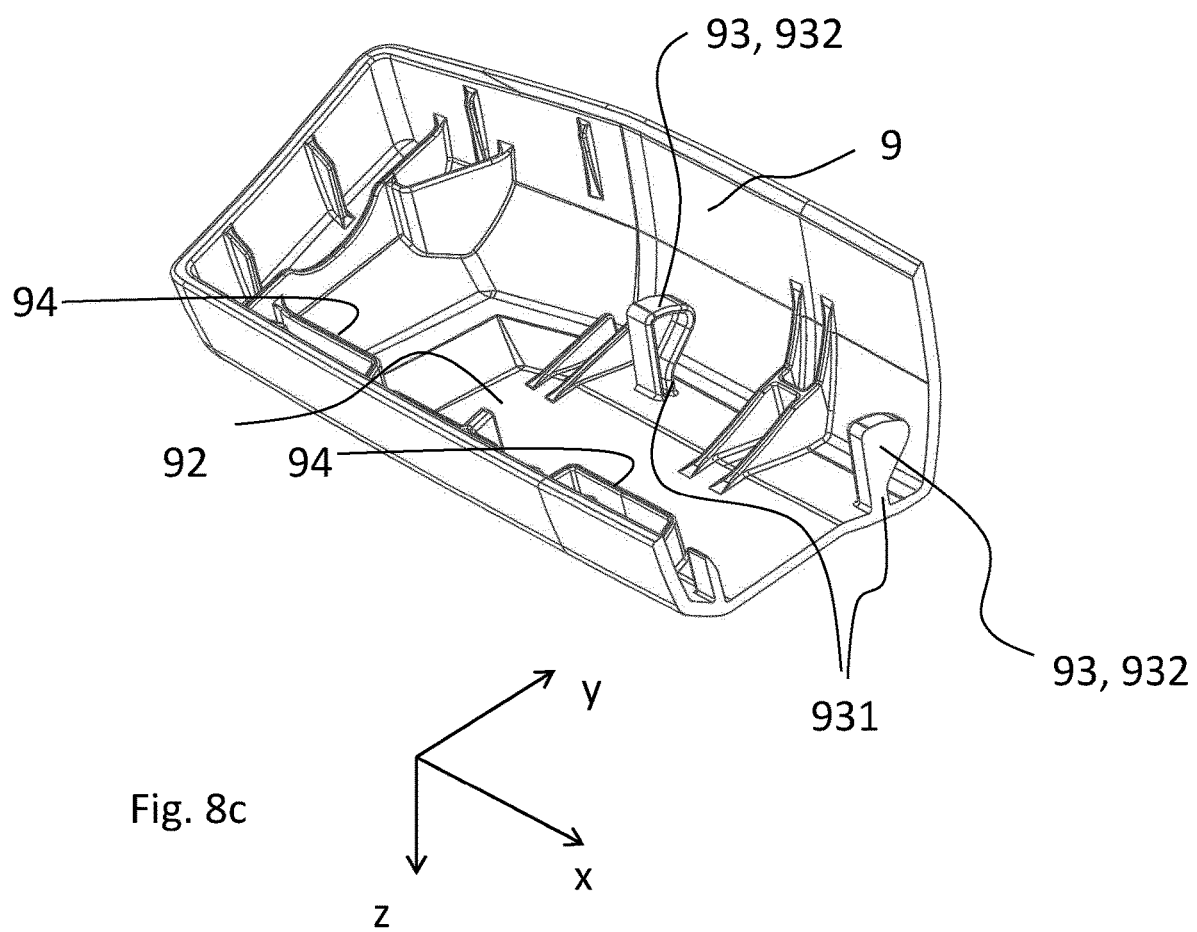

With respect to FIGS. 8a-f, embodiments of a cover attachment device 9 for a bracket 4 for a roof rack foot assembly 1 for a roof rack 100 for a vehicle is shown. The cover attachment device 9 comprises a bracket facing away surface 91 adapted to protect the bracket 4 externally when the cover attachment device 9 is attached to the bracket 4. It further comprises a bracket facing surface 92 adapted to face the bracket 4 when the cover attachment device 9 is attached to the bracket 4. The cover attachment device 9 further comprises at least one protruding portion 93 which protrudes out from the bracket facing surface 92, wherein the at least one protruding portion 93 is configured to attach the cover attachment device 9 to the bracket 4 by a snap-fit connection. FIG. 8a shows a sectional view of the cover attachment device 9 when it is attached to the bracket 4, which sectional view is a plane which is perpendicular to the x-axis, i.e the longitudinal axis x of the bracket and/or of the cover attachment device 9. FIG. 8b shows a perspective view of the cover attachment device 9 and the bracket facing away surface 91, as seen from above and FIG. 8c shows a perspective view of the cover attachment device 9 from below, i.e. it shows the bracket facing surface 92. The cover attachment device 9 is in the shown embodiments made of a polymer, and has been manufactured by injection molding. In the shown embodiments, the cover attachment device 9 is attached to the bracket 4 by engagement with the first vertically extending wall 46 and by the second vertically extending wall 47, as mentioned in the above.

As shown in FIGS. 8a and 8c, the at least one protruding portion 93 is configured to resiliently flex so as to be able to snap in to an engagement portion 411 (see e.g. FIG. 2) of the bracket 4. In the embodiment shown in FIGS. 8a-c, there are two protruding portions 93 which are spaced apart from each other, as seen along the longitudinal axis x of the cover attachment device 9 and/or of the bracket 4. The protruding portions 93 are spaced apart with a similar distance as the distance between the engagement portions 411 of the bracket 4, which as mentioned above may be apertures in the bracket 4. Further, as shown in FIG. 8c, the cover attachment device 9 may comprise cover attachment support surfaces 94 which are configured to contact the second vertically extending wall 47 so that the cover attachment device 9 is attached to the bracket 4. The cover attachment support surfaces 94 may further be configured to guide the cover attachment device 9 when it is being mounted on the bracket 4. For example, the cover attachment support surfaces 94 may be angled with respect to the z-axis, as seen in a plane being perpendicular to the x-axis.

The at least one protruding portion 93 is configured to resiliently flex in a horizontal direction, as seen when the cover attachment device 9 and the bracket 4 are attached to the vehicle. The horizontal direction is here a direction which is provided in a plane defined by the x-axis and the y-axis. More specifically, the least one protruding portion 93 is in the embodiment shown in FIGS. 8a-c configured to resiliently flex along the transverse axis y of the bracket 4 and/or of the cover attachment device 9.

Further, as shown in e.g. FIGS. 8a and 8c, the at least one protruding portion 93 may comprise a waist section 931 and an outer engaging section 932 provided outside the waist section 931 with respect to the bracket facing surface 92, wherein the outer engaging section 932 is configured to snap in to the engagement portion 411 of the bracket 4. Hence, the resilient flexing function is here at least provided by the shape of the at least one protruding portion 93, which is here also integrated with the cover attachment device 9, i.e. the cover attachment device 9 is a single one-piece unit, thereby implying a reduced manufacturing cost.

Figure 8D:
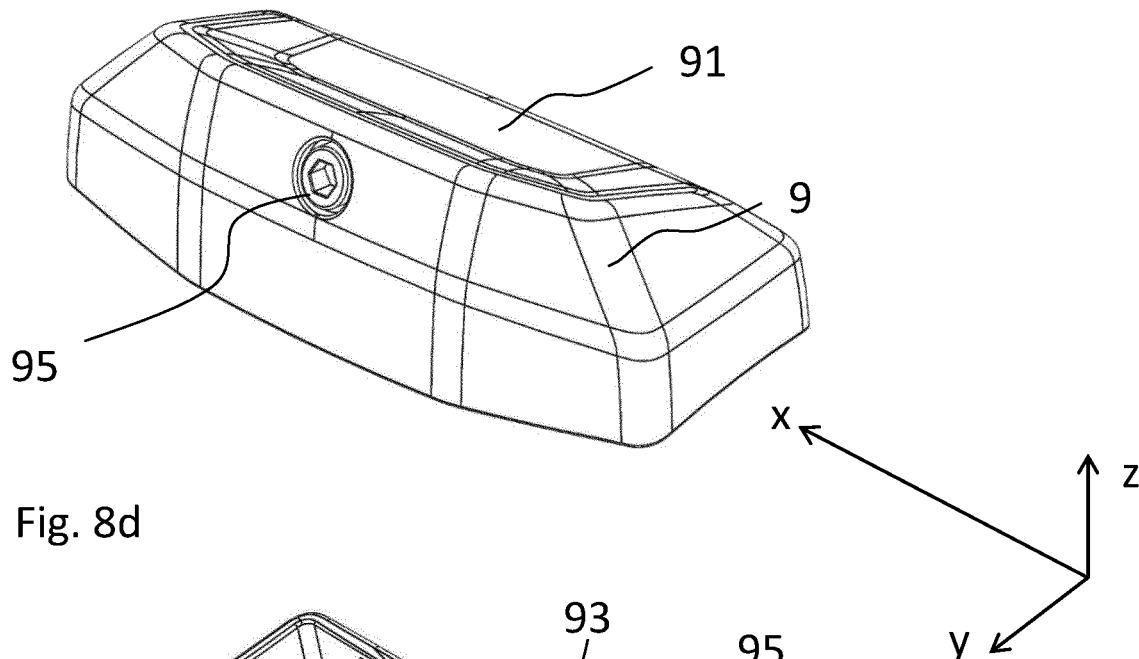
Figure 8E:
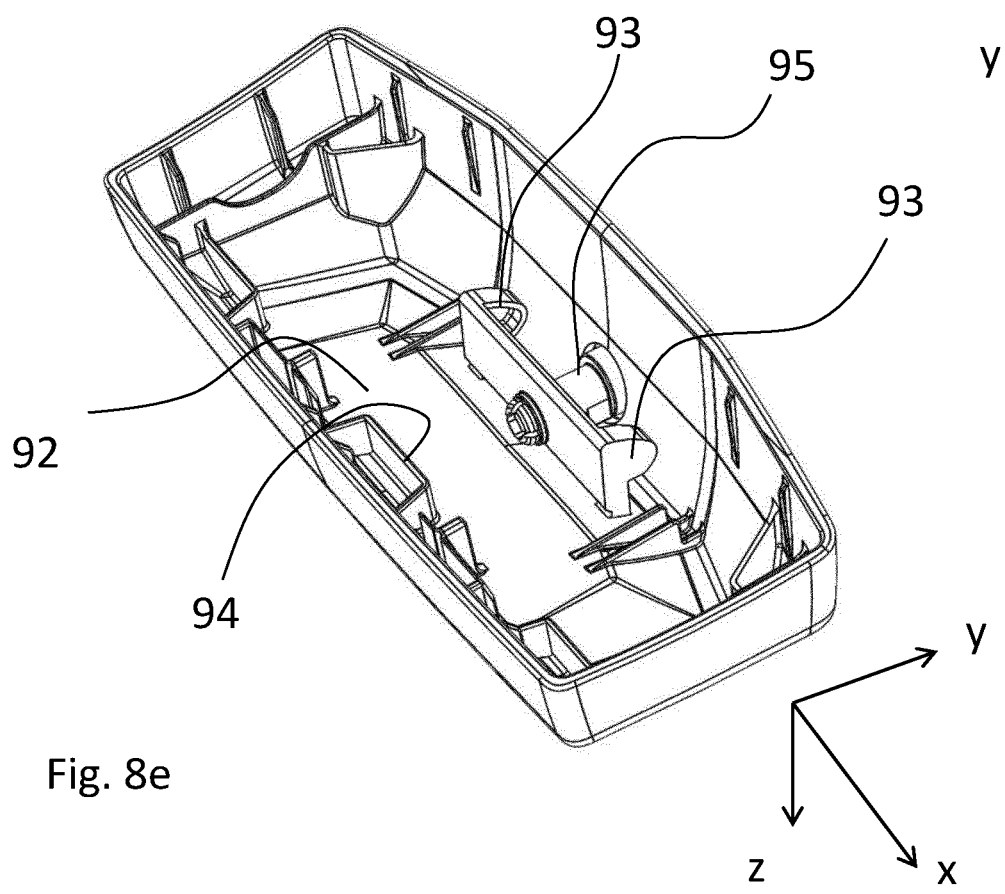
Figure 8F:
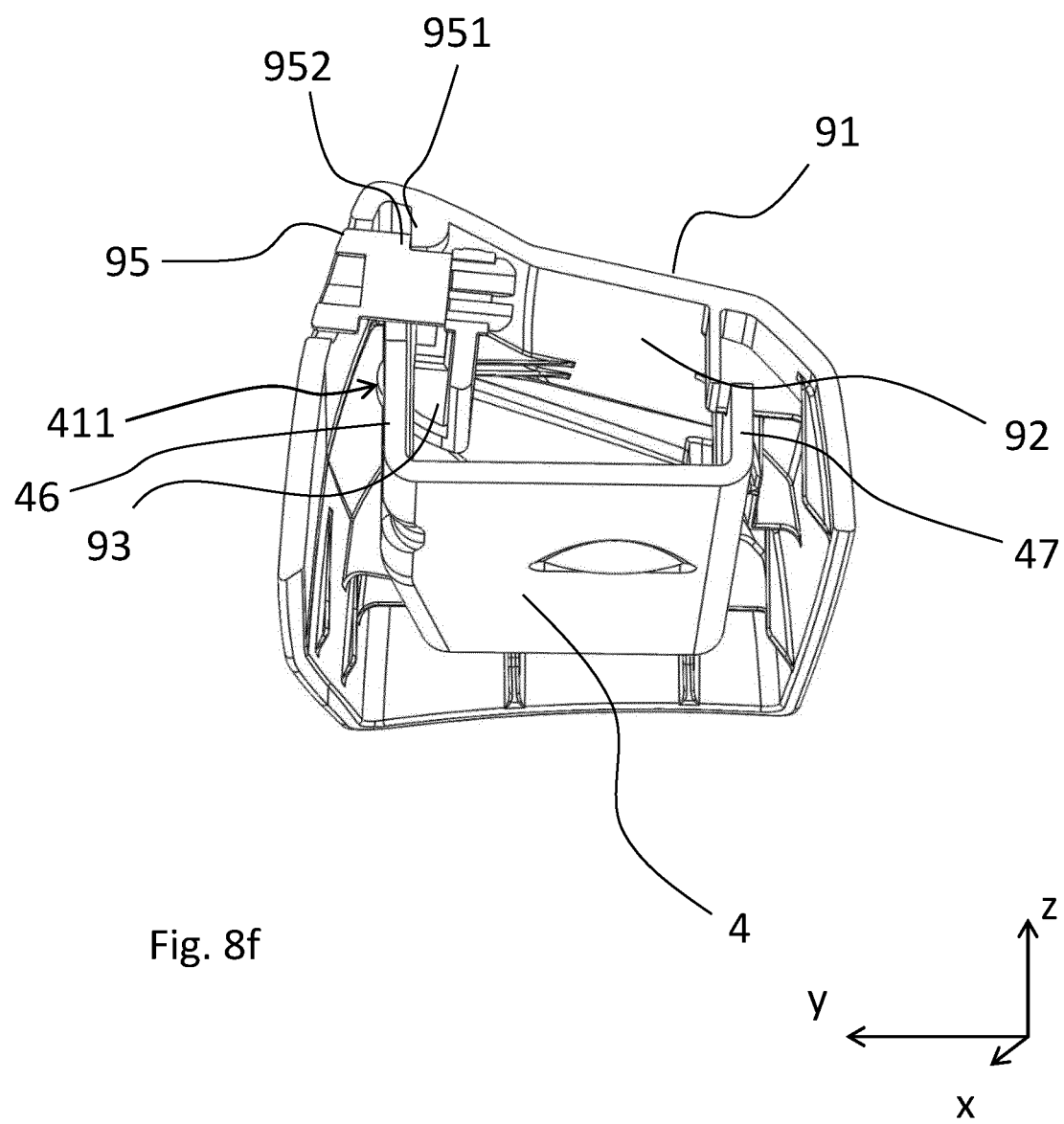

Further, FIGS. 8d-f show another embodiment of a cover attachment device 9 which comprises a lock member 95. The lock member 95 is configured to lock the cover attachment device 9 to the bracket 4. Hence, when the lock member 95 is in a locked state, the cover attachment device 9 is prevented from being released from the bracket 4. The lock member 95 is in the shown embodiment in the form of a rotation lock, or cylinder lock. It is further openable by use of a tool such as a hex key, an Allen key or Allen wrench or a key (not shown).

FIGS. 8d and 8e show perspective views from above and underneath of the cover attachment device 9, respectively. FIG. 8f shows a sectional view of the cover attachment device 9, when being locked to the bracket 4, which sectional view is a plane being perpendicular to the x-axis.

As shown in FIGS. 8e and 8f, the lock member 95 may be arranged to prevent the at least one protruding portion 93 to release the snap-fit connection to the bracket 4 when the lock member 95 is in the locked state. This is in the shown embodiment achieved by use of a lock portion 952 of the lock member 95 and an opposing surface 951 on the cover attachment device 9 for the lock member 95. The opposing surface 951 prevents the lock member 95 from being pushed inwardly, for example in a direction being opposite to the y-direction, thereby preventing the at least one protruding portion 93 from being released from the engagement portion 411 of the bracket 4. In the shown example the engagement portion is the aforementioned aperture(s) 411. When the lock member 95 is opened by rotation, such as by rotating the lock member 95 with respect to an axle being substantially parallel to the y-axis, the lock member 95 will no longer be prevented by the opposing surface 951 and thereby the lock member 95 can be pushed inwardly. When the lock member 95 is pushed inwardly, the at least one protruding portion 93 can be released from the bracket 4. In the embodiment shown in FIG. 8f, the lock portion 952 on the lock member 95 will not prevent the lock member 95 from being pushed inwardly when the lock member has been rotated to the unlocked state. For example, the lock portion 952 may only extend in a portion of the circumference of the lock member 95, as seen in a plane being perpendicular to the y-axis. The lock member 95 is preferably spring-biased towards the locked state, i.e. so that the at least one protruding portion 93 is automatically attached to the bracket 4 via the engagement portion 411 when the cover attachment device 9 is mounted on the bracket 4. By the above configuration, an improved locking function for the cover attachment device 9 is achieved, implying a simplified locking function which is easy to use and which efficiently prevents unwanted users from removing the cover attachment device 9. The at least one protruding portion 93 may also in this embodiment comprise the aforementioned waist section and engaging section.

Figure 9A:
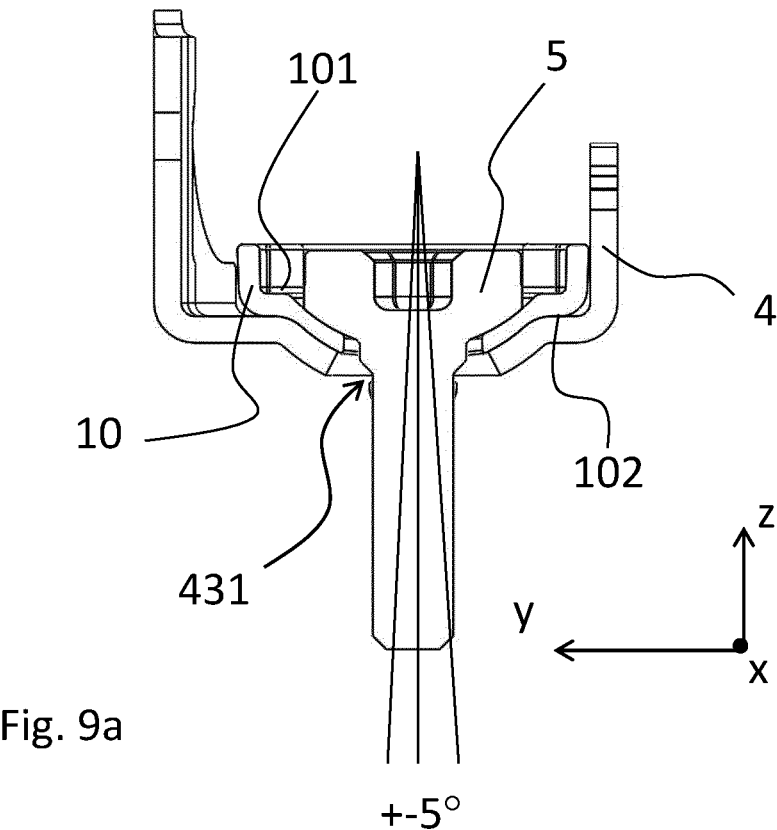
FIGS. 9a-b show sectional views of two screw anti-rotation devices for a screw of a roof rack according to example embodiments of the present disclosure.
Figure 9B:
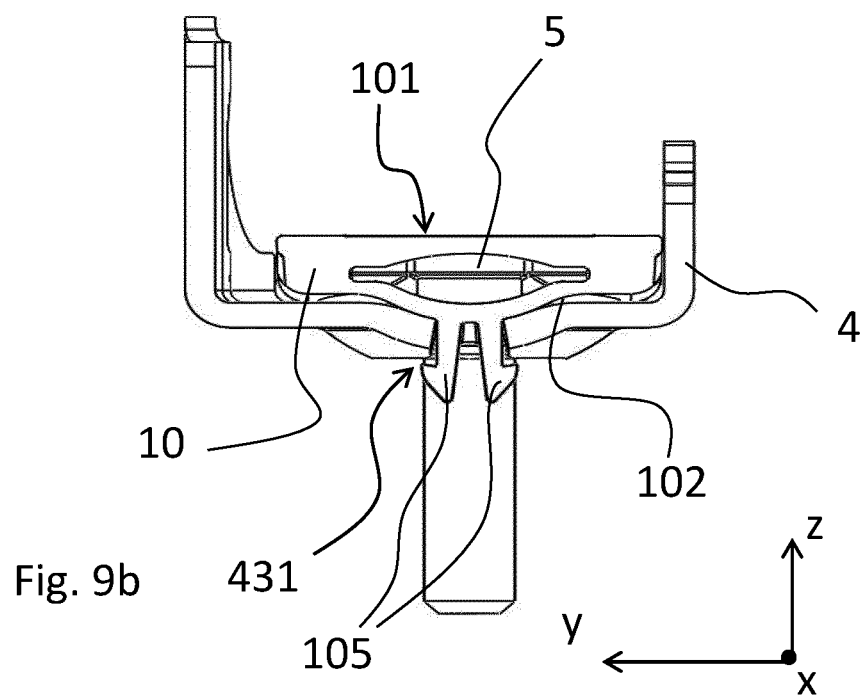
Figure 10A:
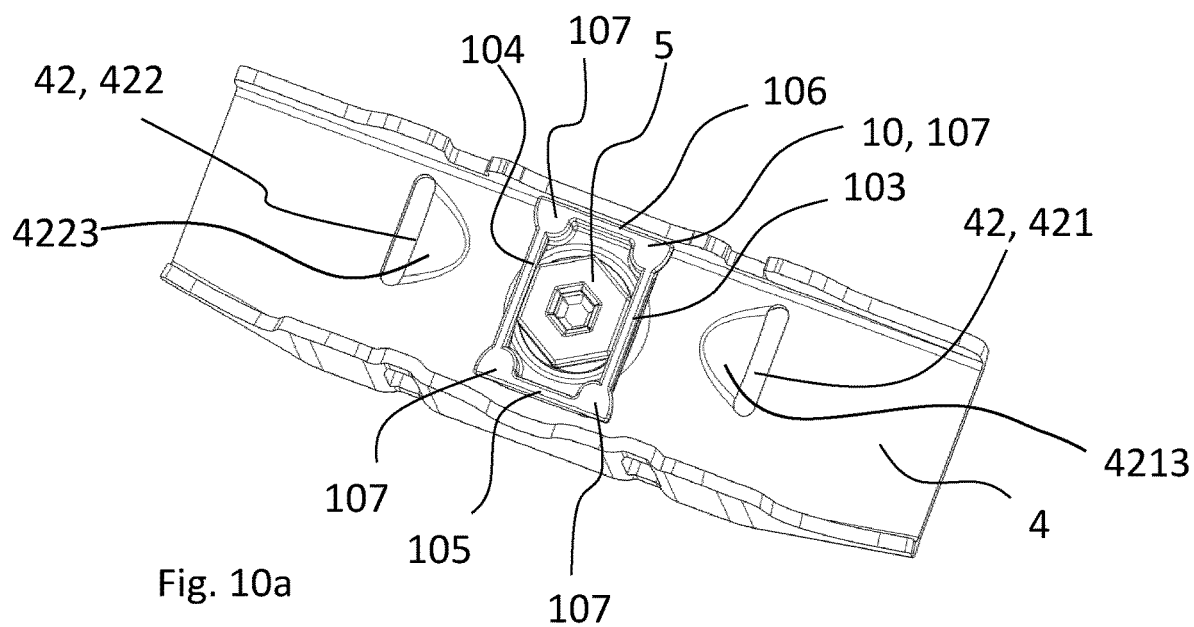
FIGS. 10a-b show perspective views of a bracket and a screw anti-rotation device according to an example embodiment of the present disclosure.
Figure 10B:
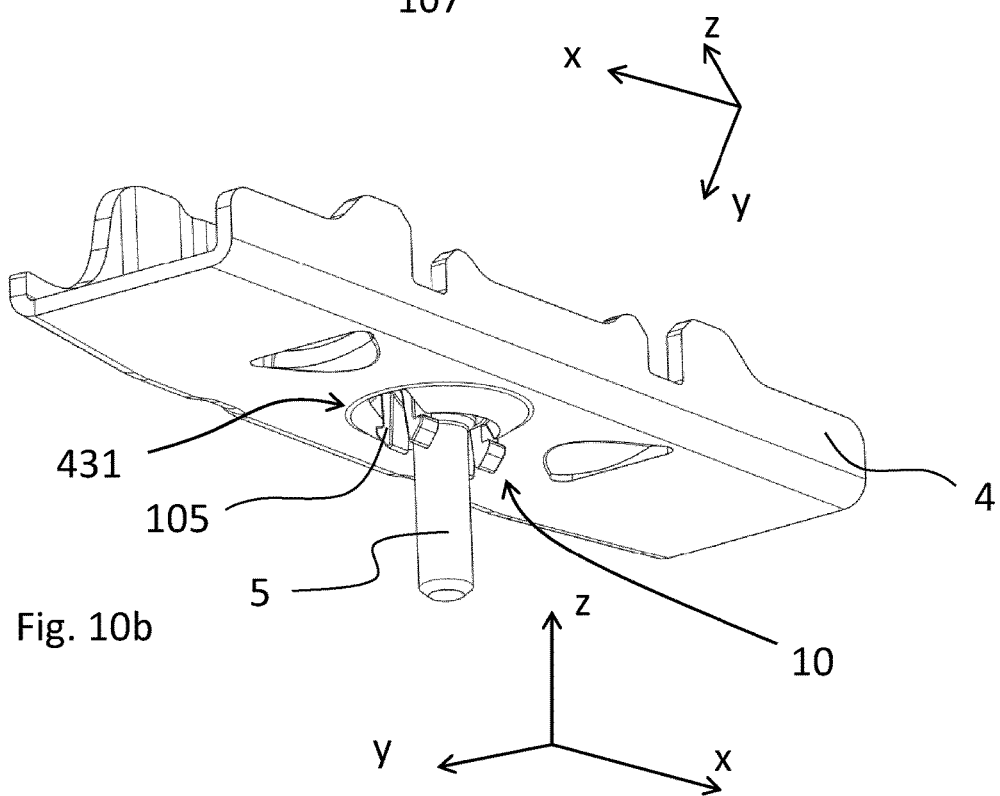
Figure 11:
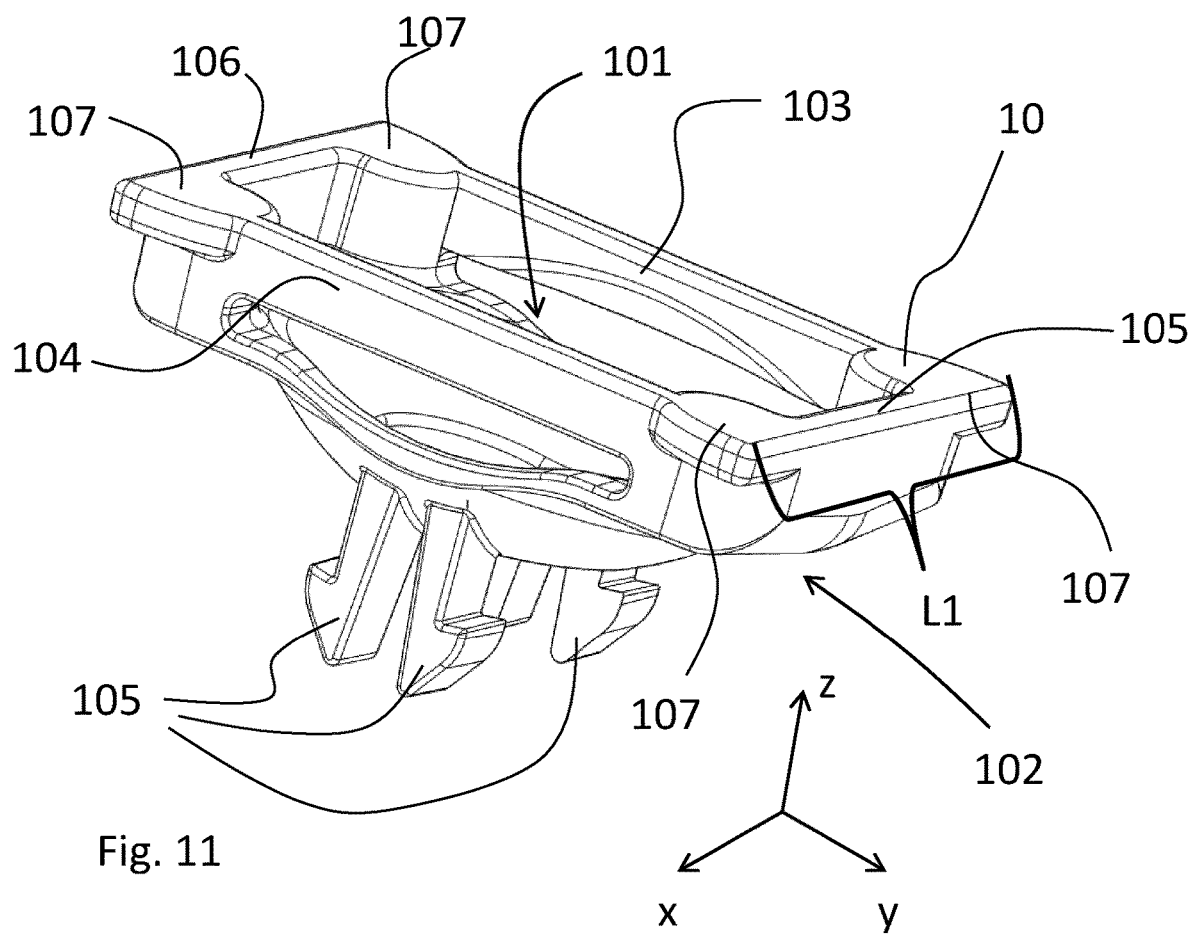
FIG. 11 shows a perspective view of a screw anti-rotation device according to an example embodiment of the present disclosure.

With respect to FIGS. 9-11, a screw anti-rotation device 10 for a screw 5 of a roof rack 1 is shown. The screw anti-rotation device 10 is configured to prevent the screw 5 from loosening when being attached to a member. The screw anti-rotation device 10 comprises a screw facing surface 101 adapted to receive the screw 5 and a screw facing away surface 102 adapted to face the member to which the screw 5 is attached. The screw facing surface 101 is rounded so that the screw anti-rotation device 10 can be angled with respect to the screw 5 in more than one angle position when the screw 5 is attached to the member. In the embodiment shown in e.g. FIG. 9a, the screw facing away surface 102 is also rounded so that the screw anti-rotation device 10 can be angled with respect to the member in more than one angle position when the screw 5 is attached to the member. The x-axis, y-axis and z-axis as shown in FIGS. 9-11 are the same axes as previously described in the above. FIGS. 9a-b show sectional views, which here are planes which are perpendicular to the x-axis. FIGS. 10a-b show perspective views of when the screw anti-rotation device 10 is provided on a bracket 4 as described in the above, and FIG. 11 shows a perspective view of a screw anti-rotation device 10 according to an example embodiment of the disclosure.

In the shown embodiments, the roof rack 100 comprises the roof rack foot assembly 1 as described in the above, wherein the screw 5 is configured to attach the bracket 4 to a vehicle by use of the screw 5 and by attaching the screw 5 to the vehicle via an aperture 431, 432, 433 in the bracket 4.

The angle position with respect to the screw 5 and the screw anti-rotation device 10 may be varied in a range of +−5 degrees, and/or the angle position with respect to the screw anti-rotation device 10 and the member, preferably the bracket 4, can be varied in a range of +−5 degrees, as indicated in FIG. 9a. As shown, the angle position may be varied with respect to an axis which is parallel to the z-axis. As such, the angle position may be varied about the y-axis and/or about the x-axis.

The screw facing surface 101 may as shown in FIG. 10a have a quadrilateral-shaped form, which here is a rectangular-shaped form, as seen from above when the screw anti-rotation device 10 is provided at the member, such as at the aperture 431 of the bracket 4. At least two sides 103, 104 of the quadrilateral-shaped form are configured to contact a respective side of a head of the screw 5, i.e. as shown they contact flat sides of the screw head. The at least two sides 103, 104 are resiliently flexible so as to allow the screw 5 from being screwed into a hole of the vehicle but to prevent the screw 5 from being un-screwed from the hole when provided therein. The two sides 103 and 104 are in the shown embodiment provided opposite to each other. The screw head of the screw 5 as shown has six flat sides. However, the screw 5 may have more or fewer flat sides.

As shown in e.g. FIGS. 9b, 10b and 11, the screw anti-rotation device 10 may further comprise at least one anti-rotation protruding portion 105 provided on the screw facing away surface 102. The anti-rotation protruding portions 105 as shown are configured to extend into the aperture 431 of the member, which here is the bracket 4. Thereby, by the configuration of the anti-rotation protruding portion 105, rotation of the screw anti-rotation device 10 may be further prevented, and/or the screw anti-rotation device 10 may be prevented from falling of from the member, which here is the bracket 4. In the shown embodiments there are four separate anti-rotation protruding portions 105. However, the screw anti-rotation device 10 may also comprise fewer or more such anti-rotation protruding portions 105. Further, as shown, the at least one anti-rotation protruding portion 105 may be configured to resiliently flex so as to provide a snap fit locking to e.g. the aperture 431.

As shown in FIG. 11, the quadrilateral-shaped form comprises two additional opposing sides 105, 106. These opposing sides 105, 106 may be formed so that a length L1 is longer than a smallest distance between the two sides 103 and 104. Thereby the contact between the screw anti-rotation device 10 and the member, such as the bracket 4, may be improved, implying a reduced rotation risk for the screw anti-rotation device 10. This configuration may be achieved by providing enlarged corners 107, as shown in FIG. 11, which corners 107 extend outside the two sides 103, 104, as seen in the direction of the x-axis.

Figure 7:
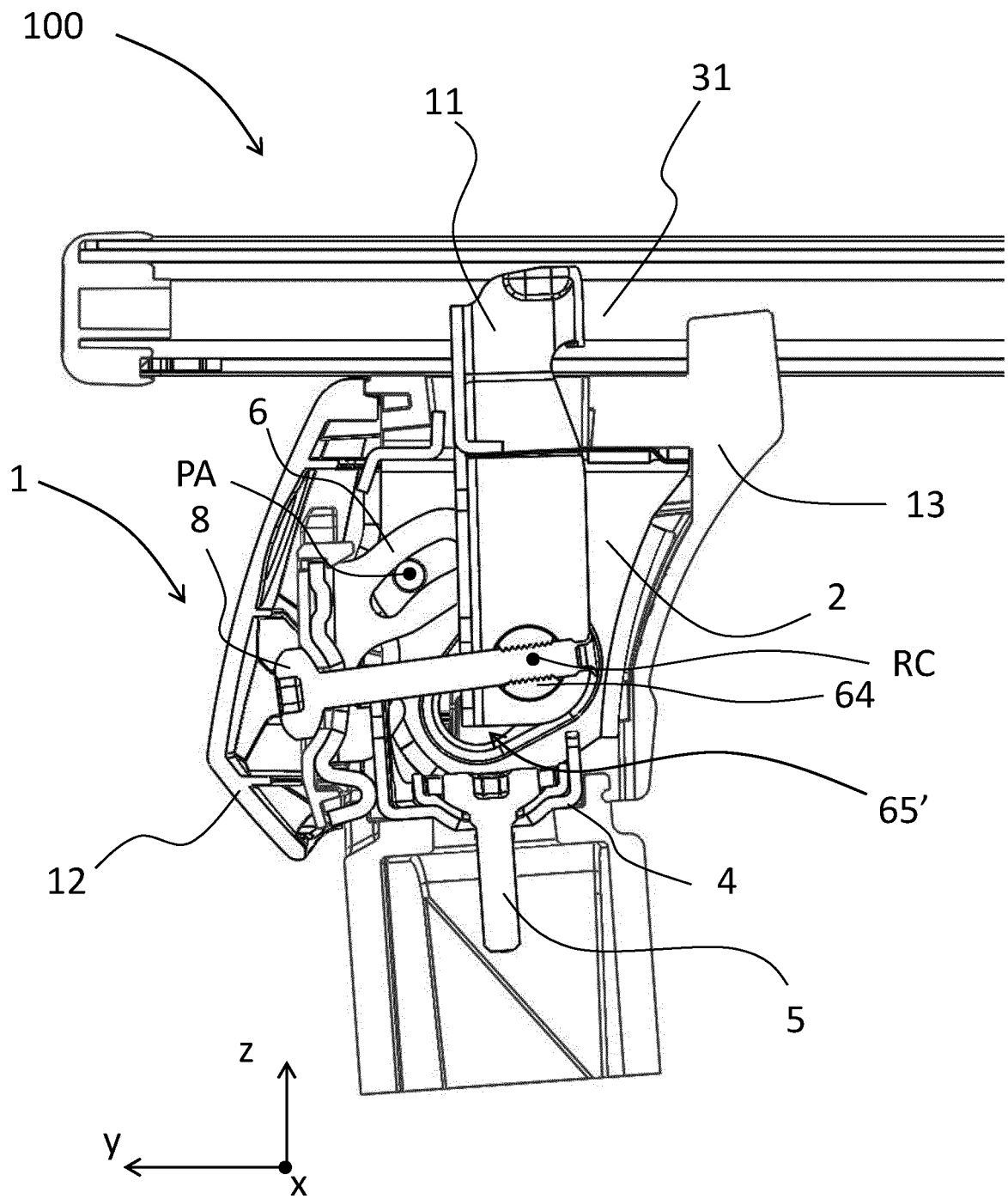
FIG. 7 shows a sectional view of a roof rack foot assembly and a roof rack according to an example embodiment of the present disclosure.

Further, FIG. 4 and FIG. 7 show examples of a roof rack foot assembly 1 and a roof rack 100 where the carrier member 2 is connected to the crossbar 3 via an anchor member 11. A portion of the anchor member 11 is intended to be in inserted into a track 31 of the crossbar. As shown in FIG. 5, the roof rack foot assembly 1 may further comprise a spring member 15 arranged to provide a spring-force onto the anchor member 11 to prevent the anchor member 11 from getting stuck in the track 31 (see FIG. 7) when the roof rack foot assembly 1 is not rigidly attached to the bracket 4. Still further, the roof rack foot assembly 1 may also comprise a washer member 16 for the carrier member fixation means 8 which is provided in-between e.g. a screw head of the carrier member fixation means 8 and the engagement member 6. The washer member 16 may be used to reduce friction for the carrier member fixation means 8.

Another example embodiment of a roof rack 100 is shown in FIG. 6, which shows an example of an "Edge-type" roof rack 100, where the crossbar 3 may be attached to the carrier member 2 via e.g. a screw and nut connection 32.

The connection member 64 may be provided in a circular hole 65 as shown in FIGS. 1, 5 and 6. Alternatively, the connection member 64 may be provided in a somewhat elongated hole 65', as seen in a plane which is perpendicular to the x-axis, as shown in FIGS. 4 and 7. The elongated hole 65' is configured so that the connection member may be moved therein, as seen in the plane being perpendicular to the x-axis. This movement may be required for rigidly attaching the anchor member 11 in the track 31 of the crossbar.

Still further, as shown in FIG. 4 and in FIG. 7, the roof rack foot assembly 1 may further comprise a first cover 12 for the roof rack foot assembly and/or a second cover 13 for the roof rack foot assembly 1. The first and/or second cover/s 12, 13 is/are preferably made of a polymer. Further, a lock 14, which may be locked by a key (not shown) may further be provided for locking the first cover 12 to the roof rack foot assembly 1.

Yet further embodiments of a bracket 4 for a roof rack foot assembly 1 according to the present disclosure are shown in FIGS. 14a-d.

Figure 14A:
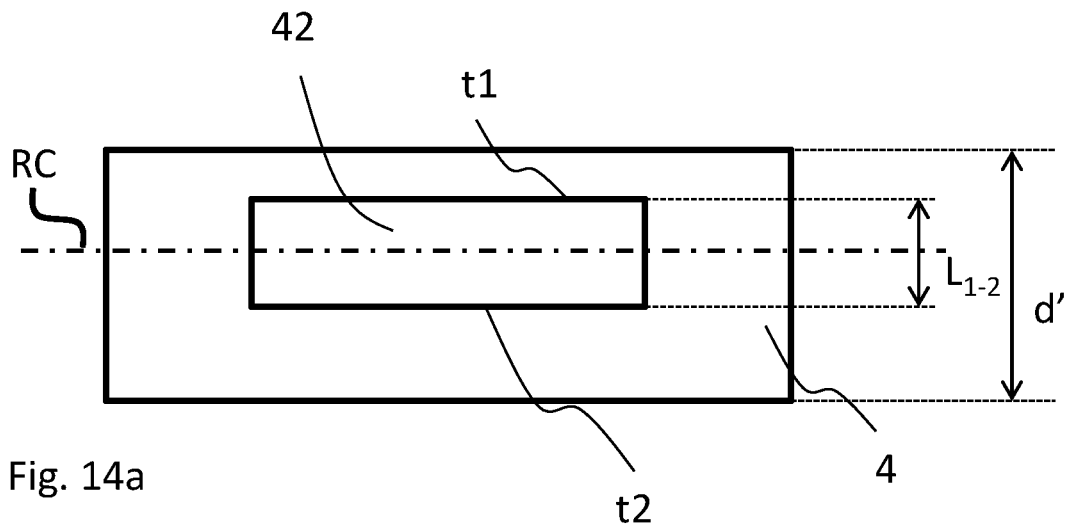
FIGS. 14 a-d show schematic views of a bracket viewed from above according to other example embodiments of the present disclosure.

FIG. 14a is a schematic illustration of a bracket 4, as seen from above, for a roof rack foot assembly 1. The roof rack foot assembly 1 (see e.g. FIG. 15) comprises a carrier member 2 for carrying a crossbar 3 of the roof rack. The carrier member 2 comprises a first support portion 21. The carrier member 2 may thus comprise only one support portion, but it may alternatively comprise two support portions 21, 22 spaced apart from each other as e.g. shown in FIG. 1. The bracket 4 is configured for attachment to a fix point attachment position of a vehicle by use of at least one fixation means 5, such as a screw or bolt, similar to the above-mentioned embodiments. The bracket 4 comprises a seat portion 42 for the carrier member 2, wherein the seat portion 42 is adapted to receive the first support portion 21 of the carrier member 2 when the carrier member 2 is attached to the bracket 4. The seat portion 42 and/or the first support portion 21 is/are adapted so that the carrier member 2, in a first attachment state when the carrier member 2 is not rigidly attached to the bracket 4, is movable in the seat portion 42 by allowing the carrier member 2 to pivot with respect to a rotational axis RC of the carrier member 2.

As shown in the embodiments in FIGS. 14a-d, the seat portion 42 may extend in a transverse direction y of the bracket 4 which is substantially perpendicular to the rotational axis RC and is delimited by two outer transverse end portions t1, t2, here being provided by transverse edges of a slot and/or an immersed portion, wherein a distance $L_{1-2}$ in the transverse direction y between the two outer transverse end portions t1, t2 is at least 35%, 40%, 45% or 50% of a transverse length d' of the bracket 4 measured at any location along the seat portion 42. Thereby the load distribution and/or balance on the bracket 4 will be improved.

Figure 14B:
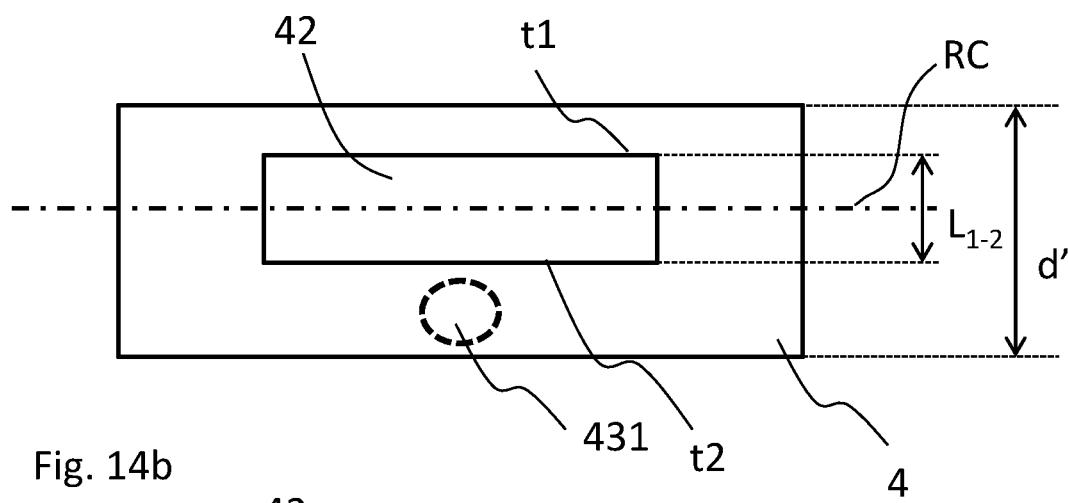
Figure 14C:
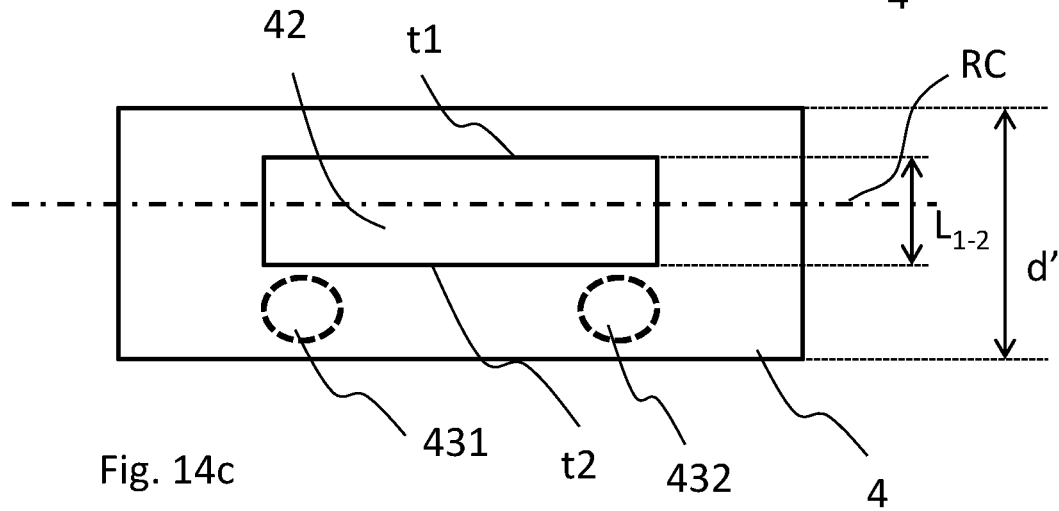
Figure 14D:
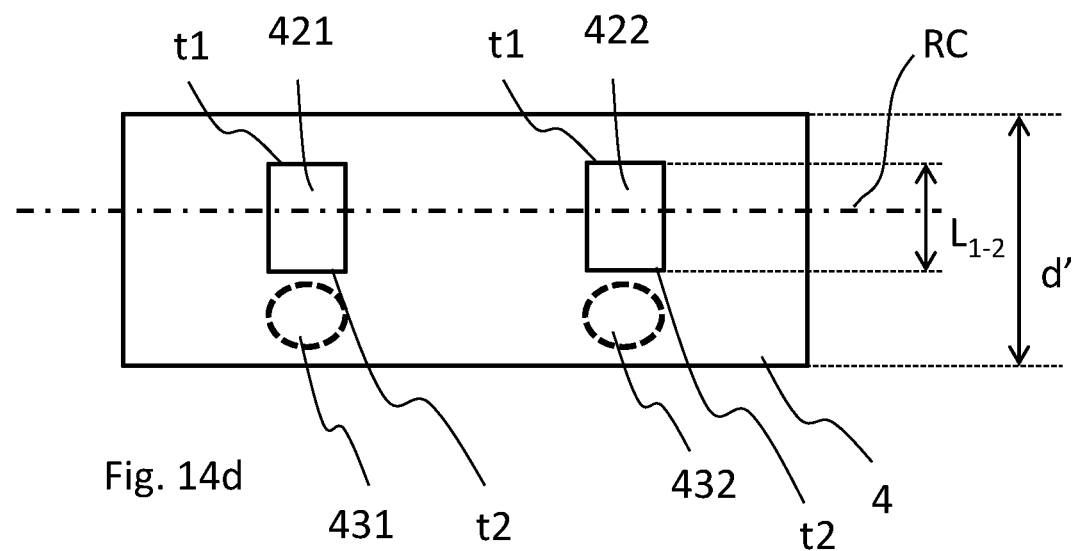

Additionally, or alternatively, the bracket 4 may comprise at least one receiving location 431, 432 for the at least one fixation means 5, see FIGS. 14b-d. The receiving locations 431, 432 are offset from the seat portion 42, as seen in the transverse direction y which is substantially perpendicular to the rotational axis RC of the carrier member 2. FIG. 14b shows an embodiment with one receiving location 431 for the fixation means 5 (not shown). FIG. 14c shows an embodiment with two receiving locations 431, 432 for respective fixation means 5 (not shown) for attachment to the fix point attachment position. The two receiving locations 431, 432 are provided offset from each other along the direction of the rotational axis RC, preferably wherein each receiving location is offset from the seat portion 42, as seen in the transverse direction y. In the shown embodiment, each receiving location 431, 432 is offset from the seat portion 42, as seen in the transverse direction y.

The bracket 4 as shown in FIG. 14d comprises a seat portion 42 comprising a first 421 and a second 422 support surface, spaced apart from each other in the longitudinal direction x of the bracket 4. The carrier member 2 for this bracket 4 comprises the first support portion 21 and a second support portion 22, see e.g. the carrier member 2 in FIG. 1. Each support surface 421, 422 is adapted to receive the respective first 21 and second 22 support portion of the carrier member 2 when the carrier member 2 is attached to the bracket 4.

The receiving locations 431, 432 for the fixation means may be apertures.

Figure 15:
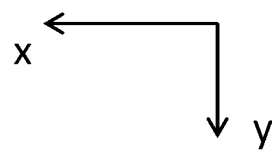
FIG. 15 shows a roof rack foot assembly according to example embodiments of the present disclosure.
Figure 15:
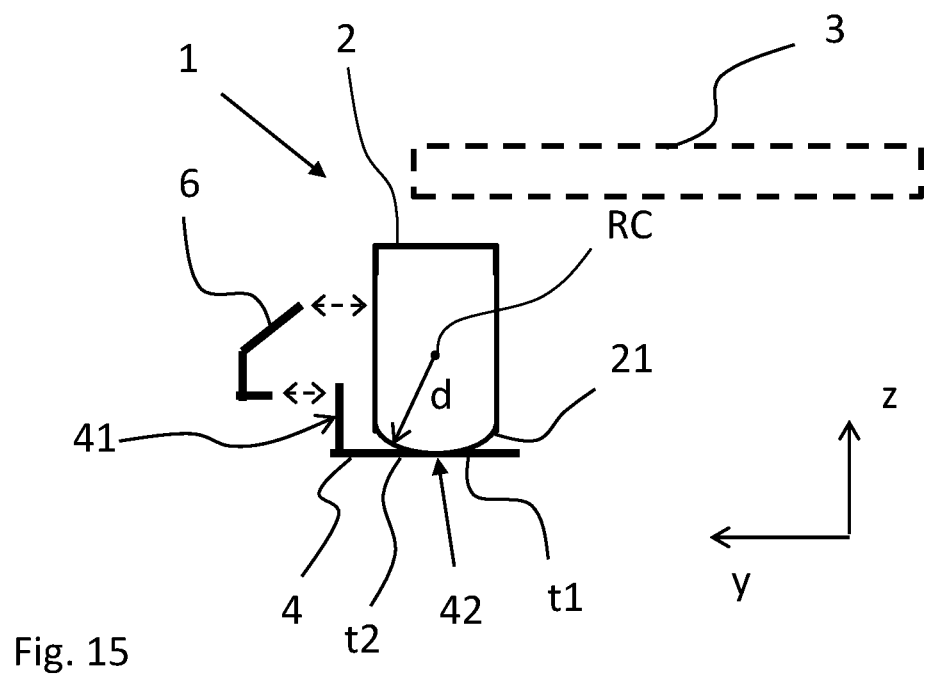

With respect to FIG. 15, a schematic illustration of a roof rack foot assembly 1 according to example embodiments of the present disclosure is shown. The figure is a sectional view of a plane defined by the transverse or depth direction y and the height direction z. It comprises a bracket 4, which may be any one of the brackets 4 as disclosed herein, such as the brackets 4 shown in FIGS. 14a-d.

As shown, the first support portion 21 of the carrier member 2 may be adapted to be in contact with the two outer transverse end portions t1, t2 when the carrier member 2 is rigidly attached to the bracket, corresponding to a second attachment state. More specifically, in the shown embodiment an engagement member 6 is shown which is connectable to the carrier member 2 for rigidly attaching the carrier member 2 to the bracket 4. The engagement member 6 is adapted to attach the carrier member 2 to the bracket 4 by engagement with an engagement portion 41 of the bracket 4, preferably by clamping the carrier member 2 to the bracket 4 by applying a pulling force therebetween.

Further, the bracket 4 comprises a top side facing the carrier member 2 and a bottom side provided on an opposite side with respect to the top side, wherein the seat portion 42 is provided on the top side, and wherein the engagement portion 41 is positioned above the seat portion 42, as seen when the roof rack foot assembly 1 is mounted on a vehicle positioned on a flat horizontally extending surface. Alternatively, or additionally, the engagement portion 41 may be positioned on the bottom side of the bracket 4 (not shown).

Further, FIG. 15 shows an embodiment where the seat portion 42 and the at least one receiving location 431, 432 are provided on the top side of the bracket 4 facing the carrier member 2.

The first support portion 21 of the carrier member 2 may, as shown, comprise a curved outer surface which is adapted to be in contact with the seat portion 42 when the carrier member 2 is attached to the bracket 4. Further, the carrier member 2, by use of the curved outer surface, is movable in the seat portion 42 by allowing the carrier member 2 to pivot with respect to the rotational axis RC of the carrier member 2 in the first attachment state. In the shown embodiment, a radial distance d from the rotational axis RC to any point on the outer curved surface which is adapted to be in contact with the seat portion 42 is at least 40%, 50%, 60%, 70% or greater than the transverse length d' of the bracket 4 measured at any location along the seat portion 42.

The roof rack foot assembly as e.g. shown in FIG. 15 may further comprise a carrier member fixation means (not shown), such as a screw or bolt, adapted for providing a secure engagement between the engagement member 6 and the engagement portion 41 so that the carrier member 2 is rigidly attached to the bracket 4.

FIGS. 14a-d show embodiments where the receiving locations 431, 432 are completely located within two outer longitudinal end portions of the seat portion 42, as seen in the longitudinal direction x of the bracket 4 corresponding to the direction of the rotational axis RC. In other words, the receiving locations 431, 432 and the seat portion 42 may be partly, or completely, overlapping in the transverse direction y, or aligned in the transverse direction y.

Figure 16A:
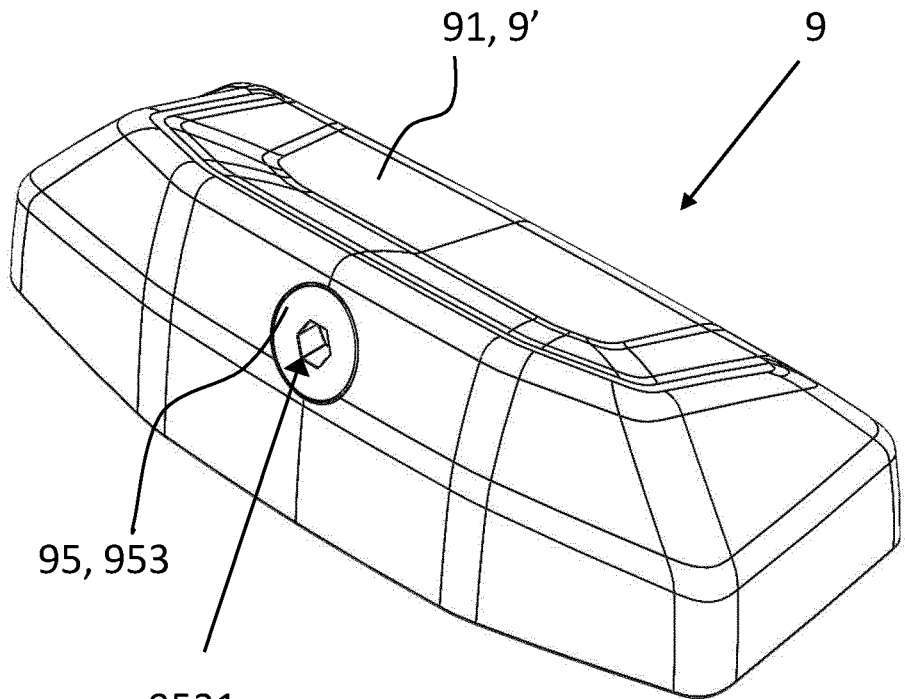
FIGS. 16a-f show a cover attachment device according to example embodiments of the present disclosure.
Figure 16B:
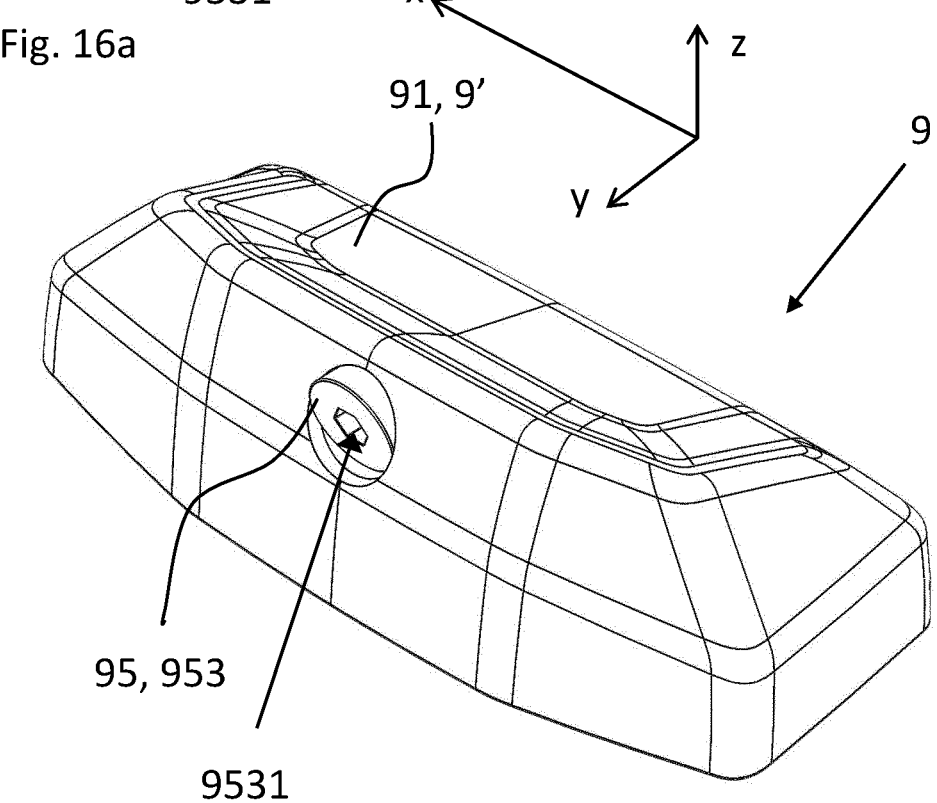
Figure 16C:
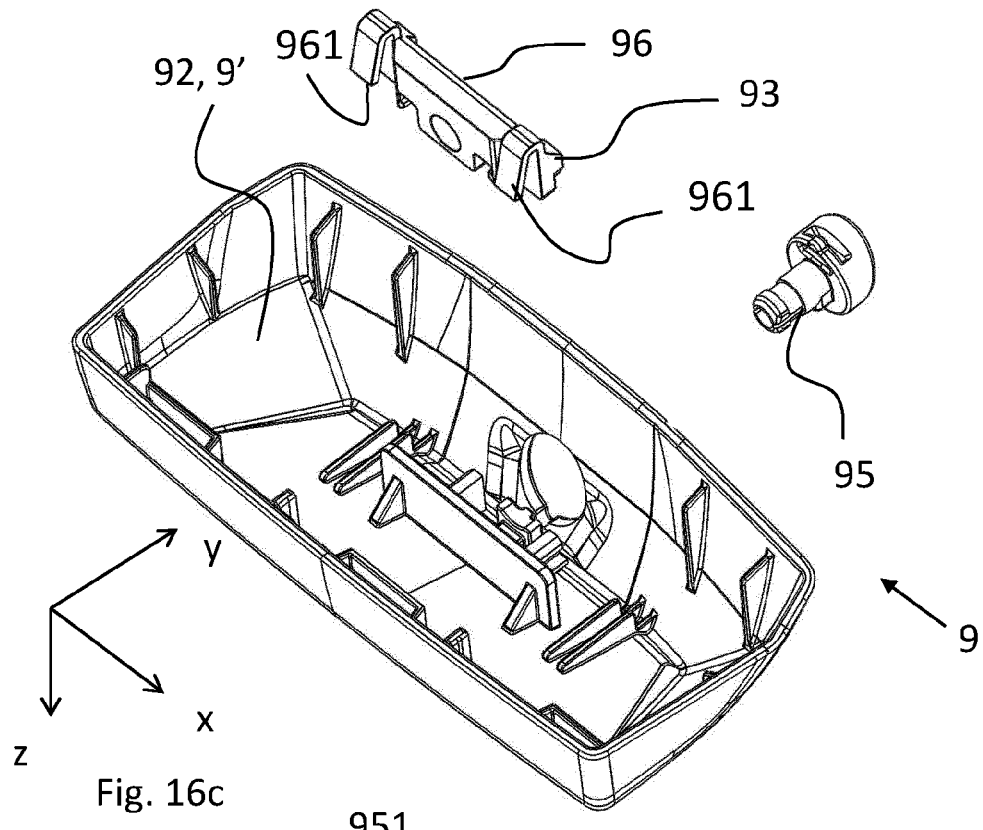
Figure 16D:
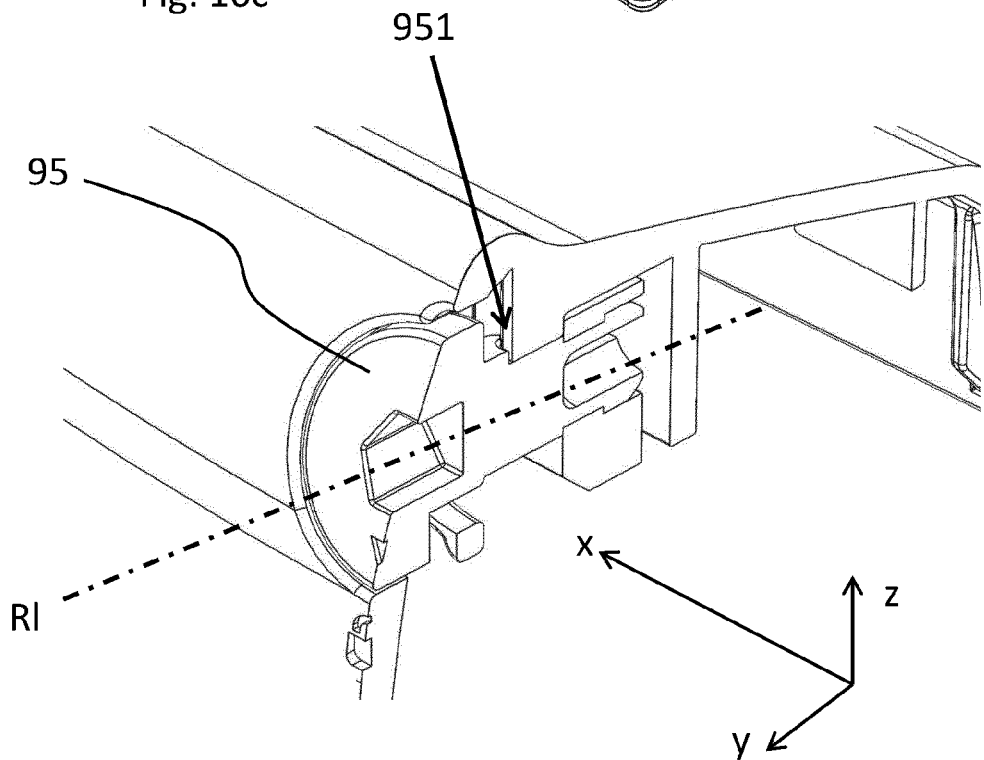
Figure 16E:
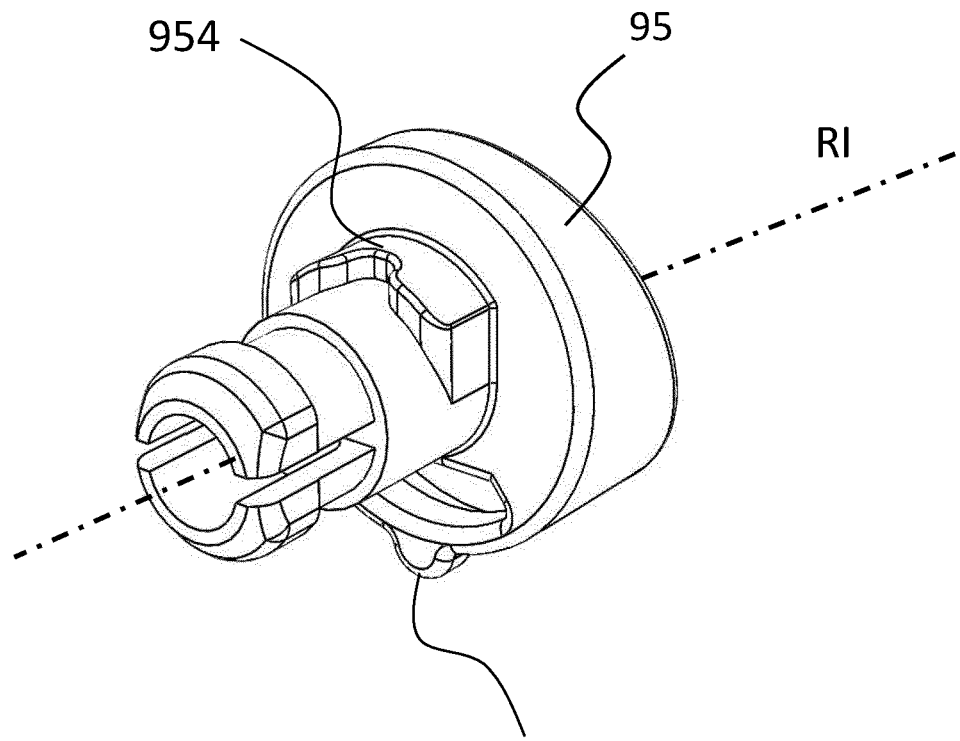
Figure 16F:
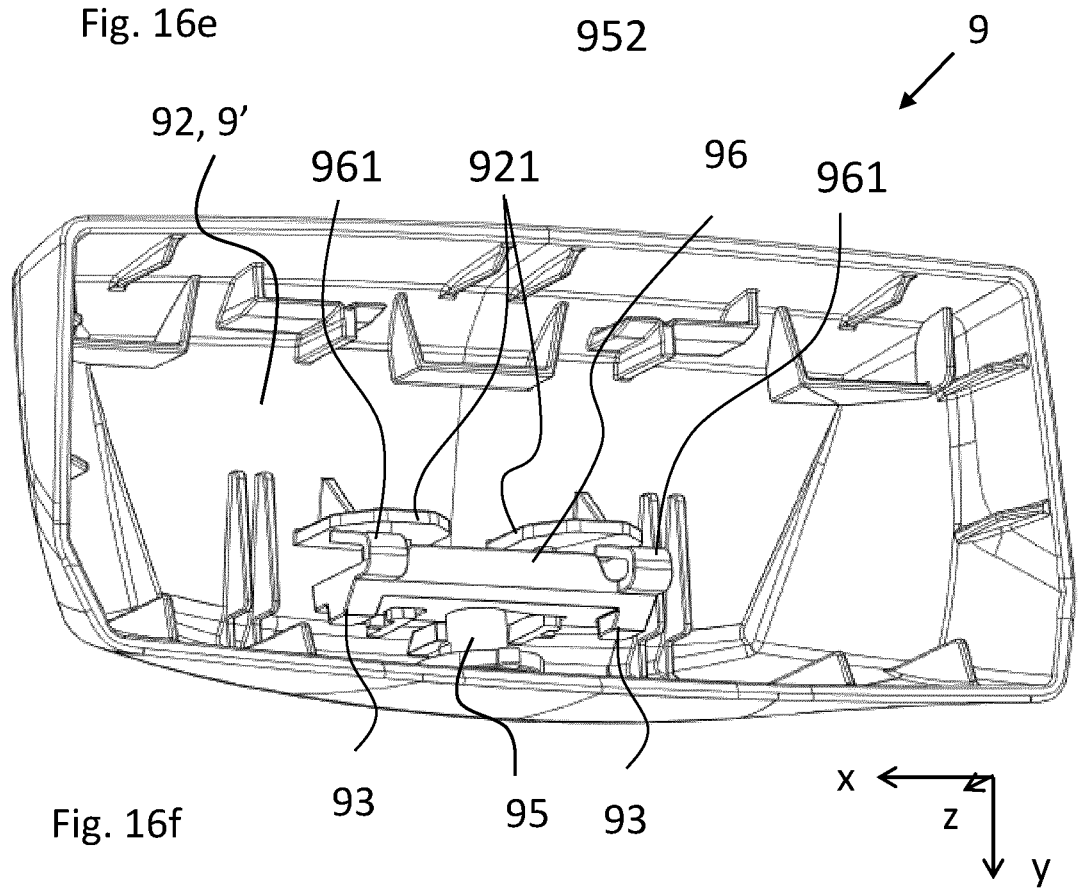

FIGS. 16a-f show a cover attachment device 9 according to embodiments of the present disclosure. More specifically, FIGS. 16a-b show perspective outside views of a cover attachment device 9, FIG. 16c shows a perspective inside view of the cover attachment device 9, FIG. 16d shows an enlarged perspective and cross-sectional view of the cover attachment device 9, FIG. 16e shows a lock member 95 of the cover attachment device 9 and FIG. 16f shows a perspective inside view of the cover attachment device 9. The cross-sectional view in FIG. 16d is a cross section defined by they and z-axis.

The cover attachment device 9 is intended for a bracket 4 for a roof rack foot assembly 1 for a roof rack 100 for a vehicle as e.g. disclosed herein, and comprises:
  a cover 9' having:
    a bracket facing away surface 91 adapted to cover the bracket 4 when the cover attachment device 9 is attached to the bracket 4; and
    a bracket facing surface 92 adapted to face the bracket 4 when the cover attachment device 9 is attached to the bracket 4. The cover attachment device 9 further comprises a lock member 95 configured to lock the cover attachment device 9 to the bracket 4.

The cover attachment device 9 may as shown be adapted such that the lock member 95 is movable between a locked position where the cover attachment device 9 is locked to the bracket 4 and an unlocked position where the cover attachment device 9 is removable from the bracket 4. More specifically, the cover attachment device 9 is adapted such that the lock member 95 is rotatable with respect to a lock member rotational axis RI between the locked position and an intermediate locked position.

The lock member 95 is in the embodiments shown in FIGS. 16a-f in the form of a rotation lock, or cylinder lock. It is further openable by use of a tool such as a hex key, an Allen key or Allen wrench or a key (not shown).

In addition, the lock member 95 is also movable in the direction of the lock member rotational axis RI between the intermediate locked position and the unlocked position.

In particular, as shown, the cover attachment device 9 may be adapted such that the lock member 95 is spring biased from the unlocked position towards the intermediate locked position in the direction of the lock member rotational axis RI. This is here accomplished in that the cover attachment device 9 further comprises an intermediate resilient element 96 which biases the lock member 95 towards the intermediate locked position and thereby locks the cover attachment device 9 to the bracket 4. The resiliency is provided by two resilient or flexible members 961 which can be pushed such that an extension of the intermediate resilient element 93 in the transverse direction y of the cover attachment device 9 is reduced. In other words, the members 961 are adapted to flex in the transverse direction y. As shown, each member 961 may be formed as a flexible arm which can be pushed and flex so that the extension of the intermediate resilient element 96 is reduced in the transverse direction y. The members 961 are pushing on a surface 921, see FIG. 16f, of the cover 9' to thereby provide a snap-fit connection between the cover 9' and the bracket 4.

The intermediate resilient element 96 may as shown further comprise a protruding portion 93 which is configured to attach the cover attachment device 9 to the bracket 4. By this configuration, the snap-fit connection to the bracket 4 may be provided. The protruding portion 93 is intended to engage with e.g. an aperture on the bracket 4, such as the aforementioned engagement portion 411. Further, the lock member 95 is arranged to prevent the at least one protruding portion 93 to release the snap-fit connection to the bracket 4 when the lock member 95 is in the locked position. More specifically, when the lock member 95 is in the locked position it is prevented from being moved in the direction of the rotational axis RI, thereby it is also prevented from pushing on the intermediate resilient element 96 such that the snap-fit connection is released.

As shown in FIG. 16d, the lock member 95 may be prevented from being moved in the direction of the lock member rotational axis RI when being in the locked position by the lock member 95 engaging with a stopping surface 951 of the cover 9'. The stopping surface 951 prevents the lock member 95 from being pushed inwardly, for example in a direction being opposite to the y-direction, thereby preventing the at least one protruding portion 93 from being released from the engagement portion 411 of the bracket 4. The stopping surface 951 is adapted to engage with a bulging portion 952 (see FIG. 16e) on the lock member 95 when it is in the locked position.

Further, the lock member 95 and the cover 9' are adapted such that the lock member 95 is prevented from being rotated from the intermediate locked positions towards the locked position until a rotational torque acting on the lock member 95 exceeds a torque threshold limit. This is provided in the embodiment shown in FIG. 16e by a rotation prevention portion 954. In the shown embodiment, the rotation prevention portion 954 comprises a recess adapted to receive a corresponding bulging portion (not shown) of the cover 9' and/or of the intermediate resilient member 96. As such, when the bulging portion is received in the recess of the rotation prevention portion 954, the lock member 95 will be prevented from being rotated until a rotational torque acting on the lock member 95 exceeds a torque threshold limit. Thereby the lock member 95 will not accidentally rotate so that it leaves the intermediate locked position. The rotation prevention portion 954 may as shown be located on a diametrically opposite side to the bulging portion 952 of the lock member 95, i.e. about 180 degrees from the bulging portion 952. Other configurations are of course also possible, such as locating the rotation prevention portion 954 and the bulging portion 952 about 90 degrees from each other, as seen with respect to the rotational axis RI.

In addition, as shown in FIG. 16b, the bracket facing away surface 91 and/or the lock member 95 may be adapted such that an outwardly facing surface 953 of the lock member 95 protrudes with respect to the bracket facing away surface 92 when the lock member 95 is in the intermediate locked position. Still further, as shown in FIG. 16a, the bracket facing away surface 91 and/or the lock member 95 may be adapted such that the outwardly facing surface 953 of the lock member 95 is flush with the bracket facing away surface 91 when the lock member 95 is in the locked position. In the shown embodiment, the lock member 95 is rotated 180 degrees between the locked position and the intermediate locked position. This configuration is here achieved in that the outwardly facing surface 953 is provided on an inclined surface of the bracket facing away surface 91 which is inclined with respect to a plane defined by the x and z-axis. The inclined surface corresponds to a plane defined by the x-axis.

Further, as shown in FIGS. 16a and b, the lock member 95 may on the outwardly facing surface 952 comprise a key or tool receiving portion 9531 adapted to rotationally lock a key or tool to the lock member 95 when the key or tool is connected to the key or tool receiving portion 9531.

Figure 17A:
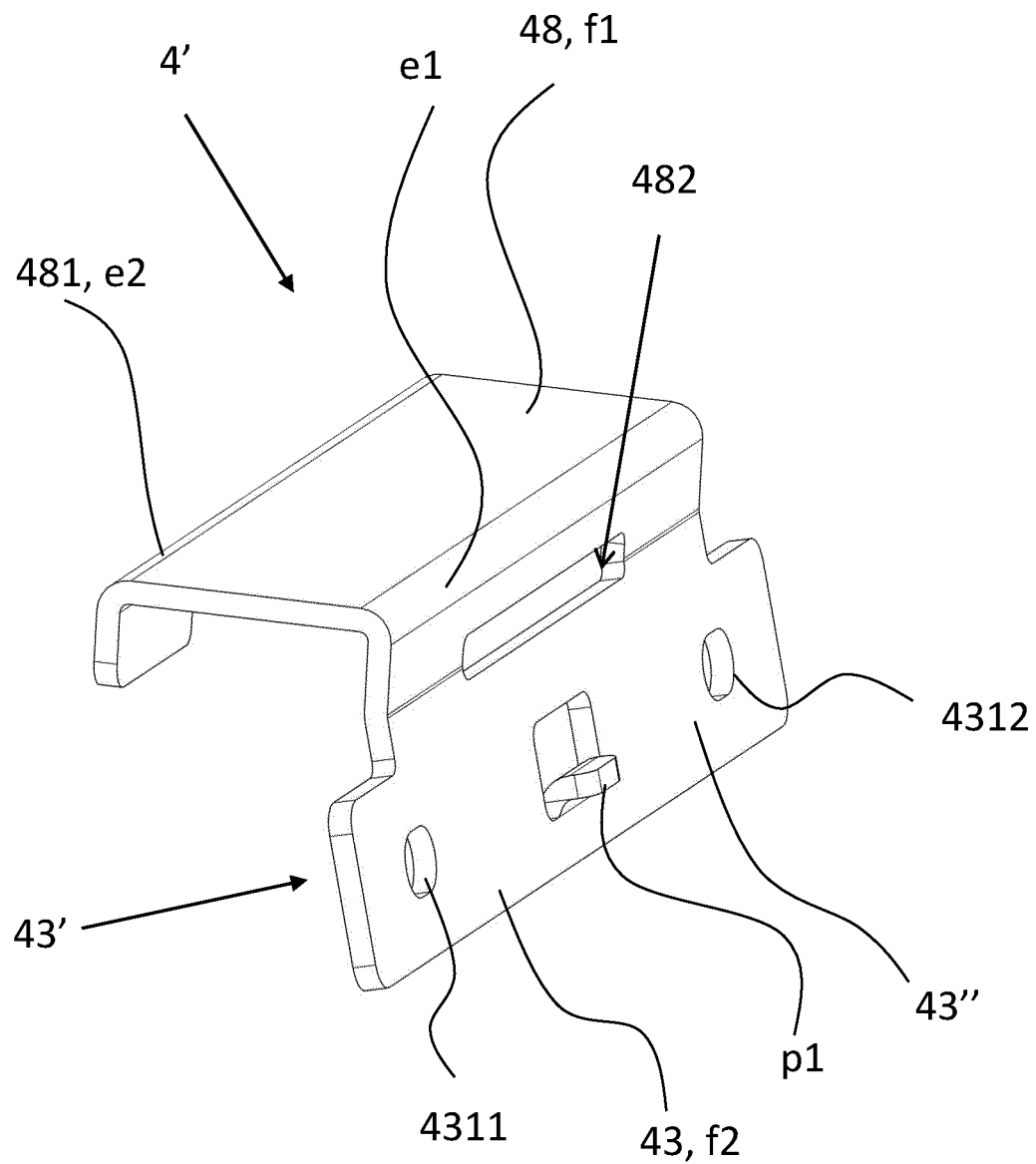
FIGS. 17a-d show a roof rack bracket, a roof rack foot assembly, a roof rack and a vehicle roof rail assembly according to example embodiments of the present disclosure.

With respect to FIG. 17a, a roof rack bracket 4' for a roof rack foot 1' (not shown) according to an example embodiment of the sixteenth aspect of the disclosure is shown in perspective view. The directions/axes x, y and z as indicated in the figure are the same directions as presented in the above. The roof rack bracket 4' comprises a vehicle attachment portion 43 configured for attachment to a fix point attachment position of a vehicle by use of at least one fixation means 5 (not shown). The fixation means 5 may be a screw or bolt as already mentioned in the above with respect to the other aspects of the disclosure. The roof rack bracket 4' further comprises a roof rack foot attachment portion 48 comprising a first and a second engagement portion 481, 482 adapted for engagement with a respective first and second clamping member 61', 62' (not shown) of the roof rack foot 1'. An example of a roof rack foot 1' with such clamping members 61', 62' is shown in FIGS. 17c and d.

As shown in e.g. FIG. 17a, the roof rack bracket 4' may comprise a first and a second flange f1, f2 which are connected and angled relative each other. In the shown embodiment, the angle is about 90 degrees, even though other angles are also conceivable, such as an angle in the range of 90+−45 degrees. The first engagement portion 481 is located on the first flange f1 and the second engagement portion 482 is located on the second flange f2 and in the vicinity of a connection interface between the first flange f1 and the second flange f2.

Further, as shown, the vehicle attachment portion 43 may be located on the second flange f2. In the shown embodiment, the vehicle attachment portion 43 comprises two apertures 4311, 4312 for the fixation means 5 (not shown). As shown, the apertures 4311, 4312 may be offset from each other with respect to the x-axis, which may correspond to a travelling direction of the vehicle when the bracket 4' is attached thereto. Alternatively, or additionally, the apertures 4311, 4312, which also may be denoted receiving locations and not necessarily only be apertures, may be offset from each other with respect to the z-axis, which may correspond to a height extension of the vehicle when the bracket 4' is attached thereto. Having two or more receiving locations provided offset from each other in the x and/or z-axis may result in a more robust connection to the vehicle, implying improved load distribution and/or balance therebetween.

The first and second flanges f1, f2 may as shown together form a substantially L-shaped cross-sectional profile. The cross-section is defined by a plane being perpendicular to the x-axis. In the shown embodiment, the second flange f2 substantially extends along a plane defined by the x and z-axis, and the first flange f1 substantially extends along a plane defined by the x and y-axis, which also substantially corresponds to an extension of the vehicle roof when the roof rack bracket 4' is attached to the vehicle by the fixation means 5. Alternatively, the flanges f1 and f2 may also together form a substantially U-shaped cross sectional profile, implying further improved strength and rigidity.

The connection interface may as further shown comprise a first corner portion e1 between the first f1 and the second f2 flange. The first flange f1 comprises a second opposing corner portion e2 and/or edge with respect to the first corner portion e1, wherein the first engagement portion 481 is located in the vicinity of the second opposing corner portion e2 and/or edge. In one embodiment, and as shown, the second opposing corner portion e2 and/or edge is also acting as the first engagement portion 481.

As shown, the first corner portion e1 and the second opposing corner portion e2 and/or edge define a rail profile for the first and second clamping members 61', 62', which rail profile is intended to be directed substantially in a travelling direction x of the vehicle when the roof rack bracket 4' is attached to the vehicle.

In the embodiment shown in FIG. 17a, the second engagement portion 482 comprises a slot in which the clamping member 62' is inserted when the roof rack foot 1' is clamped to the roof rack bracket 4'. Thereby a secure and firm engagement to the roof rack bracket 4' is achieved. In the shown embodiment, the slot 482 extends along the x-axis, but may also extend in other directions in order to e.g. be adapted to the shape of the vehicle roof.

Figure 17B:
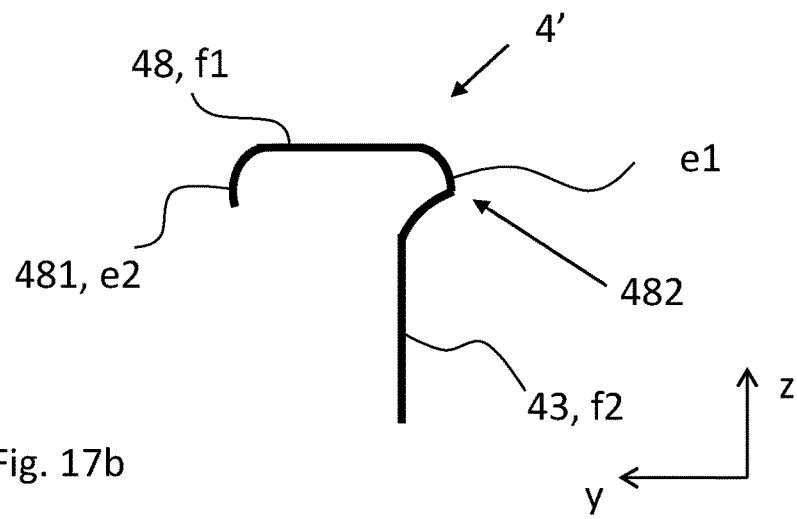
Figure 17C:
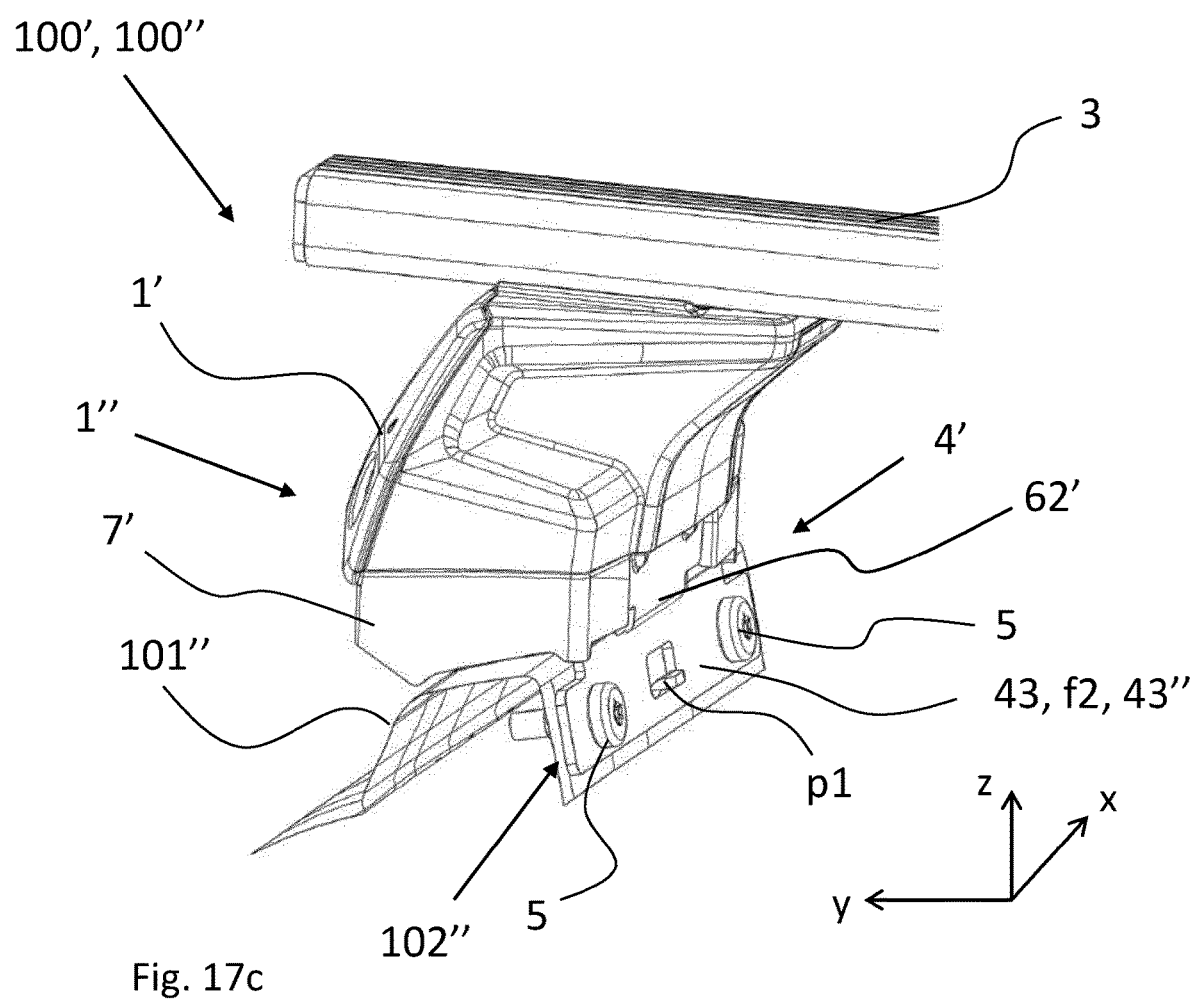

FIG. 17b shows a schematic cross-sectional view of a roof rack bracket 4' which also comprises a first and second flange f1, f2, as mentioned in the above. The cross-section is defined by a plane being perpendicular to the x-axis. In the shown embodiment, the second engagement portion 482 is formed by the first corner portion e1 bulging outwardly from the connection interface between the first and second flanges f1, f2, thereby forming a grip surface for the second clamping member 62' (not shown).

The roof rack bracket 4' may as shown in FIGS. 17a-d be a sheet-formed member, such as a sheet metal member.

Figure 17D:
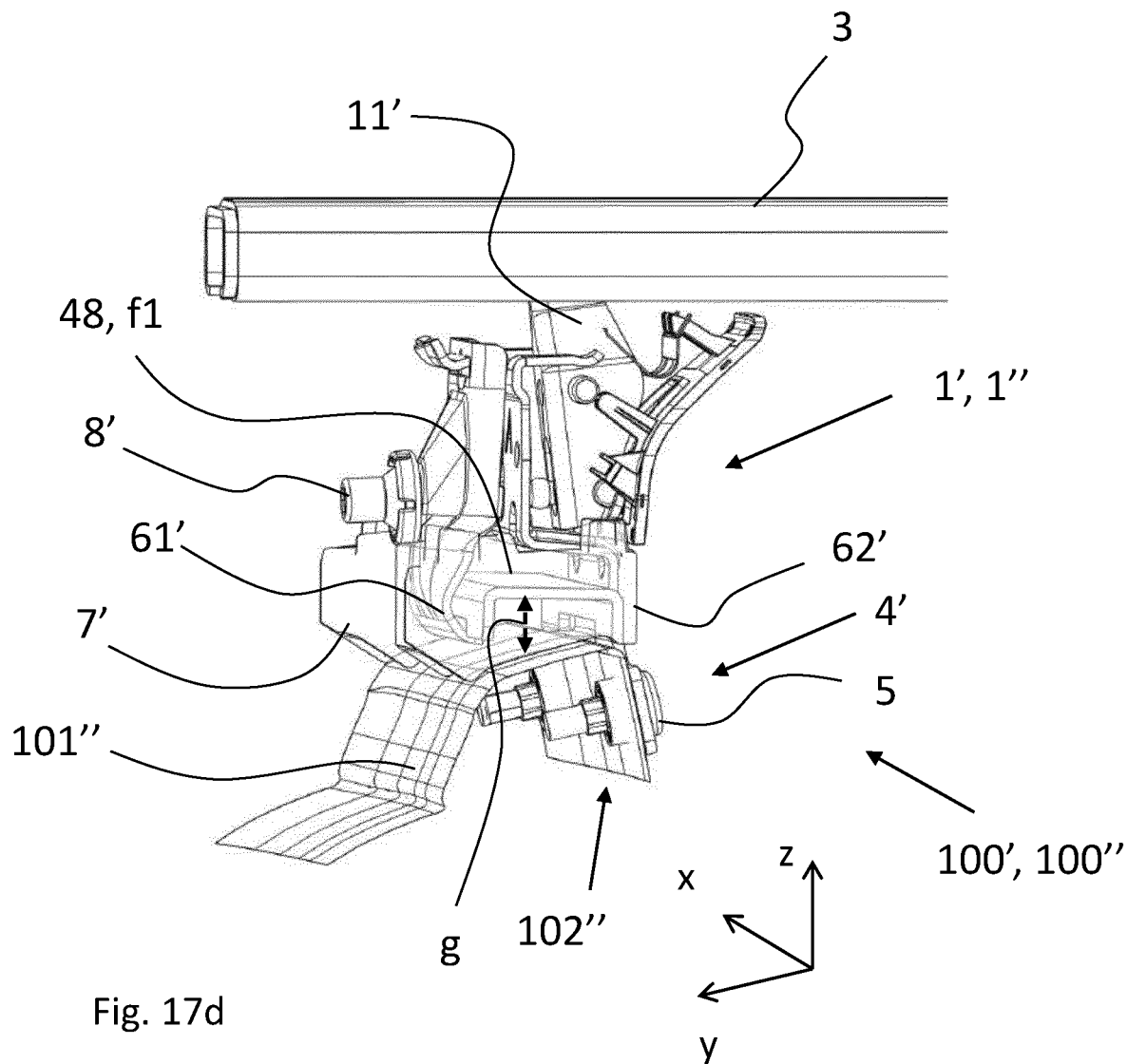

FIGS. 17c and d show perspective views of the roof rack bracket 4' in FIG. 17a when mounted to a vehicle. They further show when a roof rack foot 1' is mounted to the roof rack bracket 4'. The roof rack foot 1' comprises the first and the second clamping member 61', 62'. Accordingly, FIGS. 17c and d also show a roof rack foot assembly 1'' for a roof rack comprising the roof rack bracket 4' the roof rack foot 1'. In FIG. 17c, the roof rack foot 1' comprises a cover 12', such as a plastic cover. In FIG. 17d the cover 12' is not shown in order to better illustrate the e.g. the clamping members 61', 62'. The cover 12' is preferably releasably attached to the foot 1', and preferably comprises a locking function for preventing unwanted access to the inside of the foot 1'. Thereby the foot 1' may only be released from the vehicle by unlocking the locking function.

As shown in FIGS. 17a and c, the vehicle attachment portion 43 may comprise a first vehicle facing side 43' configured to face a roof rack bracket attachment portion 102'' when the roof rack bracket 4' is attached thereto and a second opposite side 43'' configured to face away from the roof rack bracket attachment portion 102'' when the roof rack bracket 4' is attached thereto. The second opposite side 43'' may as shown comprise a protruding member p1 for inhibiting mounting of the bracket 4' with the second opposite side 43'' facing the roof rack bracket attachment portion 102'' of the vehicle. In the shown embodiments, the protruding member p1 is an outwardly bent portion of the sheet-formed member. The figures further show a roof rack 100' for a vehicle comprising the roof rack foot assembly 1'' and one crossbar 3.

The first and second engagement portions 481, 482 are as shown arranged and/or formed on the roof rack bracket 4' such that, when the roof rack foot 1' is clamped to the bracket 4', the first engagement portion 481 together with the first clamping member 61' generates a clamping force at an interface between the second engagement portion 482 and the second clamping member 62', and the second engagement portion 482 together with the second clamping member 62' generates a clamping force at an interface between the first engagement portion 481 and the first clamping member 61'.

A distance between the first and second engagement portions 481, 482 may be at least 10 mm, 15 mm, 20 mm, 25 mm or 30 mm. Further, the distance may also be less than 60 mm, 50 mm or 40 mm, so as to correspond to the size of a vehicle roof rail.

In the shown embodiments, the first engagement portions 481 is a corner portion for engaging with the respective first clamping members 61', and the second engagement portion 482 is a slot (FIGS. 17a, c and d) or a bulging corner portion (FIG. 17b). Of course, the skilled person will realize that any combination of corner portions, slots etc. can be used for providing the first and/or second engagement portions 481, 482.

FIGS. 17 c and d further shows a vehicle roof rail assembly 100'' which comprises a roof rail 101'' fixedly attached to the roof of a vehicle (not shown). It further comprises the roof rack bracket 4'. The roof rail 100'' comprises a roof rack bracket attachment portion 102'' for attachment of the roof rack bracket 4' by use of at least one fixation means 5, which here are two screws provided in the apertures 4311, 4312. In addition, as shown, the vehicle attachment portion 43 is adapted to be attached to the roof rack bracket attachment portion 102''. In the shown embodiment, the roof rack bracket attachment portion 102'' is provided on a side surface the roof rail 101'', more particularly on an inside side surface of the roof rail 101'' facing towards a corresponding roof rail (not shown) on an opposite side of the vehicle. Alternatively, the roof rack bracket attachment portion 102'' may be provided on a side surface of the roof rail 101'' facing away from the roof rail 101'' in a transverse direction y of the vehicle and/or may be provided on an upwardly facing surface facing upwardly in the z-direction with respect of the vehicle.

Alternatively, in another embodiment, the roof rack bracket 4' may be mounted on a side surface of the vehicle facing away from the vehicle in its transverse direction. Accordingly, the roof rack bracket 4' may be attached to any suitable surface of the vehicle.

Further, the roof rack bracket 4' may as shown in FIG. 17*d* be configured such that there is a gap g in the z-direction between the roof rack foot attachment portion 48 and the vehicle and/or the vehicle roof rail 101" when the roof rack bracket 4' is mounted to the vehicle. The gap g may thus also be a gap with respect to the first flange f1. For example, the gap g may be at least 5 mm, 10 mm, 15 mm, 20 mm, 25 mm or 30 mm. By providing a gap g, the risk of scratching and/or damaging the vehicle can be reduced. Still optionally, the gap g, and accordingly also the roof rack foot 1', may comprise a foot pad member 7' for protecting the vehicle. The foot pad member 7' may e.g. be made of rubber or any other suitable material for protecting the vehicle.

In addition, as shown in FIG. 17*d*, the roof rack foot 1' may further comprise a fixation member 8' for tightening the clamping members 61', 62' together. Accordingly, by rotating the fixation member 8', which here is a screw, in a first direction, a distance between the clamping members 61', 62' in the y-direction will be decreased. Consequently, by rotating of the fixation member 8' in an opposite direction, the distance will be increased, thereby eventually releasing the roof rack foot 1' from the roof rack bracket 4'. The rotation is clockwise and counterclockwise or vice versa. Other fixation members 8' are also possible within the scope of the disclosure, such as providing a lever arm for tightening/releasing the clamping members 61', 62'.

Further, as shown in FIG. 17*d*, the roof rack foot 1' may be connected to the crossbar 3 by an anchor member 11'. However, also other connections to the crossbar 3 are possible, as e.g. mentioned in the above with respect to other embodiments of the disclosure.

It is to be understood that the present disclosure is not limited to the embodiments described above and illustrated in the drawings; rather, the skilled person will recognize that many changes and modifications may be made within the scope of the appended claims.

In the following, possible features and feature combinations of the roof rack foot assembly according to the third and fourth aspects of the disclosure are disclosed, presented as items:

Items (Third and Fourth Aspects of the Disclosure)

1. A roof rack foot assembly (1) for a roof rack (100), comprising:
    a carrier member (2) for carrying a crossbar (3) of the roof rack;
    a bracket (4) configured for attachment to a fix point attachment position of a vehicle by use of a fixation means (5), such as a screw or bolt,
    an engagement member (6) connected to the carrier member for rigidly attaching the carrier member to the bracket;
    wherein the bracket comprises an engagement portion (41) and a seat portion (42) for the carrier member, wherein the engagement member is adapted to attach the carrier member to the bracket by engagement with the engagement portion of the bracket, and wherein the carrier member and the seat portion are adapted so that the carrier member, in a first attachment state, is movable in the seat portion by pivoting the carrier member with respect to a rotational axis of the carrier member when the carrier member is not rigidly attached to the bracket;
    a carrier member fixation means (8), such as a screw or bolt, adapted for providing a secure engagement between the engagement member and the engagement portion so that the carrier member is rigidly attached to the bracket,
    characterized in that,
    the roof rack foot assembly is configured so that the carrier member fixation means extends through, or in the proximity of, the rotational axis.

2. The roof rack foot assembly according to item 1, wherein the carrier member has at least one curved outer surface which is adapted to be in contact with the seat portion when being attached to the bracket, and
    wherein the at least one curved outer surface, in the first attachment state, is configured to be movable in the seat portion by pivoting the carrier member with respect to the rotational axis of the carrier member, wherein a distance from the rotational axis to any point on the outer curved surface which is adapted to be in contact with the seat portion is at least 40%, 50%, 60%, 70% or greater than a transverse length of the bracket, as seen along a transverse extension of the bracket.

3. The roof rack foot assembly according to item 2, wherein the seat portion has a main extension in the transverse extension of the bracket.

4. The roof rack foot assembly according to any one of items 2 or 3, wherein the transverse extension of the bracket is extending along a transverse axis thereof, and wherein the bracket has a longitudinal extension along a longitudinal axis thereof, wherein the longitudinal axis of the bracket and the transverse axis of the bracket are perpendicular to each other, and wherein the longitudinal axis of the bracket is intended to at least mainly extend in a travelling direction of the vehicle when the roof rack foot assembly is attached to the vehicle.

5. The roof rack foot assembly according to any one of the preceding items, wherein the engagement member comprises a bracket support surface (61) and the bracket comprises an engagement member support surface (45), wherein the bracket support surface and the engagement member support surface are adapted to contact each other and to provide a first tension force therebetween when the carrier member is rigidly attached to the bracket, which first tension force is mainly directed in a horizontal direction, as seen when the roof rack foot assembly is mounted on a vehicle positioned on a flat horizontally extending surface.

6. The roof rack foot assembly according to any one of the preceding items, wherein the engagement member is pivotally connected to the carrier member with respect to a pivot axis (PA), wherein the pivot axis is arranged to be moved in a track (62) provided on or in the engagement member or on or in the carrier member.

7. The roof rack foot assembly according to item 6, wherein the track is inclined with respect to a horizontal plane so that a second tension force between the engagement member and the engagement portion is provided when the carrier member is rigidly attached to the bracket, which second tension force is mainly directed in a vertical direction, as seen when the roof rack foot assembly is mounted on a vehicle positioned on a flat horizontally extending surface.

8. The roof rack foot assembly according to any one of the preceding items, further comprising a foot pad member (7), wherein the foot pad member is adapted to be positioned in-between the bracket and the vehicle when the bracket is attached to the fix point attachment position, wherein the bracket and the foot pad member may be provided as separate components or may be integrated as a one-piece member.

9. The roof rack foot assembly according to any one of the preceding items, wherein the engagement portion is positioned vertically above the seat portion, as seen when the roof rack foot assembly is mounted on a vehicle positioned on a flat horizontally extending surface.

10. The roof rack foot assembly according to any one of the preceding items, wherein the bracket is a sheet-formed member, such as a sheet metal member, wherein seat portion is provided on a main surface of the sheet-formed member.

11. The roof rack foot assembly according to item 10, wherein the bracket has an L-shaped and/or U-shaped cross section, which cross section is defined by a plane which is perpendicular to a longitudinal axis of the bracket, which axis is preferably intended to at least mainly extend in a travelling direction of the vehicle when the roof rack foot assembly is attached to the vehicle.

12. The roof rack foot assembly according to any one of the preceding items, wherein the seat portion comprises a first (421) and a second (422) support surface.

13. A roof rack (100) for a vehicle comprising at least one roof rack foot assembly according to any one of the preceding items and at least one crossbar.

In the following, possible features and feature combinations of the roof rack foot assembly according to the fifth and sixth aspects of the disclosure are disclosed, presented as items:

Items (Fifth and Sixth Aspects of the Disclosure)

1. A roof rack foot assembly (1) for a roof rack (100), comprising:
    a carrier member (2) for carrying a crossbar (3) of the roof rack;
    a bracket (4) configured for attachment to a fix point attachment position of a vehicle by use of a fixation means (5), such as a screw or bolt,
    wherein the bracket comprises an engagement portion (41) and a seat portion (42) for the carrier member, and wherein the bracket comprises a top side (Ts) facing the carrier member and a bottom side (Bs) provided on an opposite side with respect to the top side, wherein the seat portion is provided on the top side, and wherein the engagement portion and the seat portion are spaced apart from each other,
    characterized in that,
    the engagement portion is provided at the top side of the bracket.

2. The roof rack foot assembly according to item 1, wherein the engagement portion is positioned vertically above the seat portion, as seen when the roof rack foot assembly is mounted on a vehicle positioned on a flat horizontally extending surface.

3. The roof rack foot assembly according to any one of the preceding items, wherein the bracket has an L-shaped and/or U-shaped cross section, which cross section is defined by a plane which is perpendicular to a longitudinal axis of the bracket, which axis is preferably intended to at least mainly extend in a travelling direction of the vehicle when the roof rack foot assembly is attached to the vehicle.

4. The roof rack foot assembly according to items 2 and 3, wherein the engagement portion is provided on a portion of the bracket which extends in the vertical direction.

5. The roof rack foot assembly according to any one of the preceding items, wherein the bracket is a sheet-formed member, such as a sheet metal member, wherein the first and second support surfaces are provided on a main surface of the sheet-formed member.

6. The roof rack foot assembly according to any one of the preceding items, wherein the engagement portion is defined by at least one aperture in the bracket into which an engagement member associated with the carrier member may be inserted for rigidly attaching the carrier member to the bracket.

7. The roof rack foot assembly according to item 6, further comprising the engagement member associated with the carrier member, wherein the engagement member comprises at least one hook-formed portion adapted to be inserted into the at least one aperture for rigidly attaching the carrier member to the bracket.

8. A roof rack (100) for a vehicle comprising at least one roof rack foot assembly according to any one of the preceding items and at least one crossbar.

In the following, possible features and feature combinations of the roof rack foot assembly according to the seventh and eighth aspects of the disclosure are disclosed, presented as items:

Items (Seventh and Eighth Aspects of the Disclosure)

1. A roof rack foot assembly (1) for a roof rack (100), comprising:
    a carrier member (2) for carrying a crossbar (3) of the roof rack;
    an engagement member (6) connected to the carrier member;
    a bracket (4) configured for attachment to a fix point attachment position of a vehicle by use of a fixation means (5), such as a screw or bolt,
    wherein the bracket comprises an engagement portion (41) for the engagement member,
    wherein the engagement member is adapted to rigidly attach the carrier member to the bracket by engagement with the engagement portion of the bracket, the engagement member comprises at least one hook member (63) adapted to engage with the engagement portion of the bracket,
    characterized in that,
    the at least one hook member is formed by a wall section extending in a height direction and a depth direction of the roof rack foot assembly, wherein the depth direction is coinciding with a transverse direction of the vehicle, when attached thereto.

2. The roof rack foot assembly according to item 1, wherein the bracket further comprises a seat portion for the carrier member.

3. The roof rack foot assembly according to item 2, wherein the engagement portion of the bracket is positioned vertically above the seat portion, as seen when the roof rack foot assembly is mounted on a vehicle positioned on a flat horizontally extending surface.

4. The roof rack foot assembly according to any one of the preceding items, wherein the engagement member is a sheet-formed member, such as a sheet metal member.

5. The roof rack foot assembly according to any one of the preceding items, wherein the engagement member has an L-shaped and/or U-shaped cross section, which cross section is defined by a plane which is perpendicular to the height direction.

6. The roof rack foot assembly according to any one of the preceding items, wherein the bracket is a sheet-formed member, such as a sheet metal member, wherein the engagement portion is provided on a side surface of the sheet-formed member.

7. The roof rack foot assembly according to any one of the preceding items, wherein the bracket has an L-shaped and/or U-shaped cross section, which cross section is defined by a plane which is perpendicular to a longitudinal axis of the bracket, which axis is preferably intended to at least mainly extend in a travelling direction of the vehicle when the roof rack foot assembly is attached to the vehicle.

8. A roof rack (100) for a vehicle comprising at least one roof rack foot assembly according to any one of the preceding claims and at least one crossbar.

In the following, possible features and feature combinations of a cover attachment device according to the ninth and tenth aspects of the disclosure are disclosed, presented as items:

Items (Ninth and Tenth Aspects of the Disclosure)

1. A cover attachment device (9) for a bracket (4) for a roof rack foot assembly (1) for a roof rack (100) for a vehicle, comprising:
   - a bracket facing away surface (91) adapted to protect the bracket externally when the cover attachment device (9) is attached to the bracket;
   - a bracket facing surface (92) adapted to face the bracket when the cover attachment device is attached to the bracket; wherein the cover attachment device further comprises at least one protruding portion (93) which protrudes out from the bracket facing surface, wherein the at least one protruding portion is configured to attach the cover attachment device to the bracket by a snap-fit connection.

2. The cover attachment device according to item 1, wherein the at least one protruding portion is configured to resiliently flex so as to be able to snap in to an engagement portion of the bracket.

3. The cover attachment device according to item 2, wherein the at least one protruding portion is configured to resiliently flex in a horizontal direction, as seen when the cover attachment device and the bracket are attached to the vehicle.

4. The cover attachment device according to any one of the preceding items, wherein the at least one protruding portion comprises a waist section (931) and an outer engaging section (932) provided outside the waist section with respect to the bracket facing surface, wherein the outer engaging section is configured to snap in to the engagement portion of the bracket.

5. The cover attachment device according to any one of the preceding items, further comprising a lock-member (95) configured to lock the cover attachment device to the bracket.

6. The cover attachment device according to item 5, wherein the lock member is arranged to prevent the at least one protruding portion to release the snap-fit connection to the bracket when the lock member is in a locked state.

7. A bracket and cover attachment device kit and/or assembly for a roof rack foot assembly (1) for a roof rack (100) for a vehicle, comprising the cover attachment device according to any one of the preceding items and a bracket.

In the following, possible features and feature combinations of a screw anti-rotation device according to the eleventh and twelfth aspects of the disclosure are disclosed, presented as items:

Items (Eleventh and Twelfth Aspects of the Disclosure)

1. A screw anti-rotation device (10) for a screw (5) of a roof rack (100), wherein the screw anti-rotation device is configured to prevent the screw from loosening when being attached to a member, the screw anti-rotation device comprising:
   - a screw facing surface (101) adapted to receive the screw;
   - a screw facing away surface (102) adapted to face the member to which the screw is attached;
   - wherein the screw facing surface is rounded so that the screw anti-rotation device can be angled with respect to the screw in more than one angle position when the screw is attached to the member and/or the screw facing away surface is rounded so that the screw anti-rotation device can be angled with respect to the member in more than one angle position when the screw is attached to the member.

2. The screw anti-rotation device according to item 1, wherein the roof rack comprises a roof rack foot assembly (1) comprising a bracket (4), wherein the screw is configured to attach the bracket to a vehicle by use of the screw and by attaching the screw to the vehicle via an aperture (431, 432, 433) in the bracket.

3. The screw anti-rotation device according to any one of the preceding items, wherein the angle position with respect to the screw and the screw anti-rotation device can be varied in a range of +−5 degrees and/or wherein the angle position with respect to the screw anti-rotation device and the member, preferably the bracket according to item 2, can be varied in a range of +−5 degrees.

4. The screw anti-rotation device according to any one of the preceding items, wherein the screw facing surface has a quadrilateral-shaped form, such as a square-shaped form or rectangular-shaped form, as seen from above when the screw anti-rotation device is provided at the member, such as at the aperture of the bracket, wherein at least two sides of the quadrilateral-shaped form are configured to contact a respective side of a head of the screw.

5. The screw anti-rotation device according to item 4, wherein the at least two sides are resiliently flexible so as to allow the screw from being screwed into a hole of the vehicle but to prevent the screw from being un-screwed from the hole when provided therein.

6. The screw anti-rotation device according to any one of the preceding items, further comprising at least one anti-rotation protruding portion (105) provided on the screw facing away surface.

7. A roof rack (100) comprising the screw anti-rotation device according to any one of the preceding items.

In the following, possible features and feature combinations of a roof rack foot assembly and a roof rack according to the thirteenth and fourteenth aspects of the disclosure are disclosed, presented as items:

Items (Thirteenth and Fourteenth Aspects of the Disclosure)

1. A roof rack foot assembly (1) for a roof rack (100), comprising,
   - a carrier member (2) for carrying a crossbar (3) of the roof rack, the carrier member (2) comprising a first support portion (21),
   - a bracket (4) configured for attachment to a fix point attachment position of a vehicle by use of at least one fixation means (5), such as a screw or bolt, wherein the bracket (4) comprises a seat portion (42) for the carrier member (2), wherein the seat portion (42) is adapted to receive the first support portion (21) of the carrier member (2) when the carrier member is attached to the bracket (4), and wherein the seat portion (42) and/or the first support portion (21) is/are adapted so that the carrier member (2), in a first attachment state when the carrier member (2) is not rigidly attached to the bracket (4), is movable in the seat portion (42) by allowing the carrier member (2) to pivot with respect to a rotational axis (RC) of the carrier member (2),
   - characterized in that,
   - the seat portion (42) extends in a transverse direction (y) of the bracket (4) which is substantially perpendicular to the rotational axis (RC) and is delimited by two outer transverse end portions (t1, t2), wherein a distance ($L_{1-2}$) in the transverse direction (y) between the two outer transverse end portions (t1, t2) is at least 35%, 40%, 45% or 50% of a transverse length (d') of the bracket measured at any location along the seat portion (42), and/or the bracket (4) comprises a receiving location (431, 432) for the at least one fixation means (5), wherein the receiving location (431, 432) is offset from the seat portion (42), as seen in the transverse direction (y) which is substantially perpendicular to the rotational axis (RC) of the carrier member (2).

2. The roof rack foot assembly (1) according to item 1, wherein the bracket (4) comprises two receiving locations (431, 432) for respective fixation means (5) for attachment to the fix point attachment position, the two receiving locations (431, 432) being provided offset from each other along the direction of the rotational axis (RC), preferably wherein each receiving location is offset from the seat portion (42), as seen in the transverse direction (y).

3. The roof rack foot assembly (1) according to any one of the preceding items, wherein the receiving location (431, 432) is an aperture.

4. The roof rack foot assembly (1) according to any one of the preceding items, wherein the first support portion (21) of the carrier member (2) is adapted to be in contact with the two outer transverse end portions (t1, t2) when the carrier member (2) is rigidly attached to the bracket, corresponding to a second attachment state.

5. The roof rack foot assembly (1) according to any one of the preceding items, wherein the bracket (4) comprises a top side facing the carrier member (2) when the carrier member (2) is attached to the bracket (4), wherein the seat portion (42) and the receiving location (431, 432) are provided on the top side of the bracket (4).

6. The roof rack foot assembly (1) according to any one of the preceding items, wherein the receiving location (431, 432) is partly, or completely, located within two outer longitudinal end portions of the seat portion (42), as seen in a longitudinal direction (x) of the bracket (4) corresponding to the direction of the rotational axis (RC).

7. The roof rack foot assembly (1) according to any one of the preceding items, wherein the first support portion (21) of the carrier member (2) comprises a curved outer surface which is adapted to be in contact with the seat portion (42) when the carrier member (2) is attached to the bracket (4), wherein the carrier member (2), by use of the curved outer surface, is movable in the seat portion (42) by allowing the carrier member (2) to pivot with respect to the rotational axis (RC) of the carrier member (2) in the first attachment state.

8. The roof rack foot assembly (1) according to item 7, wherein a radial distance from the rotational axis (RC) to any point on the outer curved surface which is adapted to be in contact with the seat portion is at least 40%, 50%, 60%, 70% or greater than the transverse length (d') of the bracket (4) measured at any location along the seat portion (42).

9. The roof rack foot assembly (1) according to any one of the preceding items, wherein the bracket (4) is configured such that its longitudinal direction (x), corresponding to the direction of the rotational axis (RC), is mainly extending in a travelling direction of the vehicle when the roof rack foot assembly is attached to the vehicle.

10. The roof rack foot assembly (1) according to any one of the preceding items, wherein the seat portion (42) comprises a first (421) and a second (422) support surface, preferably spaced apart from each other, such as spaced apart in the longitudinal direction (x) of the bracket (4), and wherein the carrier member (2) comprises the first support portion (21) and a second support portion (22), wherein each support surface (421, 422) is adapted to receive the respective first (21) and second (22) support portion of the carrier member (2) when the carrier member is attached to the bracket (4).

11. The roof rack foot assembly (1) according to any one of the preceding items, further comprising an engagement member (6) connected to the carrier member (2) for rigidly attaching the carrier member (2) to the bracket (4), wherein the engagement member (6) is adapted to attach the carrier member (2) to the bracket (4) by engagement with an engagement portion (41) of the bracket (4), preferably by clamping the carrier member (2) to the bracket (4) by applying a pulling force therebetween.

12. The roof rack foot assembly (1) according to item 11, wherein the bracket (4) comprises a top side facing the carrier member (2) and a bottom side provided on an opposite side with respect to the top side, wherein the seat portion (42) is provided on the top side of the bracket (4), and wherein the engagement portion ( ) is positioned above the seat portion (42), as seen when the roof rack foot assembly (1) is mounted on a vehicle positioned on a flat horizontally extending surface.

13. The roof rack foot assembly (1) according to item 11, wherein the bracket (4) comprises a top side facing the carrier member (2) and a bottom side provided on an opposite side with respect to the top side, and wherein the engagement portion ( ) is positioned on the bottom side of the bracket (4).

14. The roof rack foot assembly (1) according to any one of the preceding items, wherein the seat portion (42) is at least one slot, aperture or immersed portion on a surface of the bracket (4), or any combinations therebetween.

15. A roof rack (100) for a vehicle comprising at least one roof rack foot assembly (1) according to any one of the preceding items and at least one crossbar (3).

In the following, possible features and feature combinations of a cover attachment device for a bracket for a roof rack foot assembly for a roof rack for a vehicle according to the fifteenth aspect of the disclosure is disclosed, presented as items:

Items (Fifteenth Aspect of the Disclosure)

1. A cover attachment device (9) for a bracket (4) for a roof rack foot assembly (1) for a roof rack (100) for a vehicle, comprising:
   a cover (9') having:
   a bracket facing away surface (91) adapted to cover the bracket when the cover attachment device (9) is attached to the bracket (4); and
   a bracket facing surface (92) adapted to face the bracket (4) when the cover attachment device (9) is attached to the bracket; the cover attachment device (9) further comprising:
   a lock member (95) configured to lock the cover attachment device to the bracket.

2. The cover attachment device (9) according to item 1, wherein the cover attachment device (9) is adapted such that the lock member (95) is movable between a locked position where the cover attachment device (9) is locked to the bracket (4) and an unlocked position where the cover attachment device (9) is removable from the bracket (4).

3. The cover attachment device (9) according to item 2, wherein the cover attachment device (9) is adapted such that the lock member (95) is rotatable with respect to a lock member rotational axis (RI) between the locked position and the unlocked position.

4. The cover attachment device (9) according to item 2, wherein the cover attachment device (9) is adapted such that the lock member (95) is rotatable with respect to a lock member rotational axis (RI) between the locked position and an intermediate locked position, and movable in the direction of the lock member rotational axis (RI) between the intermediate locked position and the unlocked position.

5. The cover attachment device (9) according to item 4, wherein the cover attachment device (9) is adapted such that the lock member (95) is prevented from being moved in the direction of the lock member rotational axis (RI) when being in the locked position.

6. The cover attachment device (9) according to item 5, wherein the lock member (95) is prevented from being moved in the direction of the lock member rotational axis (RI) when being in the locked position by the lock member (95) engaging with a stopping surface (951) of the cover (9').

7. The cover attachment device (9) according to item 4, 5 or 6, wherein the cover attachment device (9) is adapted such that the lock member (95) is spring biased from the unlocked position towards the intermediate locked position in the direction of the lock member rotational axis (RI).

8. The cover attachment device (9) according to any one of items 4-7, wherein the bracket facing away surface (91) and/or the lock member (95) is/are adapted such that an outwardly facing surface (953) of the lock member (95) protrudes with respect to the bracket facing away surface (92) when the lock member (95) is in the intermediate locked position.

9. The cover attachment device (9) according to any one of items 3-8, wherein the lock member (95) and/or the cover (9') is/are adapted such that the lock member (95) is prevented from being rotated from at least one of the locked and unlocked/intermediate locked positions towards the other position until a rotational torque acting on the lock member (95) exceeds a torque threshold limit.

10. The cover attachment device (9) according to any one of items 3-9, wherein the lock member (95) on an outwardly facing surface thereof (952) comprises a key or tool receiving portion (9531) adapted to rotationally lock a key or tool to the lock member (95) when the key or tool is connected to the key or tool receiving portion (9531).

11. The cover attachment device (9) according to any one of the preceding items, wherein the cover attachment device (9) further comprises at least one protruding portion (93) on an inside of the cover (9') defined by the bracket facing surface (92), wherein the at least one protruding portion (93) is configured to attach the cover attachment device (9) to the bracket (4) by a snap-fit connection.

12. The cover attachment device (9) according to item 11, wherein the lock member (95) is arranged to prevent the at least one protruding portion (93) to release the snap-fit connection to the bracket when the lock member (95) is in the locked position.

13. The cover attachment device (9) according to item 12, further comprising an intermediate resilient element (96) biasing the lock member (95) towards the locked position/intermediate locked position and configured to lock the cover attachment device (9) to the bracket (4).

14. The cover attachment device (9) according to any one of items 2-13, wherein the bracket facing away surface (91) and/or the lock member (95) is/are adapted such that an outwardly facing surface (953) of the lock member is flush with the bracket facing away surface (91) when the lock member (95) is in the locked position.

In the following, possible features and feature combinations of a roof rack bracket, a roof rack foot assembly, a roof rack and a vehicle roof rail assembly according to the sixteenth, seventeenth, eighteenth and nineteenth aspects of the disclosure are disclosed, presented as items:

Items (Sixteenth, Seventeenth, Eighteenth and Nineteenth Aspects of the Disclosure)

1. A roof rack bracket (4') for a roof rack foot (1'), comprising:
   a vehicle attachment portion (43) configured for attachment to a fix point attachment position of a vehicle by use of at least one fixation means (5);
   a roof rack foot attachment portion (48) comprising a first and a second engagement portion (481, 482) adapted for engagement with a respective first and second clamping member (61', 62') of the roof rack foot (1').

2. The roof rack bracket (4') according to item 1, wherein the first and second engagement portions (481, 482) are arranged and/or formed on the roof rack bracket (4') such that, when the roof rack foot (1') is clamped to the bracket (4'), the first engagement portion (481) together with the first clamping member (61') generates a clamping force at an interface between the second engagement portion (482) and the second clamping member (62'), and the second engagement portion (482) together with the second clamping member (62') generates a clamping force at an interface between the first engagement portion (481) and the first clamping member (61').

3. The roof rack bracket (4') according to any one of the preceding items, wherein a distance between the first and second engagement portions (481, 482) is at least 10 mm, 15 mm, 20 mm, 25 mm or 30 mm.

4. The roof rack bracket (4') according to any one of the preceding items, wherein any one of the first and second engagement portions (481, 482) is one or more slot(s), opening(s), corner portion(s), cut-out(s) or groove(s) for engaging with the respective first and second clamping members, or any combinations therebetween.

5. The roof rack bracket (4') according to any one of the preceding items, comprising a first and a second flange (f1, f2) which are connected and angled relative each other, wherein the first engagement portion (481) is located on the first flange (f1) and the second engagement portion (482) is located on the second flange (f2) and/or in the vicinity of a connection interface between the first flange (f1) and the second flange (f2).

6. The roof rack bracket (4') according to item 5, wherein the vehicle attachment portion (43) is located on the second flange (f2).

7. The roof rack bracket (4') according to any one of items 5 or 6, wherein the first and second flanges (f1, f2) together form a substantially L-shaped cross-sectional profile.

8. The roof rack bracket (4') according to any one of items 5-7, wherein the connection interface comprises a first corner portion (e1) between the first (f1) and the second (f2) flange, wherein the first flange (f1) comprises a second opposing corner portion (e2) and/or edge with respect to the first corner portion (e1), wherein the first engagement portion (481) is located in the vicinity of the second opposing corner portion (e2) and/or edge.

9. The roof rack bracket (4') according to item 8, wherein the first corner portion (e1) and the second opposing corner portion (e2) and/or edge defines a rail profile for the first and second clamping members, which rail profile is intended to be directed substantially in a travelling direction of the vehicle when the roof rack bracket is attached to the vehicle.

10. The roof rack bracket (4') according to any one of items 8 or 9, wherein the second engagement portion (482) is formed by the first corner portion (e1) bulging outwardly from the connection interface, thereby forming a grip surface for the second clamping member (62').

11. The roof rack bracket (4') according to any one of the preceding items, wherein the roof rack bracket is a sheet-formed member, such as a sheet metal member.

12. The roof rack bracket (4') according to any one of the preceding items, wherein the vehicle attachment portion (43) comprises a first vehicle facing side (43') configured to face a roof rack bracket attachment portion (102") of the vehicle when the roof rack bracket (4') is attached thereto and a second opposite side (43") configured to face away from the roof rack bracket attachment portion (102") when the roof rack bracket (4') is attached thereto, wherein the second opposite side (43") comprises a protruding member (p1) for inhibiting mounting of the bracket (4') with the second opposite side (43") facing the roof rack bracket attachment portion (102").

13. The roof rack bracket (4') according to any one of the preceding items, wherein the vehicle attachment portion (43) comprises at least one aperture for receiving the fixation means (5).

14. A roof rack foot assembly (1") for a roof rack comprising a roof rack bracket (4') according to any one of the proceeding items and a roof rack foot (1') comprising a first and a second clamping member (61', 62').

15. A roof rack (100') for a vehicle comprising the roof rack bracket (4') according to any one of items 1-13 or the roof rack foot assembly (1") according to item 14, and at least one crossbar (3).

16. A vehicle roof rail assembly (100"), comprising:
   a roof rail (101') fixedly attached to the roof of a vehicle;
   the roof rack bracket (4') according to any one of items 1-13;
   wherein the roof rail (101') comprises a roof rack bracket attachment portion (102") for attachment of the roof rack bracket by use of at least one fixation means (5), such as a screw or bolt; and
   wherein the vehicle attachment portion (43) is adapted to be attached to the roof rack bracket attachment portion (102").

17. The vehicle roof rail assembly (100") according to item 16, wherein the roof rack bracket attachment portion (102") is provided on a side surface of the roof rail (101') facing away from the roof rail (101') in a transverse direction of the vehicle and/or is provided on an upwardly facing surface of the roof rail (101') facing upwardly with respect of the vehicle.

The invention claimed is:

1. A roof rack foot assembly for a roof rack, the roof rack foot assembly comprising:
   a carrier member for carrying a crossbar of the roof rack, the carrier member comprising a first and a second support portion; and
   a bracket configured for attachment to a fix point attachment position of a vehicle by use of at least one fixation member,
   wherein the bracket comprises an engagement portion and a seat portion for the carrier member,
   wherein the seat portion comprises a first and a second support surface spaced apart in a direction parallel to a travel direction of the vehicle when the bracket is attached to the fix point attachment position of the vehicle,
   wherein each support surface is configured to receive the respective first and second support portions of the carrier member when the carrier member is attached to the bracket,
   wherein each support surface of the seat portion has a longitudinal extension along a respective longitudinal axis thereof, and
   wherein the first and second support surfaces are arranged on the bracket so that their longitudinal axes are substantially parallel to each other.

2. The roof rack foot assembly according to claim 1, further comprising an engagement member associated with the carrier member, the engagement member configured to clamp the carrier member to the bracket by applying a pulling force therebetween.

3. The roof rack foot assembly according to claim 1, wherein the first and second support surfaces of the seat portion and the first and second support portions of the carrier member are configured to transfer loads at least in a vertical direction, as seen when the roof rack foot assembly is attached to a vehicle positioned on a flat horizontally extending surface.

4. The roof rack foot assembly according to claim 1, wherein each support surface of the seat portion has a transverse extension along a respective transverse axis thereof,
   wherein the respective transverse axis is perpendicular to its respective longitudinal axis, and
   wherein each support surface has a length in its transverse extension which is shorter than a length in its longitudinal extension, or each support surface has a length in its transverse extension which is substantially equal to a length in its longitudinal extension.

5. The roof rack foot assembly according to claim 1, further comprising a foot pad member for protecting a vehicle roof,
   wherein the foot pad member is configured to be positioned between the bracket and the vehicle when the bracket is attached to the fix point attachment position.

6. The roof rack foot assembly according to claim 1, wherein the bracket comprises at least one receiving location for at least one of the fixation member.

7. The roof rack foot assembly according to claim 6, wherein the at least one receiving location is located in an area of the bracket between the first and second support surfaces.

8. The roof rack foot assembly according to claim 6, wherein the first and second support surfaces of the bracket comprise respective first and second longitudinal sides,
   wherein the first longitudinal side of the first support surface faces the first longitudinal side of the second support surface, and
   wherein the at least one receiving location is located outside and facing one of the second longitudinal sides.

9. The roof rack foot assembly according to claim 1, wherein the bracket has a longitudinal extension along a longitudinal axis thereof and a transverse extension along a transverse axis thereof,
   wherein the longitudinal axis of the bracket and the transverse axis of the bracket are perpendicular to each other,
   wherein the bracket is configured so that the longitudinal axis thereof substantially coincides with a travelling direction of the vehicle when the roof rack foot assembly is attached to the vehicle, and
   wherein the longitudinal axes of the first and second support surfaces extend in substantially the same direction as the direction of the transverse axis of the bracket.

10. The roof rack foot assembly according to claim 1, wherein the bracket has a longitudinal extension along a longitudinal axis thereof and a transverse extension along a transverse axis thereof,
   wherein the longitudinal axis of the bracket and the transverse axis of the bracket are perpendicular to each other,
   wherein the bracket is configured so that the longitudinal axis thereof substantially coincides with a travelling direction of the vehicle when the roof rack foot assembly is attached to the vehicle, and
   wherein the longitudinal axes of the first and second support surfaces extend in substantially the same direction as the direction of the longitudinal axis of the bracket.

11. The roof rack foot assembly according to claim 1, wherein the first and second support portions of the carrier member and the first and second support surfaces of the seat portion are configured so that the carrier member, in a first attachment state, is movable in the seat portion by pivoting the carrier member when the carrier member is not rigidly attached to the bracket.

12. The roof rack foot assembly according to claim 1, wherein the engagement portion is positioned vertically above the first and second support surfaces, as seen when the roof rack foot assembly is mounted on a vehicle positioned on a flat horizontally extending surface.

13. The roof rack foot assembly according to claim 1, wherein the bracket is a sheet-formed member, and
   wherein the first and second support surfaces are provided on a main surface of the sheet-formed member.

14. The roof rack foot assembly according to claim 13, wherein the bracket has an L-shaped and/or U-shaped cross section, wherein the cross section is defined by a plane perpendicular to the longitudinal axis of the bracket.

15. A roof rack for a vehicle, the roof rack comprising:
   at least one crossbar; and
   at least one roof rack foot assembly comprising:
      a carrier member for carrying a crossbar of the roof rack, the carrier member comprising a first and a second support portion; and
      a bracket configured for attachment to a fix point attachment position of a vehicle by use of at least one fixation member,
   wherein the bracket comprises an engagement portion and a seat portion for the carrier member,
   wherein the seat portion comprises a first and a second support surface,
   wherein each support surface is configured to receive the respective first and second support portion of the carrier member such that a load on the carrier member is transferred from the carrier member to the bracket in a vertical downward direction at both the first support surface and the second support surface when the carrier member is attached to the bracket,
   wherein each support surface of the seat portion has a longitudinal extension along a respective longitudinal axis thereof, and
   wherein the first and second support surfaces are arranged on the bracket so that their longitudinal axes are substantially parallel to each other.

16. A roof rack foot assembly for a roof rack, the roof rack foot assembly comprising:
   a carrier member for carrying a crossbar of the roof rack, the carrier member comprising a first support portion; and
   a bracket configured for attachment to a fix point attachment position of a vehicle by use of at least one fixation member, the bracket comprising a seat portion for the carrier member, the seat portion configured to receive the first support portion of the carrier member when the carrier member is attached to the bracket, the seat portion and/or the first support portion configured so that the carrier member, in a first attachment state when the carrier member is not rigidly attached to the bracket, is movable in the seat portion by allowing the carrier member to pivot with respect to a rotational axis of the carrier member,
   wherein the seat portion extends in a transverse direction of the bracket which is substantially perpendicular to the rotational axis and is delimited by two outer transverse end portions, wherein a distance in the transverse direction between the two outer transverse end portions is at least 35% of a transverse length of the bracket measured at any location along the seat portion, and/or
   wherein the bracket comprises a receiving location for the at least one fixation member, wherein the receiving location is offset from the seat portion, as seen in the transverse direction which is substantially perpendicular to the rotational axis of the carrier member.

17. The roof rack foot assembly according to claim 16, wherein the bracket comprises two receiving locations for respective fixation members for attachment to the fix point attachment position, the two receiving locations offset from each other along the direction of the rotational axis.

18. The roof rack foot assembly according to claim 16, wherein the receiving location is an aperture.

19. The roof rack foot assembly according to claim 16, wherein the first support portion of the carrier member is configured to be in contact with the two outer transverse end portions when the carrier member is rigidly attached to the bracket, corresponding to a second attachment state.

20. The roof rack foot assembly according to claim 16, wherein the bracket comprises a top side facing the carrier member when the carrier member is attached to the bracket, and
   wherein the seat portion and the receiving location are provided on the top side of the bracket.

21. The roof rack foot assembly according to claim 16, wherein the receiving location is partly, or completely, located within two outer longitudinal end portions of the seat portion, as seen in a longitudinal direction of the bracket corresponding to the direction of the rotational axis.

22. The roof rack foot assembly according to claim 16, wherein the first support portion of the carrier member comprises a curved outer surface which is configured to be in contact with the seat portion when the carrier member is attached to the bracket, and
   wherein the carrier member, by use of the curved outer surface, is movable in the seat portion by allowing the carrier member to pivot with respect to the rotational axis of the carrier member in the first attachment state.

23. The roof rack foot assembly according to claim 22, wherein a radial distance from the rotational axis to any point on the outer curved surface which is configured to be in contact with the seat portion is at least 40% the transverse length of the bracket measured at any location along the seat portion.

24. The roof rack foot assembly according to claim 16, wherein the bracket is configured such that its longitudinal direction, corresponding to the direction of the rotational axis, extends substantially in a travelling direction of the vehicle when the roof rack foot assembly is attached to the vehicle.

25. The roof rack foot assembly according to claim 16, wherein the seat portion comprises a first and a second support surface,
  wherein the carrier member comprises the first support portion and a second support portion, and
  wherein each support surface is configured to receive the respective first and second support portion of the carrier member when the carrier member is attached to the bracket.

26. The roof rack foot assembly according to claim 16, further comprising an engagement member connected to the carrier member for rigidly attaching the carrier member to the bracket,
  wherein the engagement member is configured to attach the carrier member to the bracket by engagement with an engagement portion of the bracket.

27. The roof rack foot assembly according to claim 26, wherein the bracket comprises a top side facing the carrier member and a bottom side provided on an opposite side with respect to the top side,
  wherein the seat portion is provided on the top side of the bracket, and
  wherein the engagement portion is positioned above the seat portion, as seen when the roof rack foot assembly is mounted on a vehicle positioned on a flat horizontally extending surface.

28. The roof rack foot assembly according to claim 26, wherein the bracket comprises a top side facing the carrier member and a bottom side provided on an opposite side with respect to the top side, and
  wherein the engagement portion is positioned on the bottom side of the bracket.

29. The roof rack foot assembly according to claim 16, wherein the seat portion is at least one slot, aperture, or immersed portion on a surface of the bracket, or any combination thereof.

30. A roof rack for a vehicle, the roof rack comprising:
  at least one crossbar; and
  at least one roof rack foot assembly comprising:
    a carrier member for carrying a crossbar of the roof rack, the carrier member comprising a first support portion; and
    a bracket configured for attachment to a fix point attachment position of a vehicle by use of at least one fixation member, the bracket comprising a seat portion for the carrier member, the seat portion configured to receive the first support portion of the carrier member when the carrier member is attached to the bracket, the seat portion and/or the first support portion configured so that the carrier member, in a first attachment state when the carrier member is not rigidly attached to the bracket, is movable in the seat portion by allowing the carrier member to pivot with respect to a rotational axis of the carrier member,
  wherein the seat portion extends in a transverse direction of the bracket which is substantially perpendicular to the rotational axis and is delimited by two outer transverse end portions, wherein a distance in the transverse direction between the two outer transverse end portions is at least 35% of a transverse length of the bracket measured at any location along the seat portion, and/or
  wherein the bracket comprises a receiving location for the at least one fixation member, wherein the receiving location is offset from the seat portion, as seen in the transverse direction which is substantially perpendicular to the rotational axis of the carrier member.

* * * * *